US012673888B2

(12) United States Patent　　　　(10) Patent No.:　US 12,673,888 B2

Lepicard et al.　　　　　　　　　　(45) Date of Patent:　　　Jul. 7, 2026

---

(54) HIGH-INDEX SILICOBORATE AND BOROSILICATE GLASSES

(71) Applicant: CORNING INCORPORATED, Corning, NY (US)

(72) Inventors: Antoine Marie Joseph Lepicard, Melun (FR); Jian Luo, Cupertino, CA (US); Alexander I Priven, Sejong-si (KR)

(73) Assignee: CORNING INCORPORATED, Corning, NY (US)

( * ) Notice: Subject to any disclaimer, the term of this patent is extended or adjusted under 35 U.S.C. 154(b) by 581 days.

(21) Appl. No.: 18/123,637

(22) Filed: Mar. 20, 2023

(65) Prior Publication Data

US 2023/0339803 A1　　　Oct. 26, 2023

Related U.S. Application Data

(60) Provisional application No. 63/323,641, filed on Mar. 25, 2022.

(30) Foreign Application Priority Data

Apr. 14, 2022　　(NL) ..................................... 2031590

(51) Int. Cl.
　　*C03C 3/068*　　　　(2006.01)
　　*C03C 3/155*　　　　(2006.01)

(52) U.S. Cl.
　　CPC .............. *C03C 3/155* (2013.01); *C03C 3/068* (2013.01)

(58) Field of Classification Search
　　CPC ................................. C03C 3/068; C03C 3/155
　　See application file for complete search history.

(56) References Cited

U.S. PATENT DOCUMENTS

| | | | |
|---|---|---|---|
| 2,726,161 A | 12/1955 | Beck et al. | |
| 3,480,566 A | 11/1969 | Hoffman et al. | |
| 4,584,279 A | 4/1986 | Grabowski et al. | |
| 5,747,397 A | 5/1998 | Mcpherson et al. | |
| 6,333,282 B1 | 12/2001 | Nakahata et al. | |
| 7,060,640 B2 | 6/2006 | Ogino et al. | |
| 7,615,507 B2 | 11/2009 | Endo | |
| 7,737,064 B2 | 6/2010 | Fu | |
| 8,053,384 B2 | 11/2011 | Fu | |
| 8,207,075 B2 | 6/2012 | Uehara et al. | |
| 8,389,428 B2 | 3/2013 | Wada et al. | |
| 8,647,994 B2 | 2/2014 | Fujiwara | |
| 8,661,853 B2 | 3/2014 | Negishi et al. | |
| 8,716,157 B2 | 5/2014 | Fujiwara et al. | |
| 8,852,745 B2 | 10/2014 | Yamaguchi et al. | |
| 8,951,926 B2 | 2/2015 | Matano et al. | |
| 9,040,439 B2 | 5/2015 | Endo et al. | |
| 9,169,152 B2 | 10/2015 | Kuang | |
| 9,302,930 B2 | 4/2016 | Negishi et al. | |
| 9,487,432 B2 | 11/2016 | Kuang | |
| 9,643,880 B2 | 5/2017 | Negishi | |
| 10,442,722 B2 | 10/2019 | Sun | |
| 2007/0015651 A1 | 1/2007 | Endo | |
| 2010/0258166 A1 | 10/2010 | Laughlin et al. | |
| 2010/0258184 A1 | 10/2010 | Laughlin et al. | |
| 2018/0093916 A1 | 4/2018 | Sun | |
| 2022/0073410 A1 | 3/2022 | Gaspar et al. | |
| 2022/0073414 A1* | 3/2022 | Luo ......................... C03C 3/155 | |
| 2022/0306517 A1 | 9/2022 | Lepicard et al. | |

FOREIGN PATENT DOCUMENTS

| | | | | |
|---|---|---|---|---|
| CN | 102348656 A | 2/2012 | | |
| CN | 102348657 A | 2/2012 | | |
| CN | 106698926 A | 5/2017 | | |
| CN | 109384392 A | 2/2019 | | |
| CN | 110510869 A | 11/2019 | | |
| CN | 110963706 A | 4/2020 | | |
| CN | 111018343 A | 4/2020 | | |
| CN | 111253063 A | 6/2020 | | |
| CN | 111320384 A | 6/2020 | | |
| CN | 113024107 A | 6/2021 | | |
| GB | 2150555 A | * | 7/1985 | ............. C03C 3/068 |
| JP | 51-087516 A | 7/1976 | | |
| JP | 06-033229 A | 2/1994 | | |
| JP | 09-278480 A | 10/1997 | | |
| JP | H09278480 A | * | 10/1997 | ............. C03C 3/068 |
| JP | 2006-151758 A | 6/2006 | | |
| JP | 2007-112697 A | 5/2007 | | |
| JP | 2008-273751 A | 11/2008 | | |
| JP | 2009-096662 A | 5/2009 | | |
| JP | 2019-196296 A | 11/2019 | | |
| JP | 2020-073453 A | 5/2020 | | |
| JP | 2020169116 A | * | 10/2020 | |
| JP | 2020-186161 A | 11/2020 | | |
| JP | 2021-102549 A | 7/2021 | | |
| JP | 6943995 B2 | 10/2021 | | |
| TW | 201210975 A | 3/2012 | | |
| TW | 202012333 A | 4/2020 | | |
| WO | 2012/099168 A1 | 7/2012 | | |
| WO | 2014/057584 A1 | 4/2014 | | |
| WO | 2019/131123 A1 | 7/2019 | | |
| WO | 2020/034215 A1 | 2/2020 | | |
| WO | 2021/171950 A1 | 9/2021 | | |
| WO | 2021/220581 A1 | 11/2021 | | |

OTHER PUBLICATIONS

NL Search Report ; 2031590; dated Nov. 16, 2022; 12 pages; NL Patent Office.

* cited by examiner

*Primary Examiner* — Elizabeth A. Bolden

(74) *Attorney, Agent, or Firm* — Kevin L. Bray

(57)　　　　　ABSTRACT

Glass compositions include titania (TiO₂), lanthanum oxide (La₂O₃) and boron oxide (B₂O₃) as essential components and may optionally include silica (SiO₂), niobia (Nb₂O₅), zirconia (ZrO₂), yttria (Y₂O₃), bismuth oxide (Bi₂O₃), tungsten oxide (WO₃), zinc oxide (ZnO) and other components. The glasses may be characterized by high refractive index at 587.56 nm at comparably low density at room temperature.

18 Claims, 7 Drawing Sheets

$$Y = 1.765 + 0.057 * X$$

$$Y = 1.765 + 0.057 * X$$

HIGH-INDEX SILICOBORATE AND BOROSILICATE GLASSES

This Application claims the benefit of priority to Dutch Patent Application No. 2031590 filed on Apr. 14, 2022, which claims priority from U.S. Provisional Patent Application Ser. No. 63/323,641 filed on Mar. 25, 2022, the content of which is relied upon and incorporated herein by reference in its entirety.

FIELD

The present disclosure generally relates to borate and silicoborate glasses having a high refractive index and low density.

BACKGROUND

Glass is used in a variety of optical devices, examples of which include augmented reality devices, virtual reality devices, mixed reality devices, eye wear, etc. Desirable properties for this type of glass often include a high refractive index and a low density. Additional desirable properties may include high transmission in the visible and near-ultraviolet (near-UV) range of the electromagnetic spectrum and/or low optical dispersion. It can be challenging to find glasses having the desired combination of these properties and which can be formed from compositions having good glass-forming ability. For example, generally speaking, as the refractive index of a glass increases, the density also tends to increase. Species such as $TiO_2$ and $Nb_2O_5$ are often added to increase the refractive index of a glass without increasing the density of the glass. However, these materials often absorb blue and UV light, which can undesirably decrease the transmittance of light in this region of the spectrum by the glass. Often, attempts to increase the refractive index of a glass while maintaining a low density, and without decreasing transmittance in the blue and UV region of the spectrum, can result in a decrease in the glass-forming ability of the material. For example, crystallization and/or liquid-liquid phase separation can occur during cooling of the glass melt at cooling rates that are generally acceptable in the industry. Typically, the decrease in glass-forming ability appears as the amount of certain species, such as $ZrO_2$, $Y_2O_3$, $Sc_2O_3$, BeO, etc. increases.

Low density, high refractive index glasses often belong to one of two types of chemical systems, based on the glass formers used: (a) silicoborate or borosilicate glasses in which $SiO_2$ and/or $B_2O_3$ are used as the main glass formers and (b) phosphate glasses in which $P_2O_5$ is used as a main glass former. Glasses which rely on other oxides as main glass formers, such as $GeO_2$, $TeO_2$, $Bi_2O_3$, and $V_2O_5$, can be challenging to use due to cost, glass-forming ability, optical properties, and/or production requirements.

Phosphate glasses can be characterized by a high refractive index and low density, however, phosphate glasses can be challenging to produce due to volatilization of $P_2O_5$ from the melts and/or risks of platinum incompatibility. In addition, phosphate glasses are often highly colored and may require an extra bleaching step to provide a glass having the desired transmittance characteristic. Furthermore, phosphate glasses exhibiting a high refractive index also tend to have an increase in optical dispersion.

Silicoborate and borate glasses are typically easier to produce and can exhibit a high transmittance without a bleaching step. However, silicoborate and borosilicate glasses typically exhibit an increase in density at increasing refractive indices, compared to phosphate glasses.

In view of these considerations, there is a need for borate and silicoborate glasses having a high refractive index, a low density, and a high transmittance to blue light.

SUMMARY

According to an embodiment of the present disclosure, a glass comprises a plurality of components, the glass having a composition of the components comprising greater than or equal to 12.0 mol. % and less than or equal to 35.0 mol. % $TiO_2$, greater than or equal to 2.5 mol. % and less than or equal to 20.0 mol. % $ZrO_2$, greater than or equal to 0.5 mol. % and less than or equal to 40.0 mol. % $B_2O_3$, greater than or equal to 0.5 mol. % and less than or equal to 30.0 mol. % $Nb_2O_5$, greater than or equal to 0.0 mol. % and less than or equal to 20.0 mol. % $Bi_2O_3$, greater than or equal to 0.0 mol. % and less than or equal to 15.0 mol. % $P_2O_5$, greater than or equal to 0.0 mol. % and less than or equal to 10.0 mol. % $Al_2O_3$, greater than or equal to 0.0 mol. % and less than or equal to 10.0 mol. % $Gd_2O_3$, greater than or equal to 0.0 mol. % and less than or equal to 8.0 mol. % $WO_3$, greater than or equal to 0.0 mol. % and less than or equal to 5.0 mol. % PbO, greater than or equal to 0.0 mol. % and less than or equal to 5.0 mol. % $V_2O_5$, greater than or equal to 0.0 mol. % and less than or equal to 1.5 mol. % ZnO, greater than or equal to 95.0 mol. % $R_mO_n$, greater than or equal to 0.5 mol. % and less than or equal to 35.0 mol. % $RE_mO_n$, a sum of $SiO_2+B_2O_3+P_2O_5$ greater than or equal to 10.0 mol. % and a sum of $TiO_2+Nb_2O_5$ greater than or equal to 0.0 mol. % and less than or equal to 42.0 mol. %, wherein the composition of the components satisfies the condition: $SiO_2+B_2O_3-P_2O_5$[mol. %]≥0.000, and the glass satisfies the condition: $P_n-(1.765+0.057*P_d)>0.000$, where $P_n$ is a parameter predicting a value of a refractive index at 587.56 nm, $n_d$, calculated from the glass composition in terms of mol. % of the components according to the Formula (I):

$$
\begin{aligned}
P_n = {} & 1.844+0.0054162*La_2O_3+0.0031113*TiO_2- \\
& 0.004212*B_2O_3-0.0035692*SiO_2+ \\
& 0.0027887*ZrO_2+0.0078026*Nb_2O_5- \\
& 0.00012928*CaO+0.00076566*BaO+ \\
& 0.0043601*Y_2O_3+0.00067408*ZnO+ \\
& 0.0068029*Gd_2O_3-0.0025106*Na_2O+ \\
& 0.0039937*WO_3-0.0043208*Al_2O_3- \\
& 0.0011666*Li_2O+0.0051727*PbO+ \\
& 0.012958*Bi_2O_3-0.0018753*GeO_2- \\
& 0.0014084*TeO_2+0.0086647*Er_2O_3+ \\
& 0.0097345*Yb_2O_3-0.0038734*K_2O- \\
& 0.00041776*SrO-0.0017294*MgO,
\end{aligned} \tag{I}
$$

and $P_d$ is a parameter predicting a value of density at room temperature, $d_{RT}$, calculated from the glass composition in terms of mol. % of the components according to the Formula (II):

$$
\begin{aligned}
P_d = {} & 4.688+0.047868*La_2O_3-0.0065829*TiO_2- \\
& 0.027601*B_2O_3-0.022365*SiO_2+ \\
& 0.016475*ZrO_2-0.0052977*Nb_2O_5- \\
& 0.0030466*CaO+0.014971*BaO+ \\
& 0.019511*Y_2O_3+0.0076377*ZnO+ \\
& 0.066160*Gd_2O_3-0.016932*Na_2O+ \\
& 0.025764*WO_3-0.035116*Al_2O_3- \\
& 0.0094315*Li_2O+0.047388*PbO+ \\
& 0.080813*Bi_2O_3-0.0088118*GeO_2+ \\
& 0.072296*Er_2O_3+0.078888*Yb_2O_3- \\
& 0.026242*K_2O+0.010351*SrO- \\
& 0.0030424*MgO,
\end{aligned} \tag{II}
$$

where $R_mO_n$ is a total sum of all oxides, $RE_mO_n$ is a total sum of rare earth metal oxides, and an asterisk (*) means multiplication.

According to another embodiment of the present disclosure, a glass comprises a plurality of components, the glass having a composition of the components comprising greater than or equal to 1.0 mol. % and less than or equal to 13.5 mol. % $ZrO_2$, greater than or equal to 0.3 mol. % and less than or equal to 35.0 mol. % $TiO_2$, greater than or equal to 0.3 mol. % and less than or equal to 29.5 mol. % $B_2O_3$, greater than or equal to 0.0 mol. % and less than or equal to 9.0 mol. % $WO_3$, greater than or equal to 0.0 mol. % and less than or equal to 5.0 mol. % PbO, greater than or equal to 0.0 mol. % and less than or equal to 2.0 mol. % $Gd_2O_3$, greater than or equal to 0.0 at. % and less than or equal to 2.0 at. % F, a sum of $TiO_2+Nb_2O_5+La_2O_3$ greater than or equal to 10.0 mol. % and less than or equal to 70.0 mol. %, a sum of $SiO_2+B_2O_3+P_2O_5$ greater than or equal to 10.0 mol. %, a sum of $RE_mO_n+WO_3+ZrO_2$ greater than or equal to 5.0 mol. %, a sum of $SiO_2+Y_2O_3+Gd_2O_3$ greater than or equal to 0.3 mol. %, a sum of $V_2O_5+MoO_3$ greater than or equal to 0.0 mol. % and less than or equal to 3.0 mol. % and may optionally contain one or more components selected from $Bi_2O_3$, CaO, BaO, ZnO, $Na_2O$, $Al_2O_3$, $Li_2O$, $GeO_2$, $TeO_2$, $K_2O$, SrO and MgO, wherein the composition of the components satisfies the conditions: $TiO_2/(TiO_2+Nb_2O_5+WO_3+Bi_2O_3)$ [mol. %]≥0.050, $SiO_2+B_2O_3-P_2O_5$[mol. %]≥1.0 and $La_2O_3/TiO_2$ [mol. %]≤1.5, and the glass satisfies the condition: $P_n-(1.99+0.083*(TiO_2/(TiO_2+Nb_2O_5+WO_3+Bi_2O_3)))$ >0.000, where $P_n$ is a parameter predicting a refractive index at 587.56 nm, $n_d$, calculated from the glass composition in terms of mol. % of the components according to the Formula (I):

$$P_n=1.844+0.0054162*La_2O_3+0.0031113*TiO_2-$$
$$0.004212*B_2O_3-0.0035692*SiO_2+$$
$$0.0027887*ZrO_2+0.0078026*Nb_2O_5-$$
$$0.00012928*CaO+0.00076566*BaO+$$
$$0.0043601*Y_2O_3+0.00067408*ZnO+$$
$$0.0068029*Gd_2O_3-0.0025106*Na_2O+$$
$$0.0039937*WO_3-0.0043208*Al_2O_3-$$
$$0.0011666*Li_2O+0.0051727*PbO+$$
$$0.012958*Bi_2O_3-0.0018753*GeO_2-$$
$$0.0014084*TeO_2+0.0086647*Er_2O_3+$$
$$0.0097345*Yb_2O_3-0.0038734*K_2O-$$
$$0.00041776*SrO-0.0017294*MgO, \qquad (I)$$

where $RE_mO_n$ is a total sum of rare earth metal oxides, and an asterisk (*) means multiplication.

According to one more embodiment of the present disclosure, a glass comprises a plurality of components, the glass having a composition of the components comprising greater than or equal to 0.5 mol. % and less than or equal to 45.0 mol. % $B_2O_3$, greater than or equal to 0.1 mol. % and less than or equal to 25.0 mol. % $Bi_2O_3$, greater than or equal to 0.0 mol. % and less than or equal to 8.0 mol. % $WO_3$, a sum of $SiO_2+B_2O_3+P_2O_5$ is greater than or equal to 10.0 mol. %, a sum of $TiO_2+Nb_2O_5$ greater than or equal to 8.5 mol. %, a sum of $RE_mO_n+WO_3+ZrO_2$ greater than or equal to 4.5 mol. % and may optionally contain one or more components selected from CaO, BaO, ZnO, $Na_2O$, $Al_2O_3$, $Li_2O$, PbO, $GeO_2$, $TeO_2$, $K_2O$, SrO and MgO, wherein the composition of the components satisfies the condition: $SiO_2+B_2O_3-P_2O_5$ [mol. %]≥0.100, and the glass satisfies the condition: $P_n$>2.045, where $P_n$ is a parameter predicting a refractive index at 587.56 nm, $n_d$, calculated from the glass composition in terms of mol. % of the components according to the Formula (I):

$$P_n=1.844+0.0054162*La_2O_3+0.0031113*TiO_2-$$
$$0.004212*B_2O_3-0.0035692*SiO_2+$$
$$0.0027887*ZrO_2+0.0078026*Nb_2O_5-$$
$$0.00012928*CaO+0.00076566*BaO+$$
$$0.0043601*Y_2O_3+0.00067408*ZnO+$$
$$0.0068029*Gd_2O_3-0.0025106*Na_2O+$$

4

$$0.0039937*WO_3-0.0043208*Al_2O_3-$$
$$0.0011666*Li_2O+0.0051727*PbO+$$
$$0.012958*Bi_2O_3-0.0018753*GeO_2-$$
$$0.0014084*TeO_2+0.0086647*Er_2O_3+$$
$$0.0097345*Yb_2O_3-0.0038734*K_2O-$$
$$0.00041776*SrO-0.0017294*MgO, \qquad (I)$$

where $RE_mO_n$ is a total sum of rare earth metal oxides, and an asterisk (*) means multiplication.

These and other aspects, objects, and features of the present disclosure will be understood and appreciated by those skilled in the art upon studying the following specification, claims, and appended drawings.

DETAILED DESCRIPTION

Figure 1:
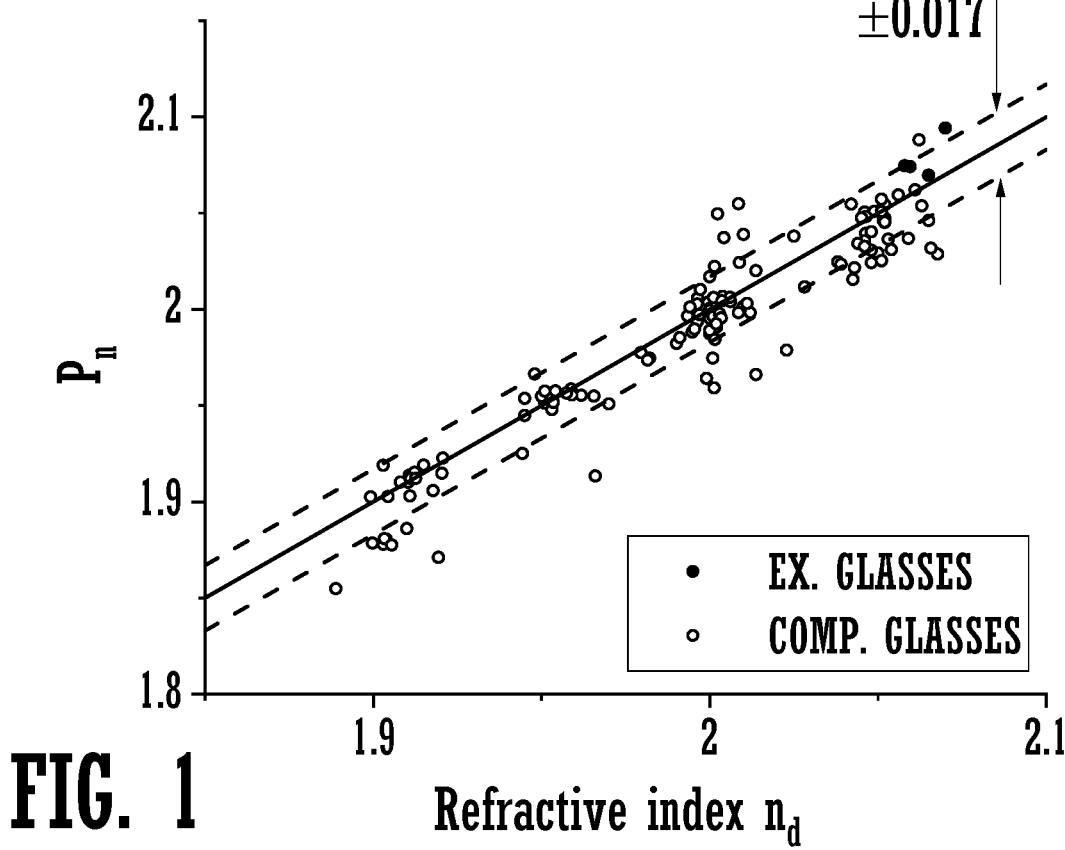
FIG. 1 is a plot illustrating the relationship between the refractive index $n_d$ and the refractive index parameter $P_n$ calculated by formula (I) for some Comparative Glasses and some Exemplary Glasses according to an embodiment of the present disclosure.

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that an order be inferred, in any respect. This holds for any possible non-express basis for interpretation, including, without limitation, matters of logic with respect to arrangement of steps or operational flow; plain meaning derived from grammatical organization or punctuation; the number or type of embodiments described in the specification.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those skilled in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The term "component" refers to a material or compound included in a batch composition from which a glass is formed. Components include oxides, including but not limited to those expressed in Formulas (I), and (II), and the claims. Representative components include $B_2O_3$, $P_2O_5$, $Al_2O_3$, CuO, $Cu_2O$, RO, $R_2O$, $SnO_2$, $MnO_2$, $RE_mO_n$, $SiO_2$, $Ta_2O_5$, ZnO, $WO_3$, $Nb_2O_5$, $TiO_2$, $ZrO_2$, $Bi_2O_3$, $TeO_2$, etc. Other representative components include halogens (e.g. F, Br, Cl). Whenever a component is included as a term in a mathematical expression or formula, it is understood that the component refers to the amount of the component in units of mol. % in the batch composition of the glass. For example, the expression "$B_2O_3+P_2O_5$" refers to the sum of the amount of $B_2O_3$ in units of mol. % and the amount of $P_2O_5$ in units of mol. % in the batch composition of the glass. A mathematical expression or formula is any expression or formula that includes a mathematical operator such as "+", "−", "*", "/", "min", or "max".

Unless otherwise specified, the amount or content of a component in a glass composition is expressed herein in units of mol. % (mole percent).

The term "formed from" can mean one or more of comprises, consists essentially of, or consists of. For example, a component that is formed from a particular material can comprise the particular material, consist essentially of the particular material, or consist of the particular material.

The terms "free" and "substantially free" are used interchangeably herein to refer to an amount and/or an absence of a particular component in a glass composition that is not intentionally added to the glass composition. It is understood that the glass composition may contain traces of a particular constituent component as a contaminant or a tramp in an amount of less than 0.10 mol. %.

As used herein, the term "tramp", when used to describe a particular constituent component in a glass composition, refers to a constituent component that is not intentionally added to the glass composition and is present in an amount of less than 0.10 mol. %. Tramp components may be unintentionally added to the glass composition as an impurity in another constituent component and/or through migration of the tramp component into the composition during processing of the glass composition.

Unless otherwise specified, the term "glass" is used to refer to a glass made from a glass composition disclosed herein.

The symbol "*" means multiplication when used in any formula herein.

The term "log" means logarithm in base 10.

Temperature is expressed herein in units of ° C. (degrees Celsius).

Density is expressed herein in units of $g/cm^3$.

Viscosity is expressed herein in units of P (Poise).

The term "glass former" is used herein to refer to a component that, being solely present in the glass composition (i.e., without other components, except for tramps), is able to form a glass when cooling the melt at a rate of not greater than about 300° C./min.

The term "modifier", as used herein, refers to the oxides of monovalent or divalent metals, i.e., $R_2O$ or RO, where "R" stands for a cation. Modifiers can be added to a glass composition to change the atomic structure of the melt and the resulting glass. In some embodiments, the modifier may change the coordination numbers of cations present in the glass formers (e.g., boron in $B_2O_3$), which may result in forming a more polymerized atomic network and, as a result, may provide better glass formation.

As used herein, the term "RO" refers to a total content of divalent metal oxides, the term "$R_2O$" refers to a total content of monovalent metal oxides, and the term "$Alk_2O$" refers to a total content of alkali metal oxides. The term $R_2O$ encompasses alkali metal oxides ($Alk_2O$), in addition to other monovalent metal oxides, such as $Ag_2O$, $Tl_2O$, and $Hg_2O$, for example. As discussed below, in the present disclosure, a rare earth metal oxide is referred to herein by its normalized formula ($RE_2O_3$) in which the rare earth metal RE has the redox state "+3," and thus rare earth metal oxides are not encompassed by the term RO.

As used herein, the term "rare earth metals" refers to the metals listed in the Lanthanide Series of the IUPAC Periodic Table, plus yttrium and scandium. As used herein, the term "rare earth metal oxides," is used to refer to the oxides of rare earth metals in different redox states, such as "+3" for lanthanum in $La_2O_3$, "+4" for cerium in $CeO_2$, "+2" for europium in EuO, etc. In general, the redox states of rare earth metals in oxide glasses may vary and, in particular, the redox state may change during melting, based on the batch composition and/or the redox conditions in the furnace where the glass is melted and/or heat-treated (e.g., annealed). Unless otherwise specified, a rare earth metal oxide is referred to herein by its normalized formula in which the rare earth metal has the redox state "+3." Accordingly, in the case in which a rare earth metal having a redox state other than "+3" is added to the glass composition batch, the glass compositions are recalculated by adding or removing some oxygen to maintain the stoichiometry. For example, when $CeO_2$ (with cerium in redox state "+4") is used as a batch component, the resulting as-batched composition is recalculated assuming that two moles of $CeO_2$ is equivalent to one mole of $Ce_2O_3$, and the resulting as-batched composition is expressed in terms of $Ce_2O_3$. As used herein, the term "$RE_mO_n$" is used to refer to the total content of rare earth metal oxides in all redox states present, and the term "$RE_2O_3$" is used to refer to the total content of rare earth metal oxides in the "+3" redox state, also specified as "trivalent equivalent".

Unless otherwise specified, all compositions are expressed in terms of as-batched mole percent (mol %). As will be understood by those having ordinary skill in the art, various melt constituents (e.g., fluorine, alkali metals, boron, etc.) may be subject to different levels of volatilization (e.g., as a function of vapor pressure, melt time and/or melt temperature) during melting of the constituents. As such, the term "about," in relation to such constituents, is intended to encompass values within about 0.2 mol % when measuring final articles as compared to the as-batched compositions provided herein. With the forgoing in mind, substantial compositional equivalence between final articles and as-batched compositions is expected.

In the case when fluorine or other halogen (chlorine, bromine, and/or iodine) is added to or is present in an oxide glass, the molecular representation of the resulting glass composition may be expressed in different ways. In the present disclosure, the content of fluorine as a single term, when present, is expressed in terms of atomic percent (at. %), which is determined based on the fraction of fluorine in a total sum of all atoms in a glass composition multiplied by a factor of 100.

In the present disclosure, the following method of representation of fluorine-containing compositions and concentration ranges is used. The concentration limits for all oxides (e.g. $SiO_2$, $B_2O_3$, $Na_2O$, etc.) are presented under the assumption that the respective cations (such as, for example, silicon [$Si_4^+$], boron [$B_3^+$], sodium [$Na^+$], etc.) are initially presented in the form of the corresponding oxides. When fluorine is present, for the purposes of calculating the concentration of components of the composition, some part of the oxygen in the oxide is equivalently replaced with fluorine (i.e. one atom of oxygen is replaced with two atoms of fluorine). The fluorine is assumed to be present in the form of silicon fluoride ($SiF_4$); accordingly, the total sum of all oxides plus $SiF_4$ is assumed to be 100 mole percent in all compositions.

The measured density values for the glasses reported herein were measured at room temperature in units of g/cm³ by Archimedes method in water with an error of 0.001 g/cm³. As used herein, density measurements at room temperature (specified as $d_{RT}$) are indicated as being measured at 20° C. or 25° C., and encompass measurements obtained at temperatures that may range from 20° C. to 25° C. It is understood that room temperature may vary between about 20° C. to about 25° C., however, for the purposes of the present disclosure, the variation in density within the temperature range of 20° C. to 25° C. is expected to be less than the error of 0.001 g/cm³, and thus is not expected to impact the room temperature density measurements reported herein.

As used herein, good glass forming ability refers to a resistance of the melt to devitrification as the material cools.

Glass forming ability can be measured by determining the critical cooling rate of the melt. The terms "critical cooling rate" or "$v_{cr}$" are used herein to refer to the minimum cooling rate at which a melt of a given composition forms a glass free of crystals visible under an optical microscope under magnification of 500×. The critical cooling rate can be used to measure the glass-forming ability of a composition, i.e., the ability of the melt of a given glass composition to form glass when cooling. Generally speaking, the lower the critical cooling rate, the better the glass-forming ability.

The term "liquidus temperature" (Tri) is used herein to refer to a temperature above which the glass composition is completely liquid with no crystallization of constituent components of the glass. The liquidus temperature values reported herein were obtained by measuring samples using either DSC or by isothermal hold of samples wrapped in platinum foil. For samples measured using DSC, powdered samples were heated at 10 K/min to 1250° C. The end of the endothermal event corresponding to the melting of crystals was taken as the liquidus temperature. For the second technique (isothermal hold), a glass block (about 1 cm³) was wrapped in platinum foil, to avoid volatilization, and placed in a furnace at a given temperature for 17 hours. The glass block was then observed under an optical microscope to check for crystals.

The refractive index values reported herein were measured at room temperature, unless otherwise specified. The refractive index values for a glass sample were measured using a Metricon Model 2010 prism coupler refractometer with an error of about ±0.0002. Using the Metricon, the refractive index of a glass sample was measured at two or more wavelengths of about 406 nm, 473 nm, 532 nm, 633 nm, 828 nm, and 1064 nm. The measured dependence characterizes the dispersion and was then fitted with a Cauchy's law equation or Sellmeier equation to allow for calculation of the refractive index of the sample at a given wavelength of interest between the measured wavelengths. The term "refractive index $n_d$" is used herein to refer to a refractive index calculated as described above at a wavelength of 587.56 nm, which corresponds to the helium d-line wavelength. The term "refractive index $n_C$" is used herein to refer to a refractive index calculated as described above at a wavelength of 656.3 nm. The term "refractive index $n_F$" is used herein to refer to a refractive index calculated as described above at a wavelength of 486.1 nm. The term "refractive index $n_g$" is used herein to refer to a refractive index calculated as described above at a wavelength of 435.8 nm.

As used herein, the terms "high refractive index" or "high index" refer to a refractive index value of a glass that is greater than or equal to at least 1.80, unless otherwise indicated. Where indicated, embodiments of the terms "high refractive index" or "high index" refer to a refractive index value of a glass that is greater than or equal to at least 1.85, greater than or equal to 1.90, or greater than or equal to 1.95, or greater than or equal to 2.00.

The glass transition temperature ($T_g$) is measured by differential scanning calorimeter (DSC) at the heating rate of 10 K/min after cooling in air.

Glass composition may include boron oxide ($B_2O_3$). According to some embodiments of the present disclosure, boron oxide may play a role of a glass former. As a glass former, $B_2O_3$ may increase the liquidus viscosity and, therefore, inhibit crystallization. However, adding $B_2O_3$ to a glass composition may cause liquid-liquid phase separation, which may cause devitrification and/or a reduction in the visible transmittance of the glass. Also, adding $B_2O_3$ to the high-index glasses reduces the refractive index. Accordingly, the amount of boron oxide is limited, or glasses may be substantially free of $B_2O_3$. In embodiments, the glass composition may contain boron oxide ($B_2O_3$) in an amount from greater than or equal to 0.3 mol. % to less than or equal to 45.0 mol. % and all ranges and sub-ranges between the foregoing values. In some embodiments, the glass composition may contain $B_2O_3$ in an amount greater than or equal to 0.3 mol. %, greater than or equal to 5.0 mol. %, greater than or equal to 10.0 mol. %, greater than or equal to 14.0 mol. %, greater than or equal to 15.0 mol. %, greater than or equal to 16.0 mol. %, greater than or equal to 16.4 mol. %, greater than or equal to 16.9 mol. %, greater than or equal to 25.0 mol. %, greater than or equal to 30.0 mol. %, greater than or equal to 35.0 mol. %, or greater than or equal to 40.0 mol. %. In some other embodiments, the glass composition may contain $B_2O_3$ in an amount less than or equal to 45.0 mol. %, less than or equal to 40.0 mol. %, less than or equal to 35.0 mol. %, less than or equal to 30.0 mol. %, less than or equal to 29.5 mol. %, less than or equal to 25.0 mol. %, less than or equal to 24.0 mol. %, less than or equal to 22.5 mol. %, less than or equal to 20.4 mol. %, less than or equal to 20.0 mol. %, or less than or equal to 10.0 mol. %. In some more embodiments, the glass composition may contain $B_2O_3$ in an amount greater than or equal to 0.3 mol. % and less than or equal to 29.5 mol. %, greater than or equal to 0.5 mol. % and less than or equal to 45.0 mol. %, greater than or equal to 0.5 mol. % and less than or equal to 40.0 mol. %, greater than or equal to 10.0 mol. % and less than or equal to 35.0 mol. %, greater than or equal to 13.67 mol. % and less than or equal to 24.41 mol. %, greater than or equal to 15.0 mol. % and less than or equal to 22.5 mol. %, greater than or equal to 16.0 mol. % and less than or equal to 20.0 mol. %, greater than or equal to 16.4 mol. % and less than or equal to 20.4 mol. %, greater than or equal to 16.9 mol. % and less than or equal to 20.4 mol. %, greater than or equal to 0.3 mol. % and less than or equal to 45.0 mol. %, greater than or equal to 0.3 mol. % and less than or equal to 10.0 mol. %, greater than or equal to 5.0 mol. % and less than or equal to 45.0 mol. %, greater than or equal to 5.0 mol. % and less than or equal to 10.0 mol. %, greater than or equal to 10.0 mol. % and less than or equal to 20.0 mol. %, greater than or equal to 14.0 mol. % and less than or equal to 45.0 mol. %, greater than or equal to 14.0 mol. % and less than or equal to 20.0 mol. %, greater than or equal to 15.0 mol. % and less than or equal to 20.0 mol. %, greater than or equal to 16.4 mol. % and less than or equal to 20.0 mol. %.

Glass composition may include silica ($SiO_2$). Silica may play a role of glass-former. Silica, as well as $B_2O_3$, may help to increase the liquidus viscosity (viscosity at the liquidus temperature) and, therefore, inhibit crystallization. However, adding $SiO_2$ to a glass composition may cause liquid-liquid phase separation, which may cause devitrification and/or a reduction in the transmittance of the glass. Also, $SiO_2$ is a low-index component and makes it difficult to achieve high index. Accordingly, the content of $SiO_2$ is limited, or glasses may be substantially free of $SiO_2$. In embodiments, the glass composition may contain silica ($SiO_2$) in an amount from greater than or equal to 0.0 mol. % to less than or equal to 22.1 mol. % and all ranges and sub-ranges between the foregoing values. In some embodiments, the glass composition may contain $SiO_2$ in an amount greater than or equal to 0.0 mol. %, greater than or equal to 4.7 mol. %, greater than or equal to 5.0 mol. %, greater than or equal to 10.0 mol. %, greater than or equal to 11.0 mol. %, or greater than or equal to 20.0 mol. %. In some other embodiments, the glass composition may contain $SiO_2$ in an amount less than or equal to 22.1 mol. %, less than or equal to 20.0 mol. %, less than or equal to 17.5 mol. %, less than or equal to 16.5 mol. %, less than or equal to 15.0 mol. %, less than or equal to 13.4 mol. %, or less than or equal to 10.0 mol. %. In some more embodiments, the glass composition may contain $SiO_2$ in an amount greater than or equal to 0.0 mol. % and less than or equal to 15.0 mol. %, greater than or equal to 4.68 mol. % and less than or equal to 13.4 mol. %, greater than or equal to 5.0 mol. % and less than or equal to 20.0 mol. %, greater than or equal to 10.0 mol. % and less than or equal to 20.0 mol. %, greater than or equal to 10.0 mol. % and less than or equal to 17.5 mol. %, greater than or equal to 11.0 mol. % and less than or equal to 16.5 mol. %, greater than or equal to 0.0 mol. % and less than or equal to 22.1 mol. %, greater than or equal to 0.0 mol. % and less than or equal to 10.0 mol. %, greater than or equal to 4.7 mol. % and less than or equal to 22.1 mol. %, greater than or equal to 4.7 mol. % and less than or equal to 10.0 mol. %, greater than or equal to 5.0 mol. % and less than or equal to 22.1 mol. %, greater than or equal to 5.0 mol. % and less than or equal to 10.0 mol. %, greater than or equal to 10.0 mol. % and less than or equal to 22.1 mol. %, greater than or equal to 10.0 mol. % and less than or equal to 13.4 mol. %, greater than or equal to 11.0 mol. % and less than or equal to 22.1 mol. %, greater than or equal to 11.0 mol. % and less than or equal to 13.4 mol. %.

Glass composition may include phosphorus oxide ($P_2O_5$) as an additional glass former. Greater amounts of $P_2O_5$ may increase the melt viscosity at a given temperature, which may inhibit crystallization from the melt when cooling and, therefore, may improve the glass-forming ability of the melt (i.e. lower the critical cooling rate of the melt). However, $P_2O_5$ significantly decreases the refractive index. Also, in some cases $P_2O_5$ may stimulate liquid-liquid phase separation, which may cause crystallization of glass forming melts when cooling and/or loss of transmittance. Additionally, $P_2O_5$ can increase the liquidus temperature of a given composition due to the low solubility of refractory phosphate phases, such as rare earth phosphates and zirconia phosphate. Accordingly, the content of $P_2O_5$ in high-index glasses is limited, or glasses may be free of $P_2O_5$. In embodiments, the glass composition may contain phosphorus oxide ($P_2O_5$) in an amount from greater than or equal to 0.0 mol. % to less than or equal to 15.0 mol. % and all ranges and sub-ranges between the foregoing values. In some embodiments, the glass composition may contain $P_2O_5$ in an amount greater than or equal to 0.0 mol. %, greater than or equal to 5.0 mol. %, greater than or equal to 9.0 mol. %, greater than or equal to 10.0 mol. %, greater than or equal to 11.0 mol. %, or greater than or equal to 13.0 mol. %. In some other embodiments, the glass composition may contain $P_2O_5$ in an amount less than or equal to 15.0 mol. %, less than or equal to 13.0 mol. %, less than or equal to 11.0 mol. %, less than or equal to 10.0 mol. %, less than or equal to 9.0 mol. %, or less than or equal to 5.0 mol. %. In some more embodiments, the glass composition may contain $P_2O_5$ in an amount greater than or equal to 0.0 mol. % and less than or equal to 15.0 mol. %, greater than or equal to 0.0 mol. % and less than or equal to 5.0 mol. %, greater than or equal to 5.0 mol. % and less than or equal to 15.0 mol. %, greater than or equal to 5.0 mol. % and less than or equal to 9.0 mol. %, greater than or equal to 9.0 mol. % and less than or equal to 15.0 mol. %, greater than or equal to 9.0 mol. % and less than or equal to 10.0 mol. %, greater than or equal to 10.0 mol. % and less than or equal to 15.0 mol. %, greater than or equal to 10.0 mol. % and less than or equal to 11.0 mol. %, greater than or equal to 11.0 mol. % and less than or equal to 15.0 mol. %, greater than or equal to 11.0 mol. % and less than or equal to 13.0 mol. %.

Glass composition may have limitations for the amount of all oxides. When a glass composition completely or mostly consists of oxides, containing zero or a small amount of non-oxide components (such as halides, chalcogenides and others), it may become easier to melt and preserve from crystallization, phase separation, volatilization of components and other undesirable effects. Accordingly, in some embodiments of the present disclosure, the glass composition may be required to contain high amount of oxide components, or not to contain non-oxide components in remarkable amounts.

In some embodiments, the glass composition may contain a sum of all oxides $R_mO_n$ in an amount greater than or equal to 95.0 mol. %.

Glass composition may have limitations for the amount of rare earth metal oxides. In some embodiments, the glass composition may contain rare earth metal oxides $RE_mO_n$ in an amount greater than or equal to 0.5 mol. %, or greater than or equal to 20.0 mol. %. In some other embodiments, the glass composition may contain rare earth metal oxides $RE_mO_n$ in an amount less than or equal to 35.0 mol. % or less than or equal to 20.0 mol. %. In some more embodiments, the glass composition may contain $RE_mO_n$ in an amount greater than or equal to 0.5 mol. % and less than or equal to 35.0 mol. %, or greater than or equal to 0.5 mol. % and less than or equal to 20.0 mol. %.

Glass composition may include lanthanum oxide ($La_2O_3$). Lanthanum oxide is a high-index component that has little effect on transmittance in the visible range. Also, addition of $La_2O_3$ may inhibit phase separation. However, $La_2O_3$ provides higher density relative to other high-index components, such as, for example, $TiO_2$, $Nb_2O_5$ or $WO_3$. Also, when added in high amount, it may cause crystallization of refractory species, like lanthanum disilicate ($La_2Si_2O_7$), lanthanum zirconate ($La_2ZrO_5$) and others, and, accordingly, reduce glass forming ability. For this reason, the content of $La_2O_3$ should be limited. In embodiments, the glass composition may contain lanthanum oxide ($La_2O_3$) in an amount from greater than or equal to 0.0 mol. % to less than or equal to 70.0 mol. % and all ranges and sub-ranges between the foregoing values. In some embodiments, the glass composition may contain $La_2O_3$ in an amount greater than or equal to 0.0 mol. %, greater than or equal to 5.0 mol. %, greater than or equal to 10.0 mol. %, greater than or equal to 15.0 mol. %, greater than or equal to 20.0 mol. %, greater than or equal to 21.0 mol. %, greater than or equal to 22.0 mol. %, greater than or equal to 40.0 mol. %, greater than or equal to 50.0 mol. %, or greater than or equal to 60.0 mol. %. In some other embodiments, the glass composition may contain $La_2O_3$ in an amount less than or equal to 70.0 mol. %, less than or equal to 60.0 mol. %, less than or equal to 50.0 mol. %, less than or equal to 40.0 mol. %, less than or equal to 30.0 mol. %, less than or equal to 27.5 mol. %, less than or equal to 26.25 mol. %, less than or equal to 24.0 mol. %, or less than or equal to 10.0 mol. %. In some more embodiments, the glass composition may contain $La_2O_3$ in an amount greater than or equal to 15.0 mol. % and less than or equal to 30.0 mol. %, greater than or equal to 20.0 mol. % and less than or equal to 30.0 mol. %, greater than or equal to 20.0 mol. % and less than or equal to 27.5 mol. %, greater than or equal to 21.0 mol. % and less than or equal to 26.25 mol. %, greater than or equal to 21.83 mol. % and less than or equal to 24.03 mol. %, greater than or equal to 0.0 mol. % and less than or equal to 70.0 mol. %, greater than or equal to 0.0 mol. % and less than or equal to 10.0 mol. %, greater than or equal to 10.0 mol. % and less than or equal to 70.0 mol. %, greater than or equal to 10.0 mol. % and less than or equal to 24.0 mol. %, greater than or equal to 15.0 mol. % and less than or equal to 24.0 mol. %, greater than or equal to 20.0 mol. % and less than or equal to 70.0 mol. %, greater than or equal to 20.0 mol. % and less than or equal to 24.0 mol. %.

Glass composition may include yttria ($Y_2O_3$). Yttria behaves like lanthanum oxide, but may provide a given refractive index at a lower density, while still not providing undesirable coloring. However, adding $Y_2O_3$ in high amounts to the glass compositions may adversely cause crystallization of the glass melts when cooling. Accordingly, in some embodiments, the content of $Y_2O_3$ may be limited. In embodiments, the glass composition may contain yttria ($Y_2O_3$) in an amount from greater than or equal to 0.0 mol. % to less than or equal to 10.0 mol. % and all ranges and sub-ranges between the foregoing values. In some embodiments, the glass composition may contain $Y_2O_3$ in an amount greater than or equal to 0.0 mol. %, greater than or equal to 0.5 mol. %, greater than or equal to 0.75 mol. %, greater than or equal to 3.0 mol. %, or greater than or equal to 5.0 mol. %. In some other embodiments, the glass composition may contain $Y_2O_3$ in an amount less than or equal to 10.0 mol. %, less than or equal to 8.0 mol. %, less than or equal to 6.25 mol. %, less than or equal to 6.0 mol. %, less than or equal to 5.5 mol. %, or less than or equal to 5.0 mol. %. In some more embodiments, the glass composition may contain $Y_2O_3$ in an amount greater than or equal to 0.0 mol. % and less than or equal to 10.0 mol. %, greater than or equal to 0.0 mol. % and less than or equal to 8.0 mol. %, greater than or equal to 0.0 mol. % and less than or equal to 6.0 mol. %, greater than or equal to 0.0 mol. % and less than or equal to 5.0 mol. %, greater than or equal to 0.5 mol. % and less than or equal to 6.25 mol. %, greater than or equal to 0.75 mol. % and less than or equal to 5.5 mol. %, greater than or equal to 2.54 mol. % and less than or equal to 5.28 mol. %, greater than or equal to 0.5 mol. % and less than or equal to 10.0 mol. %, greater than or equal to 0.5 mol. % and less than or equal to 5.0 mol. %, greater than or equal to 0.75 mol. % and less than or equal to 10.0 mol. %, greater than or equal to 0.75 mol. % and less than or equal to 5.0 mol. %, greater than or equal to 3.0 mol. % and less than or equal to 10.0 mol. %, greater than or equal to 3.0 mol. % and less than or equal to 5.0 mol. %.

Glass composition may include gadolinium oxide ($Gd_2O_3$). Gadolinium oxide behaves like lanthanum oxide, providing high refractive index without compromising visible transmittance, but adversely increasing the density of glass. Also, gadolinium oxide is more expensive than other rare earth metal oxides, such as $La_2O_3$ and $Y_2O_3$. Accordingly, in some embodiments, the content of $Gd_2O_3$ in a glass composition is limited, or a glass composition may be substantially free of $Gd_2O_3$. In embodiments, the glass composition may contain gadolinium oxide ($Gd_2O_3$) in an amount from greater than or equal to 0.0 mol. % to less than or equal to 10.0 mol. % and all ranges and sub-ranges between the foregoing values. In some embodiments, the glass composition may contain $Gd_2O_3$ in an amount greater than or equal to 0.0 mol. %, greater than or equal to 5.0 mol. %, greater than or equal to 7.0 mol. %, greater than or equal to 8.0 mol. %, or greater than or equal to 9.0 mol. %. In some other embodiments, the glass composition may contain $Gd_2O_3$ in an amount less than or equal to 10.0 mol. %, less than or equal to 9.0 mol. %, less than or equal to 8.0 mol. %, less than or equal to 7.0 mol. %, less than or equal to 5.0 mol. %, less than or equal to 2.0 mol. %, less than or equal to 1.35 mol. %, or less than or equal to 1.2 mol. %. In some more embodiments, the glass composition may contain $Gd_2O_3$ in an amount greater than or equal to 0.0 mol. % and less than or equal to 10.0 mol. %, greater than or equal to 0.0 mol. % and less than or equal to 2.0 mol. %, greater than or equal to 0.0 mol. % and less than or equal to 1.35 mol. %, greater than or equal to 0.0 mol. % and less than or equal to 1.2 mol. %, greater than or equal to 5.0 mol. % and less than or equal to 7.0 mol. %.

Glass composition may include alumina ($Al_2O_3$). Alumina may increase the viscosity of glass forming melts at high temperature, which may reduce the critical cooling rate and improve the glass forming ability. However, addition of $Al_2O_3$ may cause crystallization of refractory minerals, such as aluminum titanate ($Al_2TiO_5$), aluminum niobate (Al-$NbO_4$) and others, in the melt when cooling, or may lower the solubility of $ZrO_2$ in the liquid, causing a drastic increase on the liquidus temperature or necessitating a lower $ZrO_2$ content of a composition. Accordingly, the amount of $Al_2O_3$ is limited, or glasses may be substantially free of $Al_2O_3$. In embodiments, the glass composition may contain alumina ($Al_2O_3$) in an amount from greater than or equal to 0.0 mol. % to less than or equal to 10.0 mol. % and all ranges and sub-ranges between the foregoing values. In some embodiments, the glass composition may contain $Al_2O_3$ in an amount greater than or equal to 0.0 mol. %, greater than or equal to 5.0 mol. %, greater than or equal to 7.0 mol. %, greater than or equal to 8.0 mol. %, or greater than or equal to 9.0 mol. %. In some other embodiments, the glass composition may contain $Al_2O_3$ in an amount less than or equal to 10.0 mol. %, less than or equal to 9.0 mol. %, less than or equal to 8.0 mol. %, less than or equal to 7.0 mol. %, or less than or equal to 5.0 mol. %. In some more embodiments, the glass composition may contain $Al_2O_3$ in an amount greater than or equal to 0.0 mol. % and less than or equal to 10.0 mol. %, greater than or equal to 0.0 mol. % and less than or equal to 5.0 mol. %, greater than or equal to 5.0 mol. % and less than or equal to 10.0 mol. %, greater than or equal to 5.0 mol. % and less than or equal to 7.0 mol. %, greater than or equal to 7.0 mol. % and less than or equal to 10.0 mol. %, greater than or equal to 7.0 mol. % and less than or equal to 8.0 mol. %, greater than or equal to 8.0 mol. % and less than or equal to 10.0 mol. %, greater than or equal to 8.0 mol. % and less than or equal to 9.0 mol. %.

Glass composition may include vanadia ($V_2O_5$). Vanadia provides the highest ratio of the refractive index to density among all oxides. However, vanadia may cause undesirable dark coloring and may also raise environmental concerns. For these reasons, the content of vanadia in the glasses is limited, or glass compositions may be free of $V_2O_5$. In embodiments, the glass composition may contain vanadia ($V_2O_5$) in an amount from greater than or equal to 0.0 mol. % to less than or equal to 10.0 mol. % and all ranges and sub-ranges between the foregoing values. In some embodiments, the glass composition may contain $V_2O_5$ in an amount greater than or equal to 0.0 mol. %, greater than or equal to 5.0 mol. %, greater than or equal to 7.0 mol. %, greater than or equal to 8.0 mol. %, or greater than or equal to 9.0 mol. %. In some other embodiments, the glass composition may contain $V_2O_5$ in an amount less than or equal to 10.0 mol. %, less than or equal to 9.0 mol. %, less than or equal to 8.0 mol. %, less than or equal to 7.0 mol. %, less than or equal to 5.0 mol. %, less than or equal to 3.0 mol. %, or less than or equal to 0.1 mol. %. In some more embodiments, the glass composition may contain $V_2O_5$ in an amount greater than or equal to 0.0 mol. % and less than or equal to 5.0 mol. %, greater than or equal to 0.0 mol. % and less than or equal to 0.1 mol. %, greater than or equal to 0.0 mol. % and less than or equal to 10.0 mol. %, greater than or equal to 5.0 mol. % and less than or equal to 10.0 mol. %, greater than or equal to 5.0 mol. % and less than or equal to 7.0 mol. %, greater than or equal to 7.0 mol. % and less than or equal to 10.0 mol. %, greater than or equal to 7.0 mol. % and less than or equal to 8.0 mol. %, greater than or equal to 8.0 mol. % and less than or equal to 10.0 mol. %, greater than or equal to 8.0 mol. % and less than or equal to 9.0 mol. %.

Glass composition may include lead oxide (PbO). Adding lead oxide to a glass composition may increase the refractive index without causing crystallization or phase separation of the glass forming melt and not compromising the visible transmittance. However, adding PbO may adversely increase the density of glass. Also, PbO raises environmental concerns. Accordingly, in some embodiments of the present disclosure the content of PbO in glass composition is limited, or, preferably, a glass composition can be substantially free of PbO. In embodiments, the glass composition may contain lead oxide (PbO) in an amount from greater than or equal to 0.0 mol. % to less than or equal to 10.0 mol. % and all ranges and sub-ranges between the foregoing values. In some embodiments, the glass composition may contain PbO in an amount greater than or equal to 0.0 mol. %, greater than or equal to 5.0 mol. %, greater than or equal to 7.0 mol. %, greater than or equal to 8.0 mol. %, or greater than or equal to 9.0 mol. %. In some other embodiments, the glass composition may contain PbO in an amount less than or equal to 10.0 mol. %, less than or equal to 9.0 mol. %, less than or equal to 8.0 mol. %, less than or equal to 7.0 mol. %, less than or equal to 5.0 mol. %, or less than or equal to 0.5 mol. %. In some more embodiments, the glass composition may contain PbO in an amount greater than or equal to 0.0 mol. % and less than or equal to 5.0 mol. %, greater than or equal to 0.0 mol. % and less than or equal to 0.5 mol. %, greater than or equal to 0.0 mol. % and less than or equal to 10.0 mol. %, greater than or equal to 5.0 mol. % and less than or equal to 10.0 mol. %, greater than or equal to 5.0 mol. % and less than or equal to 7.0 mol. %, greater than or equal to 7.0 mol. % and less than or equal to 10.0 mol. %, greater than or equal to 7.0 mol. % and less than or equal to 8.0 mol. %, greater than or equal to 8.0 mol. % and less than or equal to 10.0 mol. %, greater than or equal to 8.0 mol. % and less than or equal to 9.0 mol. %.

Glass composition may include zinc oxide (ZnO). Zinc oxide provides a high ratio of refractive index to density and may increase the solubility of titania, which indirectly increases the refractive index of glasses. However, in some embodiments, at high concentrations of ZnO, the glass-forming ability of the melt may decrease and the melt may tend to crystallize during cooling. In embodiments, the glass composition may contain zinc oxide (ZnO) in an amount from greater than or equal to 0.0 mol. % to less than or equal to 10.0 mol. % and all ranges and sub-ranges between the foregoing values. In some embodiments, the glass composition may contain ZnO in an amount greater than or equal to 0.0 mol. %, greater than or equal to 5.0 mol. %, greater than or equal to 7.0 mol. %, greater than or equal to 8.0 mol. %, or greater than or equal to 9.0 mol. %. In some other embodiments, the glass composition may contain ZnO in an amount less than or equal to 10.0 mol. %, less than or equal to 9.0 mol. %, less than or equal to 8.0 mol. %, less than or equal to 7.0 mol. %, less than or equal to 5.0 mol. %, less than or equal to 4.0 mol. %, less than or equal to 3.0 mol. %, less than or equal to 2.7 mol. %, less than or equal to 1.5 mol. %, or less than or equal to 0.1 mol. %. In some more embodiments, the glass composition may contain ZnO in an amount greater than or equal to 0.0 mol. % and less than or equal to 4.0 mol. %, greater than or equal to 0.0 mol. % and less than or equal to 3.0 mol. %, greater than or equal to 0.0 mol. % and less than or equal to 2.7 mol. %, greater than or equal to 0.0 mol. % and less than or equal to 1.5 mol. %, greater than or equal to 0.0 mol. % and less than or equal to 0.1 mol. %, greater than or equal to 0.0 mol. % and less than or equal to 10.0 mol. %, greater than or equal to 5.0 mol. % and less than or equal to 10.0 mol. %, greater than or equal to 7.0 mol. % and less than or equal to 8.0 mol. %.

Glass composition may include tungsten oxide ($WO_3$). $WO_3$ provides high refractive index without significantly increasing density or causing undesirable coloring. Also, addition of $WO_3$ to glass composition may decrease the liquidus temperature, which allows melting such glasses at lower temperatures, that, in turn, may increase the transmittance of such glasses. Also, addition of $WO_3$ may decrease the glass transition temperature $T_g$, which allows glass formation at lower temperatures. At high concentrations of $WO_3$, the liquidus temperature tends to increase, and the viscosity at the liquidus temperature drops, making it difficult to avoid crystallization of melts when cooling. Accordingly, the content of $WO_3$ should be limited, or glass compositions may be free of $WO_3$. In embodiments, the glass composition may contain tungsten oxide ($WO_3$) in an amount from greater than or equal to 0.0 mol. % to less than or equal to 9.0 mol. % and all ranges and sub-ranges between the foregoing values. In some embodiments, the glass composition may contain $WO_3$ in an amount greater than or equal to 0.0 mol. %, greater than or equal to 2.0 mol. %, greater than or equal to 5.0 mol. %, greater than or equal to 6.0 mol. %, greater than or equal to 7.0 mol. %, or greater than or equal to 8.0 mol. %. In some other embodiments, the glass composition may contain $WO_3$ in an amount less than or equal to 9.0 mol. %, less than or equal to 8.0 mol. %, less than or equal to 7.0 mol. %, less than or equal to 6.0 mol. %, less than or equal to 5.0 mol. %, less than or equal to 2.0 mol. %, less than or equal to 1.8 mol. %, or less than or equal to 1.6 mol. %. In some more embodiments, the glass composition may contain $WO_3$ in an amount greater than or equal to 0.0 mol. % and less than or equal to 9.0 mol. %, greater than or equal to 0.0 mol. % and less than or equal to 8.0 mol. %, greater than or equal to 0.0 mol. % and less than or equal to 6.0 mol. %, greater than or equal to 0.0 mol. % and less than or equal to 2.0 mol. %, greater than or equal to 0.0 mol. % and less than or equal to 1.8 mol. %, greater than or equal to 0.0 mol. % and less than or equal to 1.6 mol. %, greater than or equal to 1.97 mol. % and less than or equal to 5.91 mol. %, greater than or equal to 2.0 mol. % and less than or equal to 5.0 mol. %, greater than or equal to 6.0 mol. % and less than or equal to 7.0 mol. %, greater than or equal to 7.0 mol. % and less than or equal to 8.0 mol. %.

Glass composition may include zirconia ($ZrO_2$). Zirconia can increase the refractive index while maintaining low density. $ZrO_2$ can also increase the viscosity of the melt, which may help to inhibit crystallization from the melt. $ZrO_2$ does not introduce coloring in the glass in the visible and near-UV ranges, which may help to maintain a high transmittance of the glass. However, high concentrations of zirconia may cause crystallization of refractory minerals, such as zirconia ($ZrO_2$), zircon ($ZrSiO_4$), calcium zirconate ($CaZrO_3$) and others, which may decrease the glass forming ability of the melt. In embodiments, the glass composition may contain zirconia ($ZrO_2$) in an amount from greater than or equal to 0.0 mol. % to less than or equal to 20.0 mol. % and all ranges and sub-ranges between the foregoing values.

In some embodiments, the glass composition may contain $ZrO_2$ in an amount greater than or equal to 0.0 mol. %, greater than or equal to 1.0 mol. %, greater than or equal to 2.5 mol. %, greater than or equal to 4.0 mol. %, greater than or equal to 5.0 mol. %, greater than or equal to 5.3 mol. %, greater than or equal to 5.6 mol. %, greater than or equal to 6.5 mol. %, greater than or equal to 6.8 mol. %, greater than or equal to 10.0 mol. %, greater than or equal to 14.0 mol. %, greater than or equal to 16.0 mol. %, or greater than or equal to 18.0 mol. %. In some other embodiments, the glass composition may contain $ZrO_2$ in an amount less than or equal to 20.0 mol. %, less than or equal to 18.0 mol. %, less than or equal to 16.0 mol. %, less than or equal to 14.0 mol. %, less than or equal to 13.5 mol. %, less than or equal to 10.0 mol. %, less than or equal to 9.0 mol. %, less than or equal to 8.1 mol. %, less than or equal to 8.0 mol. %, less than or equal to 7.8 mol. %, or less than or equal to 5.0 mol. %. In some more embodiments, the glass composition may contain $ZrO_2$ in an amount greater than or equal to 0.0 mol. % and less than or equal to 10.0 mol. %, greater than or equal to 1.0 mol. % and less than or equal to 13.5 mol. %, greater than or equal to 2.5 mol. % and less than or equal to 20.0 mol. %, greater than or equal to 4.0 mol. % and less than or equal to 9.0 mol. %, greater than or equal to 5.3 mol. % and less than or equal to 8.1 mol. %, greater than or equal to 5.6 mol. % and less than or equal to 8.0 mol. %, greater than or equal to 6.5 mol. % and less than or equal to 8.0 mol. %, greater than or equal to 6.8 mol. % and less than or equal to 7.79 mol. %, greater than or equal to 0.0 mol. % and less than or equal to 20.0 mol. %, greater than or equal to 0.0 mol. % and less than or equal to 5.0 mol. %, greater than or equal to 1.0 mol. % and less than or equal to 5.0 mol. %, greater than or equal to 2.5 mol. % and less than or equal to 5.0 mol. %, greater than or equal to 4.0 mol. % and less than or equal to 20.0 mol. %, greater than or equal to 4.0 mol. % and less than or equal to 5.0 mol. %, greater than or equal to 5.6 mol. % and less than or equal to 20.0 mol. %, greater than or equal to 5.6 mol. % and less than or equal to 7.8 mol. %.

Glass composition may include niobia ($Nb_2O_5$). Niobia can be used to increase the refractive index of glass while maintaining a low density. However, niobia can introduce a yellow coloring to the glass that cannot be bleached in the same manner as titania, which can result in a loss of transmittance in the blue and UV range. Niobia may cause crystallization and/or phase separation of the melt. In some embodiments, the glasses may be substantially free of $Nb_2O_5$. In embodiments, the glass composition may contain niobia ($Nb_2O_5$) in an amount from greater than or equal to 0.0 mol. % to less than or equal to 70.0 mol. % and all ranges and sub-ranges between the foregoing values. In some embodiments, the glass composition may contain $Nb_2O_5$ in an amount greater than or equal to 0.0 mol. %, greater than or equal to 0.5 mol. %, greater than or equal to 2.5 mol. %, greater than or equal to 4.5 mol. %, greater than or equal to 5.0 mol. %, greater than or equal to 6.79 mol. %, greater than or equal to 10.0 mol. %, greater than or equal to 40.0 mol. %, greater than or equal to 50.0 mol. %, or greater than or equal to 60.0 mol. %. In some other embodiments, the glass composition may contain $Nb_2O_5$ in an amount less than or equal to 70.0 mol. %, less than or equal to 60.0 mol. %, less than or equal to 50.0 mol. %, less than or equal to 40.0 mol. %, less than or equal to 30.0 mol. %, less than or equal to 10.0 mol. %, less than or equal to 9.25 mol. %, less than or equal to 8.6 mol. %, less than or equal to 7.7 mol. %, or less than or equal to 6.7 mol. %. In some more embodiments, the glass composition may contain $Nb_2O_5$ in an amount greater than or equal to 0.0 mol. % and less than or equal to 10.0 mol. %, greater than or equal to 0.5 mol. % and less than or equal to 30.0 mol. %, greater than or equal to 2.5 mol. % and less than or equal to 10.0 mol. %, greater than or equal to 4.5 mol. % and less than or equal to 9.25 mol. %, greater than or equal to 5.0 mol. % and less than or equal to 6.7 mol. %, greater than or equal to 5.1 mol. % and less than or equal to 8.6 mol. %, greater than or equal to 6.79 mol. % and less than or equal to 7.7 mol. %, greater than or equal to 0.0 mol. % and less than or equal to 70.0 mol. %, greater than or equal to 2.5 mol. % and less than or equal to 70.0 mol. %, greater than or equal to 2.5 mol. % and less than or equal to 6.7 mol. %, greater than or equal to 4.5 mol. % and less than or equal to 6.7 mol. %, greater than or equal to 6.79 mol. % and less than or equal to 70.0 mol. %, greater than or equal to 10.0 mol. % and less than or equal to 30.0 mol. %.

Glass composition may include bismuth oxide ($Bi_2O_3$). $Bi_2O_3$ provides very high refractive index but leads to increase in density. It may also decrease the viscosity of melts at high temperatures, which may cause crystallization of the melts when cooling. Accordingly, the content of bismuth oxide should be limited, or glass compositions may be free of $Bi_2O_3$. In embodiments, the glass composition may contain bismuth oxide ($Bi_2O_3$) in an amount from greater than or equal to 0.0 mol. % to less than or equal to 25.0 mol. % and all ranges and sub-ranges between the foregoing values. In some embodiments, the glass composition may contain $Bi_2O_3$ in an amount greater than or equal to 0.0 mol. %, greater than or equal to 0.1 mol. %, greater than or equal to 5.0 mol. %, greater than or equal to 10.0 mol. %, greater than or equal to 19.0 mol. %, greater than or equal to 20.0 mol. %, greater than or equal to 21.0 mol. %, or greater than or equal to 23.0 mol. %. In some other embodiments, the glass composition may contain $Bi_2O_3$ in an amount less than or equal to 25.0 mol. %, less than or equal to 23.0 mol. %, less than or equal to 21.0 mol. %, less than or equal to 20.0 mol. %, less than or equal to 19.0 mol. %, less than or equal to 10.0 mol. %, less than or equal to 9.2 mol. %, or less than or equal to 5.0 mol. %. In some more embodiments, the glass composition may contain $Bi_2O_3$ in an amount greater than or equal to 0.0 mol. % and less than or equal to 20.0 mol. %, greater than or equal to 0.1 mol. % and less than or equal to 25.0 mol. %, greater than or equal to 0.12 mol. % and less than or equal to 9.15 mol. %, greater than or equal to 0.0 mol. % and less than or equal to 25.0 mol. %, greater than or equal to 0.1 mol. % and less than or equal to 5.0 mol. %, greater than or equal to 5.0 mol. % and less than or equal to 9.2 mol. %, greater than or equal to 19.0 mol. % and less than or equal to 20.0 mol. %.

Glass composition may include titania ($TiO_2$). The levels of $TiO_2$ and/or $Nb_2O_5$ that are typically used in glasses to increase refractive index tend to decrease the transmittance in the near-UV region and shift the UV cut-off to higher wavelengths. Accordingly, the amount of $TiO_2$ is limited. In embodiments, the glass composition may contain titania ($TiO_2$) in an amount from greater than or equal to 0.0 mol. % to less than or equal to 39.1 mol. % and all ranges and sub-ranges between the foregoing values. In some embodiments, the glass composition may contain $TiO_2$ in an amount greater than or equal to 0.0 mol. %, greater than or equal to 0.3 mol. %, greater than or equal to 5.0 mol. %, greater than or equal to 12.0 mol. %, greater than or equal to 15.0 mol. %, greater than or equal to 20.0 mol. %, greater than or equal to 20.25 mol. %, greater than or equal to 22.0 mol. %, greater than or equal to 23.7 mol. %, greater than or equal to 24.1 mol. %, greater than or equal to 29.1 mol. %, or greater than or equal to 34.1 mol. %. In some other embodiments, the glass composition may contain $TiO_2$ in an amount less than or equal to 39.1 mol. %, less than or equal to 35.0 mol. %, less than or equal to 34.1 mol. %, less than or equal to 31.4 mol. %, less than or equal to 29.1 mol. %, less than or equal to 27.5 mol. %, less than or equal to 26.0 mol. %, less than or equal to 25.5 mol. %, less than or equal to 25.0 mol. %, less than or equal to 24.1 mol. %, less than or equal to 20.0 mol. %, or less than or equal to 5.0 mol. %. In some more embodiments, the glass composition may contain $TiO_2$ in an amount greater than or equal to 0.3 mol. % and less than or equal to 35.0 mol. %, greater than or equal to 12.0 mol. % and less than or equal to 35.0 mol. %, greater than or equal to 15.0 mol. % and less than or equal to 35.0 mol. %, greater than or equal to 20.0 mol. % and less than or equal to 27.5 mol. %, greater than or equal to 20.25 mol. % and less than or equal to 26.0 mol. %, greater than or equal to 20.25 mol. % and less than or equal to 25.5 mol. %, greater than or equal to 22.0 mol. % and less than or equal to 25.0 mol. %, greater than or equal to 23.7 mol. % and less than or equal to 31.35 mol. %, greater than or equal to 0.0 mol. % and less than or equal to 39.1 mol. %, greater than or equal to 0.0 mol. % and less than or equal to 5.0 mol. %, greater than or equal to 0.3 mol. % and less than or equal to 5.0 mol. %, greater than or equal to 12.0 mol. % and less than or equal to 39.1 mol. %, greater than or equal to 12.0 mol. % and less than or equal to 20.0 mol. %, greater than or equal to 15.0 mol. % and less than or equal to 20.0 mol. %, greater than or equal to 20.0 mol. % and less than or equal to 24.1 mol. %, greater than or equal to 20.25 mol. % and less than or equal to 24.1 mol. %.

Glass composition may include fluorine (F). Adding fluorine to a glass composition is known to provide lower optical dispersion, which may improve the image quality. Also, fluorine can in some cases decrease the liquidus temperature, preventing a glass article from crystallization when cooling the melt. However, fluorine may raise ecological concerns. For that reason, the content of fluorine is limited, or glasses are free of fluorine. In embodiments, the glass composition may contain fluorine (F) in an amount from greater than or equal to 0.0 at. % to less than or equal to 2.0 at. % and all ranges and sub-ranges between the foregoing values. In some other embodiments, the glass composition may contain F in an amount less than or equal to 2.0 at. %, less than or equal to 1.0 at. %, or less than or equal to 0.1 at. %. In some more embodiments, the glass composition may contain F in an amount greater than or equal to 0.0 at. % and less than or equal to 2.0 at. %, greater than or equal to 0.0 at. % and less than or equal to 0.1 at. %.

In some embodiments, the glass composition may have a sum of $La_2O_3+TiO_2+B_2O_3+SiO_2+ZrO_2+Nb_2O_5$ greater than or equal to 97.0 mol. %, greater than or equal to 98.0 mol. %, or greater than or equal to 99.0 mol. %. In some more embodiments, the glass composition may have a sum of $La_2O_3+TiO_2+B_2O_3+SiO_2+ZrO_2+Nb_2O_5$ greater than or equal to 97.0 mol. % and less than or equal to 100 mol. %.

In some embodiments, the glass composition may have a sum of $La_2O_3+TiO_2+B_2O_3+SiO_2+ZrO_2+Nb_2O_5+BaO+Y_2O_3+CaO+Ga_2O_3+Gd_2O_3+ZnO+WO_3+CeO_2+SrO+Na_2O+Ta_2O_5+Al_2O_3$ greater than or equal to 99.0 mol. %, or greater than or equal to 99.5 mol. %. In some more embodiments, the glass composition may have a sum of $La_2O_3+TiO_2+B_2O_3+SiO_2+ZrO_2+Nb_2O_5+BaO+Y_2O_3+CaO+Ga_2O_3+Gd_2O_3+ZnO+WO_3+CeO_2+SrO+Na_2O+Ta_2O_5+Al_2O_3$ greater than or equal to 99.0 mol. % and less than or equal to 100 mol. %.

In some embodiments, the glass composition may have a sum of $La_2O_3+Y_2O_3+Gd_2O_3+TiO_2+B_2O_3+SiO_2+ZrO_2+$ $Nb_2O_5$ greater than or equal to 99.0 mol. %, or greater than or equal to 99.5 mol. %. In some more embodiments, the glass composition may have a sum of $La_2O_3+Y_2O_3+Gd_2O_3+TiO_2+B_2O_3+SiO_2+ZrO_2+Nb_2O_5$ greater than or equal to 99.0 mol. % and less than or equal to 100 mol. %.

In some embodiments, the glass composition may have a sum of $La_2O_3+Y_2O_3+Gd_2O_3+TiO_2+B_2O_3+SiO_2+ZrO_2+Nb_2O_5+CaO+BaO$ greater than or equal to 99.0 mol. %, or greater than or equal to 99.5 mol. %. In some more embodiments, the glass composition may have a sum of $La_2O_3+Y_2O_3+Gd_2O_3+TiO_2+B_2O_3+SiO_2+ZrO_2+Nb_2O_5+CaO+BaO$ greater than or equal to 99.0 mol. % and less than or equal to 100 mol. %.

In some embodiments, the glass composition may have a sum of $R_2O+RO$ greater than or equal to 0.0 mol. %, greater than or equal to 2.5 mol. %, or greater than or equal to 5.0 mol. %. In some other embodiments, the glass composition may have a sum of $R_2O+RO$ less than or equal to 6.0 mol. %, less than or equal to 5.0 mol. %, less than or equal to 2.5 mol. %, or less than or equal to 1.0 mol. %. In some more embodiments, the glass composition may have a sum of $R_2O+RO$ greater than or equal to 0.0 mol. % and less than or equal to 6.0 mol. %, greater than or equal to 0.0 mol. % and less than or equal to 1.0 mol. %, greater than or equal to 0.0 mol. % and less than or equal to 5.0 mol. %, greater than or equal to 0.0 mol. % and less than or equal to 2.5 mol. %, greater than or equal to 2.5 mol. % and less than or equal to 6.0 mol. %, or greater than or equal to 2.5 mol. % and less than or equal to 5.0 mol. %.

In some embodiments, the glass composition may have a sum of $RE_mO_n+WO_3+ZrO_2$ greater than or equal to 0.0 mol. %, greater than or equal to 4.5 mol. %, greater than or equal to 5.0 mol. %, greater than or equal to 20.0 mol. %, or greater than or equal to 32.0 mol. %. In some other embodiments, the glass composition may have a sum of $RE_mO_n+WO_3+ZrO_2$ less than or equal to 36.0 mol. % or less than or equal to 20.0 mol. %. In some more embodiments, the glass composition may have a sum of $RE_mO_n+WO_3+ZrO_2$ greater than or equal to 0.0 mol. % and less than or equal to 36.0 mol. %, or greater than or equal to 0.0 mol. % and less than or equal to 20.0 mol. %, greater than or equal to 4.5 mol. % and less than or equal to 36.0 mol. %, or greater than or equal to 4.5 mol. % and less than or equal to 20.0 mol. %, greater than or equal to 5.0 mol. % and less than or equal to 36.0 mol. %, or greater than or equal to 5.0 mol. % and less than or equal to 20.0 mol. %.

In some embodiments, the glass composition may have a sum of $SiO_2+B_2O_3$ greater than or equal to 0.0 mol. %, or greater than or equal to 10.0 mol. %.

In some embodiments, the glass composition may have a sum of $SiO_2+Y_2O_3+Gd_2O_3$ greater than or equal to 0.0 mol. %, greater than or equal to 0.3 mol. %, greater than or equal to 8.7 mol. %, or greater than or equal to 10.0 mol. %. In some other embodiments, the glass composition may have a sum of $SiO_2+Y_2O_3+Gd_2O_3$ less than or equal to 15.9 mol. % or less than or equal to 10.0 mol. %. In some more embodiments, the glass composition may have a sum of $SiO_2+Y_2O_3+Gd_2O_3$ greater than or equal to 0.0 mol. % and less than or equal to 15.9 mol. %, or greater than or equal to 0.0 mol. % and less than or equal to 10.0 mol. %, greater than or equal to 0.3 mol. % and less than or equal to 15.9 mol. %, or greater than or equal to 0.3 mol. % and less than or equal to 10.0 mol. %, greater than or equal to 8.7 mol. % and less than or equal to 15.9 mol. %.

In some embodiments, the glass composition may have a sum of $TiO_2+Nb_2O_5$ greater than or equal to 0.0 mol. %, greater than or equal to 8.5 mol. %, greater than or equal to 20.0 mol. %, greater than or equal to 25.0 mol. %, or greater than or equal to 40.0 mol. %. In some other embodiments, the glass composition may have a sum of $TiO_2+Nb_2O_5$ less than or equal to 42.0 mol. %, less than or equal to 40.0 mol. %, less than or equal to 38.0 mol. %, or less than or equal to 20.0 mol. %. In some more embodiments, the glass composition may have a sum of $TiO_2+Nb_2O_5$ greater than or equal to 0.0 mol. % and less than or equal to 42.0 mol. %, greater than or equal to 0.0 mol. % and less than or equal to 40.0 mol. %, greater than or equal to 0.0 mol. % and less than or equal to 38.0 mol. %, or greater than or equal to 0.0 mol. % and less than or equal to 20.0 mol. %, greater than or equal to 8.5 mol. % and less than or equal to 42.0 mol. %, greater than or equal to 8.5 mol. % and less than or equal to 40.0 mol. %, greater than or equal to 8.5 mol. % and less than or equal to 38.0 mol. %, or greater than or equal to 8.5 mol. % and less than or equal to 20.0 mol. %, greater than or equal to 20.0 mol. % and less than or equal to 42.0 mol. %, greater than or equal to 20.0 mol. % and less than or equal to 40.0 mol. %, or greater than or equal to 20.0 mol. % and less than or equal to 38.0 mol. %, greater than or equal to 25.0 mol. % and less than or equal to 42.0 mol. %, greater than or equal to 25.0 mol. % and less than or equal to 40.0 mol. %, or greater than or equal to 25.0 mol. % and less than or equal to 38.0 mol. %.

In some embodiments, the glass composition may have a sum of $TiO_2+Nb_2O_5+La_2O_3$ greater than or equal to 0.0 mol. %, greater than or equal to 10.0 mol. %, greater than or equal to 45.0 mol. %, or greater than or equal to 50.0 mol. %. In some other embodiments, the glass composition may have a sum of $TiO_2+Nb_2O_5+La_2O_3$ less than or equal to 70.0 mol. %, less than or equal to 63.0 mol. %, or less than or equal to 50.0 mol. %. In some more embodiments, the glass composition may have a sum of $TiO_2+Nb_2O_5+La_2O_3$ greater than or equal to 10.0 mol. % and less than or equal to 70.0 mol. %, greater than or equal to 0.0 mol. % and less than or equal to 70.0 mol. %, greater than or equal to 0.0 mol. % and less than or equal to 63.0 mol. %, or greater than or equal to 0.0 mol. % and less than or equal to 50.0 mol. %, greater than or equal to 10.0 mol. % and less than or equal to 63.0 mol. %, or greater than or equal to 10.0 mol. % and less than or equal to 50.0 mol. %, greater than or equal to 45.0 mol. % and less than or equal to 70.0 mol. %, greater than or equal to 45.0 mol. % and less than or equal to 63.0 mol. %, or greater than or equal to 45.0 mol. % and less than or equal to 50.0 mol. %.

In some other embodiments, the glass composition may have a sum of $V_2O_5+MoO_3$ less than or equal to 3.0 mol. %, less than or equal to 2.0 mol. %, or less than or equal to 1.0 mol. %. In some more embodiments, the glass composition may have a sum of $V_2O_5+MoO_3$ greater than or equal to 0.0 mol. % and less than or equal to 3.0 mol. %, greater than or equal to 0.0 mol. % and less than or equal to 2.0 mol. %, or greater than or equal to 0.0 mol. % and less than or equal to 1.0 mol. %.

In some embodiments, the glass composition may have a sum of $WO_3+Bi_2O_3$ greater than or equal to 0.0 mol. %, or greater than or equal to 5.0 mol. %. In some other embodiments, the glass composition may have a sum of $WO_3+Bi_2O_3$ less than or equal to 7.0 mol. % or less than or equal to 5.0 mol. %. In some more embodiments, the glass composition may have a sum of $WO_3+Bi_2O_3$ greater than or equal to 0.0 mol. % and less than or equal to 7.0 mol. %, or greater than or equal to 0.0 mol. % and less than or equal to 5.0 mol. %.

In some embodiments, the glass composition may have a sum of $ZrO_2+HfO_2$ greater than or equal to 0.0 mol. %, or greater than or equal to 1.0 mol. %.

In some embodiments, the glass composition may have a sum of $SiO_2+B_2O_3+P_2O_5$ greater than or equal to 10.0 mol. %, greater than or equal to 20.0 mol. %, greater than or equal to 26.0 mol. %, or greater than or equal to 30.0 mol. %. In some other embodiments, the glass composition may have a sum of $SiO_2+B_2O_3+P_2O_5$ less than or equal to 31.0 mol. %, less than or equal to 30.0 mol. %, or less than or equal to 20.0 mol. %. In some more embodiments, the glass composition may have a sum of $SiO_2+B_2O_3+P_2O_5$ greater than or equal to 10.0 mol. % and less than or equal to 31.0 mol. %, greater than or equal to 10.0 mol. % and less than or equal to 30.0 mol. %, or greater than or equal to 10.0 mol. % and less than or equal to 20.0 mol. %, greater than or equal to 20.0 mol. % and less than or equal to 31.0 mol. %, or greater than or equal to 20.0 mol. % and less than or equal to 30.0 mol. %, greater than or equal to 26.0 mol. % and less than or equal to 31.0 mol. %, or greater than or equal to 26.0 mol. % and less than or equal to 30.0 mol. %.

In some embodiments, glass composition may have limitations for $SiO_2+B_2O_3-P_2O_5$. The difference $(SiO_2+B_2O_3-P_2O_5)$ indicates the primary glass formers. If this difference is positive, $B_2O_3$ and/or $SiO_2$ may be used as primary glassformer(s); if the difference is negative then the primary glass former may be $P_2O_5$. In preferred embodiments of the present disclosure, the difference $(SiO_2+B_2O_3-P_2O_5)$ is zero or positive. In some embodiments, the glass may have a difference $SiO_2+B_2O_3-P_2O_5$ greater than or equal to 0 mol. %, greater than or equal to 0.1 mol. %, greater than or equal to 1.0 mol. %, greater than or equal to 10.0 mol. %, greater than or equal to 20.0 mol. %, greater than or equal to 26.0 mol. %, or greater than or equal to 30.0 mol. %. In some other embodiments, the glass may have a difference $SiO_2+B_2O_3-P_2O_5$ less than or equal to 31.0 mol. %, less than or equal to 30.0 mol. %, less than or equal to 20.0 mol. %, or less than or equal to 10.0 mol. %. In some more embodiments, the glass may have a difference $SiO_2+B_2O_3-P_2O_5$ greater than or equal to 0 mol. % and less than or equal to 31.0 mol. %, greater than or equal to 0 mol. % and less than or equal to 30.0 mol. %, greater than or equal to 0 mol. % and less than or equal to 20.0 mol. %, or greater than or equal to 0 mol. % and less than or equal to 10.0 mol. %, greater than or equal to 0.1 mol. % and less than or equal to 31.0 mol. %, greater than or equal to 0.1 mol. % and less than or equal to 30.0 mol. %, greater than or equal to 0.1 mol. % and less than or equal to 20.0 mol. %, or greater than or equal to 0.1 mol. % and less than or equal to 10.0 mol. %, greater than or equal to 1.0 mol. % and less than or equal to 31.0 mol. %, greater than or equal to 1.0 mol. % and less than or equal to 30.0 mol. %, greater than or equal to 1.0 mol. % and less than or equal to 20.0 mol. %, or greater than or equal to 1.0 mol. % and less than or equal to 10.0 mol. %, greater than or equal to 10.0 mol. % and less than or equal to 31.0 mol. %, greater than or equal to 10.0 mol. % and less than or equal to 30.0 mol. %, or greater than or equal to 10.0 mol. % and less than or equal to 20.0 mol. %, greater than or equal to 20.0 mol. % and less than or equal to 31.0 mol. %, or greater than or equal to 20.0 mol. % and less than or equal to 30.0 mol. %.

In some embodiments, glass composition may have limitations for a ratio $SiO_2/(SiO_2+B_2O_3)$. It has been empirically found that $SiO_2$ and $B_2O_3$, when being presented together in a glass composition, may improve the glass forming ability of a melt and protect it from the liquid-liquid phase separation. Higher values of the ratio $SiO_2/(SiO_2+B_2O_3)$ may help to improve the chemical durability, whereas lower values of this ratio may improve the solubility of the high index components. In some embodiments, the glass may have a ratio $SiO_2/(SiO_2+B_2O_3)$ mol. % greater than or equal to 0.0, greater than or equal to 0.38, or greater than or equal to 0.5. In some other embodiments, the glass may have a ratio $SiO_2/(SiO_2+B_2O_3)$ mol. % less than or equal to 0.75, less than or equal to 0.5, or less than or equal to 0.4. In some more embodiments, the glass may have a ratio $SiO_2/(SiO_2+B_2O_3)$ mol. % greater than or equal to 0.0 and less than or equal to 0.4, greater than or equal to 0.38 and less than or equal to 0.75, greater than or equal to 0.0 and less than or equal to 0.75, greater than or equal to 0.0 and less than or equal to 0.5, greater than or equal to 0.38 and less than or equal to 0.5, or greater than or equal to 0.38 and less than or equal to 0.4.

In some embodiments, glass composition may have limitations for a ratio $TiO_2/(TiO_2+Nb_2O_5+WO_3+Bi_2O_3)$. The ratio $TiO_2/(TiO_2+Nb_2O_5+WO_3+Bi_2O_3)$ determines the mole fraction of $TiO_2$ in a total sum of components that provide highest refractive indexes. When the ratio $TiO_2/(TiO_2+Nb_2O_5+WO_3+Bi_2O_3)$ is too low, it may be difficult to reach low density at high refractive index. When the ratio $TiO_2/(TiO_2+Nb_2O_5+WO_3+Bi_2O_3)$ is too high, the glass melt may tend to phase separation or crystallization when cooling, or provide undesirable coloring that may decrease blue transmittance. Typically, a higher ratio $TiO_2/(TiO_2+Nb_2O_5+WO_3+Bi_2O_3)$ indicates a potentially higher refractive index at a given density, but lower blue transmittance. Accordingly, in some embodiments of the present disclosure it may be desirable to reach higher refractive indexes at a given ratio $TiO_2/(TiO_2+Nb_2O_5+WO_3+Bi_2O_3)$. In some embodiments, the glass may have a ratio $TiO_2/(TiO_2+Nb_2O_5+WO_3+Bi_2O_3)$ mol. % greater than or equal to 0.05, or greater than or equal to 0.5. In some other embodiments, the glass may have a ratio $TiO_2/(TiO_2+Nb_2O_5+WO_3+Bi_2O_3)$ mol. % less than or equal to 0.8 or less than or equal to 0.5. In some more embodiments, the glass may have a ratio $TiO_2/(TiO_2+Nb_2O_5+WO_3+Bi_2O_3)$ mol. % greater than or equal to 0.05 and less than or equal to 0.8, or greater than or equal to 0.05 and less than or equal to 0.5.

In some embodiments, glass composition may have limitations for a ratio $La_2O_3/TiO_2$. The $La_2O_3/TiO_2$ ratio refers to two primary high index components, $TiO_2$ and $La_2O_3$. When the ratio $La_2O_3/TiO_2$ is low, the glass may have lower density, but also lower blue transmittance. When the ratio $La_2O_3/TiO_2$ is high, the glass may have higher blue transmittance, but also higher density. Also, if the ratio $La_2O_3/TiO_2$ is very high or very low, in some cases the glass melt may tend to phase separation. Accordingly, in some embodiments of the present disclosure, the ratio $La_2O_3/TiO_2$ may be limited. In some embodiments, the glass may have a ratio $La_2O_3/TiO_2$ greater than or equal to 0.75 mol. %, or greater than or equal to 1.2 mol. %. In some other embodiments, the glass may have a ratio $La_2O_3/TiO_2$ less than or equal to 1.5 mol. %, less than or equal to 1.2 mol. %, or less than or equal to 0.94 mol. %. In some more embodiments, the glass may have a ratio $La_2O_3/TiO_2$ greater than or equal to 0.75 mol. % and less than or equal to 1.5 mol. %, greater than or equal to 0.75 mol. % and less than or equal to 1.2 mol. %, or greater than or equal to 0.75 mol. % and less than or equal to 0.94 mol. %.

In some embodiments, the glass may have a refractive index at 587.56 nm $n_d$ from greater than or equal to 1.950 to less than or equal to 2.150 and all ranges and sub-ranges between the foregoing values. In some embodiments, the glass may have a refractive index at 587.56 nm $n_d$ greater than or equal to 1.950, greater than or equal to 2.000, greater than or equal to 2.025, greater than or equal to 2.045, greater than or equal to 2.050, greater than or equal to 2.058, greater than or equal to 2.100, greater than or equal to 2.120, or greater than or equal to 2.140. In some other embodiments, the glass may have a refractive index at 587.56 nm $n_d$ less than or equal to 2.150, less than or equal to 2.140, less than or equal to 2.120, less than or equal to 2.100, less than or equal to 2.070, less than or equal to 2.050, or less than or equal to 2.000. In some more embodiments, the glass may have a refractive index at 587.56 nm $n_d$ greater than or equal to 1.950 and less than or equal to 2.070, greater than or equal to 1.950 and less than or equal to 2.150, greater than or equal to 1.950 and less than or equal to 2.000, greater than or equal to 2.000 and less than or equal to 2.050, greater than or equal to 2.025 and less than or equal to 2.050, greater than or equal to 2.050 and less than or equal to 2.070, greater than or equal to 2.058 and less than or equal to 2.070.

In some embodiments, the glass may have a density at room temperature $d_{RT}$ from greater than or equal to 4.50 g/cm³ to less than or equal to 5.50 g/cm³ and all ranges and sub-ranges between the foregoing values. In some embodiments, the glass may have a density at room temperature $d_{RT}$ greater than or equal to 4.50 g/cm³, greater than or equal to 4.90 g/cm³, greater than or equal to 5.20 g/cm³, greater than or equal to 5.30 g/cm³, or greater than or equal to 5.40 g/cm³. In some other embodiments, the glass may have a density at room temperature $d_{RT}$ less than or equal to 5.50 g/cm³, less than or equal to 5.40 g/cm³, less than or equal to 5.30 g/cm³, less than or equal to 5.20 g/cm³, or less than or equal to 4.90 g/cm³. In some more embodiments, the glass may have a density at room temperature $d_{RT}$ greater than or equal to 4.50 g/cm³ and less than or equal to 5.50 g/cm³, greater than or equal to 4.50 g/cm³ and less than or equal to 4.90 g/cm³, greater than or equal to 4.90 g/cm³ and less than or equal to 5.50 g/cm³, greater than or equal to 4.90 g/cm³ and less than or equal to 5.20 g/cm³, greater than or equal to 5.20 g/cm³ and less than or equal to 5.50 g/cm³, greater than or equal to 5.20 g/cm³ and less than or equal to 5.30 g/cm³, greater than or equal to 5.30 g/cm³ and less than or equal to 5.50 g/cm³, greater than or equal to 5.30 g/cm³ and less than or equal to 5.40 g/cm³.

In some embodiments, the glass may have a liquidus temperature $T_{liq}$ less than or equal to 1260° C.

In some embodiments, the glass, when having a thickness of 10 mm, may have a transmittance at a wavelength of 460 nm $TX_{460\ nm}$, % greater than or equal to 70.

In some embodiments, the glass may have a quantity $n_d - (1.765 + 0.057 * d_{RT})$ greater than or equal to 0.000.

In some embodiments, the glass may have a quantity $n_d - (1.99 + 0.083 * (TiO_2/(TiO_2 + Nb_2O_5 + WO_3 + Bi_2O_3)))$ greater than or equal to 0.000.

In some embodiments, the glass may have a quantity $n_d - (2.005 + 0.083 * (TiO_2/(TiO_2 + Nb_2O_5 + WO_3 + Bi_2O_3)))$ greater than or equal to 0.000.

Refractive index $n_d$ and density $d_{RT}$ are properties of glass that can be predicted from the glass composition. A linear regression analysis of the Exemplary Glasses of the present disclosure in the EXAMPLES section below and other glass compositions reported in the literature was performed to determine equations that can predict the composition dependences of the refractive index $n_d$ and the density $d_{RT}$.

The training dataset of glass compositions satisfying the compositional limitations specified in Table 1 below and having measured values of the properties of interest ($n_d$ and $d_{RT}$), about 100 glass compositions for each property ($n_d$ and $d_{RT}$), were randomly selected from literature data presented in the publicly available SciGlass Information System database and from the Exemplary Glasses from the embodiments presented herein. The linear regression analysis on the above-specified dataset, with the exclusion of outliers, was used to determine the formulas (I) and (II) presented in Table 2 below for predictive parameters $P_n$ and $P_d$ that predict $n_d$ and $d_{RT}$, respectively. Another subset of glass compositions satisfying the compositional limitations of Table 1 was used as a validation set to evaluate the ability to interpolate within the compositional limitations of Table 1 and was used to establish to the standard deviations specified in the Table 2 for the predictive parameters $P_n$ and $P_d$. An external dataset of prior art glass compositions, also randomly selected from the SciGlass Information System database, was used to evaluate the ability to predict the properties ($n_d$ and $d_{RT}$) outside of the compositional limits of Table 1 with reasonable accuracy. Multiple iterations of this process were performed in order to determine the best formula for each property ($n_d$ and $d_{RT}$). Formulas (I) and (II) in Table 2 are the result of the analysis.

The data for the Comparative Glass compositions used in the linear regression modeling, including the training dataset, validation dataset and external dataset were obtained from the publically available SciGlass Information System database. Formulas (I) and (II) below were obtained from the linear regression analysis:

$$\begin{aligned} P_n = {} & 1.844 + 0.0054162*La_2O_3 + 0.0031113*TiO_2 - \\ & 0.004212*B_2O_3 - 0.0035692*SiO_2 + \\ & 0.0027887*ZrO_2 + 0.0078026*Nb_2O_5 - \\ & 0.00012928*CaO + 0.00076566*BaO + \\ & 0.0043601*Y_2O_3 + 0.00067408*ZnO + \\ & 0.0068029*Gd_2O_3 - 0.0025106*Na_2O + \\ & 0.0039937*WO_3 - 0.0043208*Al_2O_3 - \\ & 0.0011666*Li_2O + 0.0051227*PbO + \\ & 0.012958*Bi_2O_3 - 0.0018753*GeO_2 - \\ & 0.0014084*TeO_2 + 0.0086647*Er_2O_3 + \\ & 0.0097345*Yb_2O_3 - 0.0038734*K_2O - \\ & 0.00041776*SrO - 0.0017294*MgO, \end{aligned} \tag{I}$$

$$\begin{aligned} P_d = {} & 4.688 + 0.047868*La_2O_3 - 0.0065829*TiO_2 - \\ & 0.027601*B_2O_3 - 0.022365*SiO_2 + \\ & 0.016475*ZrO_2 - 0.0052977*Nb_2O_5 - \\ & 0.0030466*CaO + 0.014971*BaO + \\ & 0.019511*Y_2O_3 + 0.0076377*ZnO + \\ & 0.066160*Gd_2O_3 - 0.016932*Na_2O + \\ & 0.025764*WO_3 - 0.035116*Al_2O_3 - \\ & 0.0094315*Li_2O + 0.047388*PbO + \\ & 0.080813*Bi_2O_3 - 0.0088118*GeO_2 + \\ & 0.072296*Er_2O_3 + 0.078888*Yb_2O_3 - \\ & 0.026242*K_2O + 0.010351*SrO - \\ & 0.0030424*MgO. \end{aligned} \tag{II}$$

In Formulas (I) and (II) and Tables 1 and 2, $P_n$ is a predictive parameter that predicts the refractive index at 587.56 nm, $n_d$, calculated from the components of the glass composition expressed in mol. %, and $P_d$ is a predictive parameter that predicts the density at room temperature, $d_{RT}$, calculated from the components of the glass composition expressed in mol. %.

In Formulas (I) and (II), each component of the glass composition is listed in terms of its chemical formula, where the chemical formula refers to the concentration of the component expressed in mol. %. For example, for purposes of Formulas (I) and (II), $La_2O_3$ refers to the concentration of $La_2O_3$, expressed in mol. %, in the glass composition. It is understood that not all components listed in Formulas (I) and (II) are necessarily present in a particular glass composition and that Formulas (I) and (II) are equally valid for glass compositions that contain less than all of the components listed in the formulas. It is further understood that Formulas (I) and (II) are also valid for glass compositions within the scope and claims of the present disclosure that contain components in addition to the components listed in the formulas. If a component listed in Formulas (I) and (II) is absent in a particular glass composition, the concentration of the component in the glass composition is 0 mol. % and the contribution of the component to the value calculated from the formulas is zero.

TABLE 1

Composition Space Used for Modeling

| | $n_d$ | | $d_{RT}$, g/cm³ | |
|---|---|---|---|---|
| Property Component limits | Min, mol. % | Max, mol. % | Min, mol. % | Max, mol. % |
| La₂O₃ | 10 | 40 | 10 | 40 |
| TiO₂ | 10 | 40 | 10 | 40 |
| B₂O₃ | 10 | 30 | 10 | 30 |
| SiO₂ | 0 | 20 | 0 | 20 |
| ZrO₂ | 0 | 10 | 0 | 10 |
| Nb₂O₅ | 0 | 15 | 0 | 15 |
| CaO | 0 | 15 | 0 | 15 |
| BaO | 0 | 10 | 0 | 10 |
| Y₂O₃ | 0 | 10 | 0 | 10 |
| ZnO | 0 | 10 | 0 | 10 |
| Gd₂O₃ | 0 | 10 | 0 | 10 |
| Na₂O | 0 | 10 | 0 | 10 |
| WO₃ | 0 | 15 | 0 | 15 |
| Al₂O₃ | 0 | 10 | 0 | 10 |
| Li₂O | 0 | 8 | 0 | 8 |
| F | 0 | 0.5 [at. %] | 0 | 2 [at. %] |
| Bi₂O₃ | Not limited | Not limited | 0 | 25 |
| Other species | 0 | Not limited | 0 | Not limited |

TABLE 2

Property prediction models

| Property | Abbreviation | Unit | Predicting Parameter | Regression Formula | Composition Unit | Standard Deviation |
|---|---|---|---|---|---|---|
| Refractive index $n_d$ at 587.56 nm | $n_d$ | | $P_n$ | Formula (I) | Mol. % | 0.017 |
| Density at room temperature | $d_{RT}$ | g/cm³ | $P_d$ | Formula (II) | Mol. % | 0.076 |

FIG. 1 is a plot of the parameter $P_n$ calculated by Formula (I) as a function of measured refractive index $n_d$ for some Comparative Glasses ("Comp. Glasses") taken from the literature and some Exemplary Glasses ("Ex. Glasses"). As illustrated by the data in FIG. 1, the compositional dependence of the parameter $P_n$ had a standard deviation within a range of ±0.017 unit of the measured $n_d$ for the majority of glasses, which corresponds to the standard error specified in Table 2.

Figure 2:
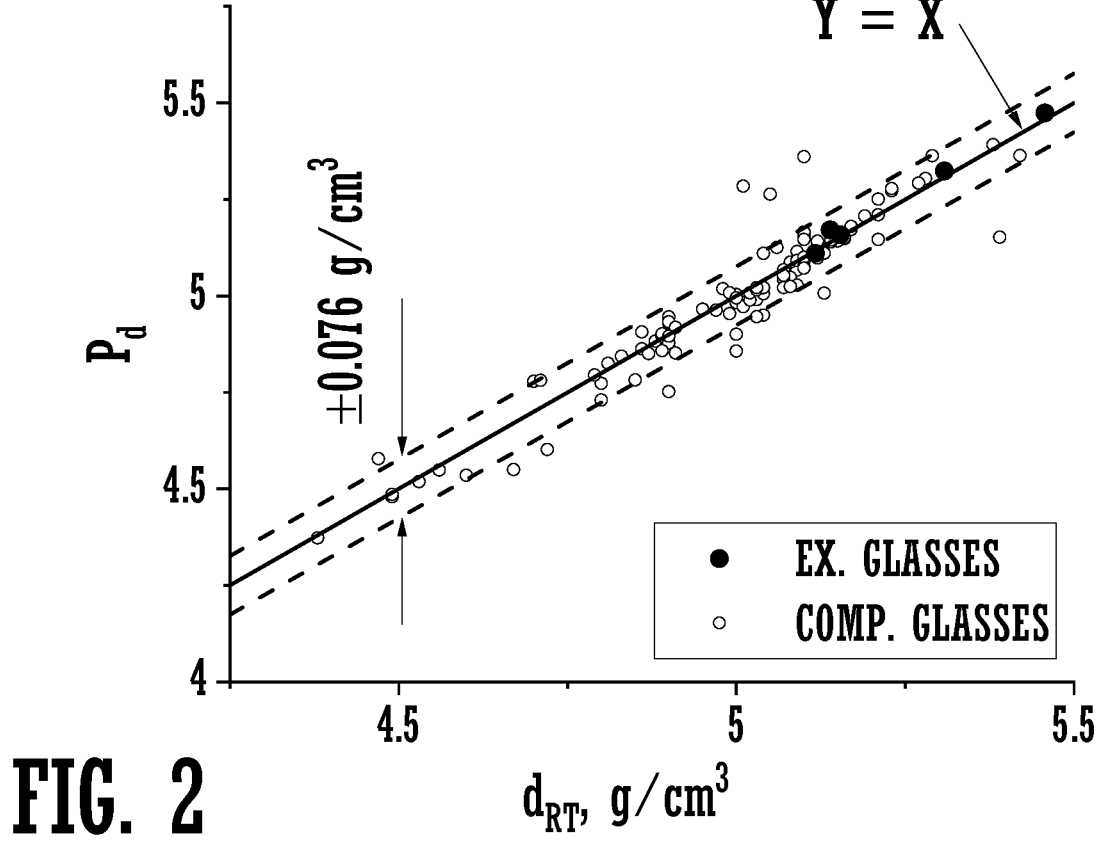
FIG. 2 is a plot illustrating the relationship between the density $d_{RT}$ and the density parameter $P_d$ calculated by formula (II) for some Comparative Glasses and some Exemplary Glasses according to an embodiment of the present disclosure.

FIG. 2 is a plot of the parameter $P_d$ calculated by Formula (II) as a function of measured density $d_{RT}$ for some Literature Glasses ("Comp. Glasses") and some Exemplary Glasses ("Ex. Glasses"). As illustrated by the data in FIG. 2, the compositional dependence of the parameter $P_d$ had a standard deviation within a range of ±0.076 unit of the measured $d_{RT}$ for the majority of glasses, which corresponds to the standard deviation specified in Table 2.

Table 3 identifies the combination of components and their respective amounts according to some embodiments of the present disclosure. The Exemplary Glasses A in Table 3 may include additional components according to any aspects of the present disclosure as described herein. In Table 3, $R_mO_n$ is a total sum of all oxides.

TABLE 3

Exemplary Glasses A

| Component | Amount (mol. %) |
|---|---|
| TiO₂ | 12.0 to 35.0 mol. % |
| ZrO₂ | 2.5 to 20.0 mol. % |
| B₂O₃ | 0.5 to 40.0 mol. % |
| Nb₂O₅ | 0.5 to 30.0 mol. % |
| Bi₂O₃ | 0.0 to 20.0 mol. % |
| P₂O₅ | 0.0 to 15.0 mol. % |
| Al₂O₃ | 0.0 to 10.0 mol. % |
| Gd₂O₃ | 0.0 to 10.0 mol. % |
| WO₃ | 0.0 to 8.0 mol. % |
| PbO | 0.0 to 5.0 mol. % |
| V₂O₅ | 0.0 to 5.0 mol. % |
| Total sum of all oxides $R_mO_n$ | ≥95.0 mol. % |
| Sum of (SiO₂ + B₂O₃ + P₂O₅) | ≥10.0 mol. % |
| Total sum of rare earth metal oxides $RE_mO_n$ | 0.5 to 35.0 mol. % |
| Sum of (TiO₂ + Nb₂O₅) | 0.0 to 42.0 mol. % |

Exemplary Glasses A according to embodiments of the present disclosure may satisfy the following condition:

$$SiO_2+B_2O_3-P_2O_5 \text{ [mol. %]} \leq 0.000,$$

where chemical formulas refer to the amounts of components in glass, expressed in mol. %.

According to some embodiments of the present disclosure, Exemplary Glasses A may also satisfy the following condition:

$$n_d-(1.765+0.057*d_{RT})>0.000,$$

where $n_d$ is a refractive index at 587.56 nm, and $d_{RT}$ is a density at room temperature.

Table 4 identifies the combination of components and their respective amounts according to some embodiments of the present disclosure. The Exemplary Glasses B in Table 4 may include additional components according to any aspects of the present disclosure as described herein. In Tables 4 and 5, $RE_mO_n$ is a total sum of all rare earth oxides

TABLE 4

Exemplary Glasses B

| Component | Amount (mol. %) |
|---|---|
| ZrO₂ | 1.0 to 13.5 mol. % |
| TiO₂ | 0.3 to 35.0 mol. % |
| B₂O₃ | 0.3 to 29.5 mol. % |
| WO₃ | 0.0 to 9.0 mol. % |
| PbO | 0.0 to 5.0 mol. % |
| Sum of (TiO₂ + Nb₂O₅ + La₂O₃) | 10.0 to 70.0 mol. % |
| Sum of (SiO₂ + B₂O₃ + P₂O₅) | ≥10.0 mol. % |
| Sum of (RE_mO_n + WO₃ + ZrO₂) | ≥5.0 mol. % |
| Sum of (SiO₂ + Y₂O₃ + Gd₂O₃) | ≥0.3 mol. % |

Exemplary Glasses B according to embodiments of the present disclosure may optionally fluorine (F) in an amount 0.0 to 2.0 at. %.

According to some embodiments of the present disclosure, Exemplary Glasses B may also satisfy the following condition:

$$TiO_2/(TiO_2+Nb_2O_5+WO_3+Bi_2O_3) \text{ [mol. \%]} \leq 0.050,$$

where chemical formulas refer to the amounts of components in glass, expressed in mol. %.

According to some embodiments of the present disclosure, Exemplary Glasses B may also satisfy the following condition:

$$SiO_2+B_2O_3-P_2O_5 \text{ [mol. \%]} \geq 1.0,$$

where chemical formulas refer to the amounts of components in glass, expressed in mol. %.

According to some embodiments of the present disclosure, Exemplary Glasses B may also satisfy the following condition:

$$La_2O_3/TiO_2 \text{ [mol. \%]} \leq 1.5,$$

where chemical formulas refer to the amounts of components in glass, expressed in mol. %.

According to some embodiments of the present disclosure, Exemplary Glasses B may also satisfy the following condition:

$$n_d-(1.99+0.083*(TiO_2/(TiO_2+Nb_2O_5+WO_3+Bi_2O_3)))> 0.000,$$

where $n_d$ is a refractive index at 587.56 nm.

According to some embodiments of the present disclosure, Exemplary Glasses B may also satisfy the following condition:

$$n_d-(2.005+0.083*(TiO_2/(TiO_2+Nb_2O_5+WO_3+Bi_2O_3)))>0.000,$$

where $n_d$ is a refractive index at 587.56 nm.

Table 5 identifies the combination of components and their respective amounts according to some embodiments of the present disclosure. The Exemplary Glasses C in Table 5 may include additional components according to any aspects of the present disclosure as described herein.

TABLE 5

| Exemplary Glasses C | |
| --- | --- |
| Component | Amount (mol. %) |
| $B_2O_3$ | 0.5 to 45.0 mol. % |
| $Bi_2O_3$ | 0.1 to 25.0 mol. % |
| $WO_3$ | 0.0 to 8.0 mol. % |
| Sum of ($SiO_2 + B_2O_3 + P_2O_5$) | $\geq 10.0$ mol. % |
| Sum of ($TiO_2 + Nb_2O_5$) | $\geq 8.5$ mol. % |
| Sum of ($RE_mO_n + WO_3 + ZrO_2$) | $\geq 4.5$ mol. % |

Exemplary Glasses C according to embodiments of the present disclosure may satisfy the following condition:

$$SiO_2+B_2O_3-P_2O_5 \text{ [mol. \%]} \leq 0.100,$$

where chemical formulas refer to the amounts of components in glass, expressed in mol. %.

According to some embodiments of the present disclosure, Exemplary Glasses C may also have a refractive index at 587.56 nm $n_d$ of greater than or equal to 2.045.

Examples

The following examples describe various features and advantages provided by the disclosure, and are in no way intended to limit the invention and appended claims.

Figure 3:
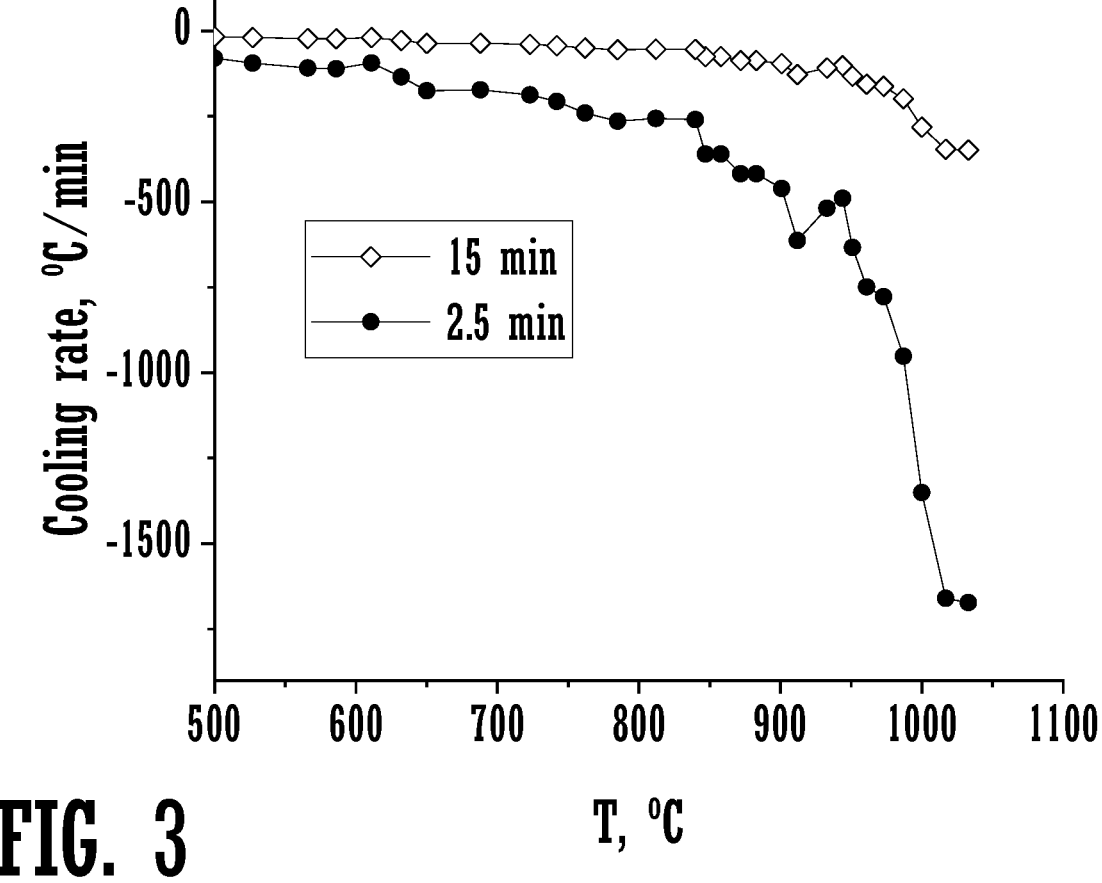
FIG. 3 is a plot of an exemplary cooling schedule according to a "15 min test" condition and a "2.5 min test" condition for some Exemplary Glasses according to an embodiment of the present disclosure.

To prepare the glass samples for some exemplary glasses of the present disclosure, about 15 grams of each sample (content of intended components in the as-batched compositions was more than 99.99 wt %) was melted from batch raw materials at a temperature of about 1300° C. in platinum or platinum-rhodium crucibles (Pt:Rh=80:20) for 1 hour. One of two controlled cooling conditions were applied. In the first condition (referred to as "15 min test" or "15 min devit test"), the cooling conditions were controlled so that it took about 15 min for the samples to cool from 1100° C. to 500° C. in air inside a furnace. In the second condition (referred to as "2.5 min test" or "2.5 min devit test"), the cooling conditions were controlled so that it took about 2.5 min for the samples to cool from 1100° C. to 500° C. in air inside a furnace. Temperature readings were obtained by direct reading of the furnace temperature or using an IR camera reading with calibration scaling. The first condition (15 min test) approximately corresponds to a cooling rate of up to 300° C./min at a temperature of 1000° C. and the second test approximately corresponds to a cooling rate of up to 600° C./min at 1000° C. The temperature of 1000° C. corresponds approximately to the temperature at which the cooling rate was expected to approach a maximum. When the temperature is lower, the cooling rate also decreases significantly. Typical schedules of the first and second cooling regimes are shown in FIG. 3. For these samples, observations referred to as "15-min devit test" and "2.5-min devit test", are specified in Table 6 below; the observation "1" is used to denote that a glass composition passed the indicated devit test, where a composition is deemed to have passed the indicated devit test if a melt of the composition forms a glass free of crystals visible under an optical microscope under magnification from 100× to 500×. The observation "0" is used to denote that a glass composition failed the indicated devit test.

To prepare other glass samples for exemplary glasses of the present disclosure, unless otherwise specified, a one kilogram batch of the components was prepared in a pure platinum crucible. The crucible was placed in a furnace set at a temperature of 1250° C., the temperature in the furnace was then raised to 1300° C. and held at 1300° C. for 2 hours. The furnace temperature was then reduced to 1250° C. and the glass was allowed to equilibrate at this temperature for an hour before being poured on a steel table and annealed at Tg for an hour.

Some sample melts were also melted in a "one liter" platinum crucible heated by the Joule effect. In this process, approximately 5000 g of raw materials (components as batched) was used. The crucible was filled with the batch components in 1.5 hours at temperatures between 1150° C. and 1250° C. Once filled, a hold at temperature between 1200° C. and 1350° C. was done for 0.5 to one hour. During this step, the glass melt was continuously stirred (20 to 60 rpm). The hold was then extended for 0.5 to one hour with the stirrer off. A conditioning step was then done at temperatures between 1050° C. and 1300° C. and the melt was allowed to equilibrate for 0.5 to 1 hour while stirring at a rate of 20 to 60 rpm. The glass was then delivered through a tube and cast on a cooled graphite table to form the glass. The glass was formed into a bar 5 to 25 mm in thick, 30 to 60 mm wide, and 40 to 90 cm long. The glass was placed at about Tg in a lehr oven for 1 hour for a rough annealing. The bars were then annealed in a static furnace for one hour at about Tg and the temperature was then lowered at 1° C./min.

Some of samples were bleached after melting to improve the transmittance. The bleaching process was performed at the temperatures between 500° C. and $T_x$, the crystallization onset temperature. When the bleaching temperature is less than about 500° C., the rate of bleaching is slow and time required for bleaching is too long to be practical. When the bleaching temperature exceeds $T_x$, the glass may crystallize when heat treating. The higher the bleaching temperature, the faster the rate of the bleaching process, but lower transmittance is typically observed when bleaching at fast rates. Accordingly, the temperature and time of bleaching was selected to come to an acceptable transmittance within a reasonable time, such as less than or equal to 24 hours, or less than or equal to 48 hours, or less than or equal to 96 hours, or like. Before bleaching, the glasses were heated from room temperature to the bleaching temperature at a rate from 3 to 5° C./min. After bleaching, the glasses were cooled from the bleaching temperature to the room temperature at a rate from 1 to 3° C./min.

No chemical analysis of the tested samples was performed because chemical analysis was performed for similar samples prepared in independent meltings by XRF (X-ray fluorescence—for all oxides, except for $B_2O_3$ and $Li_2O$), by ICP-OES (inductively coupled plasma optical emission spectroscopy—for $B_2O_3$) and by FES (flame emission spectroscopy—for $Li_2O$). These analyses gave deviations from the batched compositions within ±2.0 mass %.

Some Exemplary Glasses were exposed to Nanostrip 2× cleaning solution. Dried glass samples were submerged in 600 ml of Nanostrip 2× solution (Capitol Scientific, 85% $H_2SO_4$ and <1% $H_2O_2$) for 50 min at 70° C. while stirring at 400 rpm. The ratio of surface area to volume of the glass samples used in this test was 0.08 cm$^{-1}$. After 50 minutes, the samples were quenched in deionized water and rinsed in 18 MΩ water, and then dried by high-pure nitrogen gas and placed in a desiccator overnight. Weight loss normalized to surface area (mg/cm$^2$) and weight loss percentage (wt %) were calculated.

In Tables 6 and 7, the abbreviation "n" with a subscript refers to the refractive index at a corresponding wavelength in nm; for example, $n_{632.8\ nm}$ refers to the refractive index at wavelengths of 632.8 nm.

TABLE 6

| Exemplary Glass Compositions | | | | | | | | | |
|---|---|---|---|---|---|---|---|---|---|
| Exemplary Glass | | 1 | 2 | 3 | 4 | 5 | 6 | 7 | 8 |
| Composition - mol. % | | | | | | | | | |
| $TiO_2$ | mol. % | 32.72 | 32.72 | 30.72 | 30.71 | 32.71 | 32.76 | 31.85 | 31.84 |
| $B_2O_3$ | mol. % | 16.64 | 12.65 | 12.65 | 10.64 | 10.64 | 10.15 | 13.67 | 13.68 |
| $La_2O_3$ | mol. % | 24.68 | 24.68 | 26.67 | 26.68 | 24.69 | 24.70 | 24.03 | 24.02 |
| $SiO_2$ | mol. % | 8.43 | 12.44 | 12.45 | 14.45 | 12.43 | 11.84 | 13.40 | 13.41 |
| $Nb_2O_5$ | mol. % | 6.98 | 6.98 | 6.98 | 6.98 | 6.98 | 6.98 | 6.79 | 6.79 |
| $ZrO_2$ | mol. % | 8.01 | 8.00 | 8.00 | 8.00 | 8.00 | 8.01 | 5.78 | 5.79 |
| $Y_2O_3$ | mol. % | 2.54 | 2.54 | 2.54 | 2.54 | 2.54 | 2.55 | 4.47 | 2.47 |
| ZnO | mol. % | 0 | 0 | 0 | 0 | 2.01 | 3.00 | 0 | 0 |
| $Gd_2O_3$ | mol. % | 0 | 0 | 0 | 0 | 0 | 0 | 0 | 2.00 |
| Composition constraints | | | | | | | | | |
| $SiO_2 + B_2O_3 + P_2O_5$ | mol. % | 25.07 | 25.08 | 25.09 | 25.09 | 23.07 | 22.00 | 27.07 | 27.09 |
| $TiO_2 + Nb_2O_5$ | mol. % | 39.70 | 39.70 | 37.70 | 37.68 | 39.69 | 39.74 | 38.65 | 38.64 |
| $SiO_2 + B_2O_3 - P_2O_5$ | mol. % | 25.07 | 25.08 | 25.09 | 25.09 | 23.07 | 22.00 | 27.07 | 27.09 |
| $TiO_2 + Nb_2O_5 + La_2O_3$ | mol. % | 64.38 | 64.38 | 64.37 | 64.37 | 64.38 | 64.44 | 62.68 | 62.65 |
| $RE_mO_n + WO_3 + ZrO_2$ | mol. % | 35.23 | 35.22 | 37.21 | 37.23 | 35.23 | 35.26 | 34.28 | 34.27 |
| $SiO_2 + Y_2O_3 + Gd_2O_3$ | mol. % | 10.98 | 14.97 | 14.98 | 16.99 | 14.97 | 14.39 | 17.87 | 17.88 |
| $TiO_2/(TiO_2 + Nb_2O_5 + WO_3 + Bi_2O_3)$ | mol. % | 0.8242 | 0.8242 | 0.8149 | 0.8149 | 0.8242 | 0.8243 | 0.8243 | 0.8241 |
| $La_2O_3/TiO_2$ | mol. % | 0.7543 | 0.7544 | 0.8683 | 0.8688 | 0.7547 | 0.7540 | 0.7544 | 0.7542 |
| Measured properties | | | | | | | | | |
| $n_d$ | | | 2.065 | 2.0595 | | | | | |
| $d_{RT}$ | g/cm$^3$ | | 5.139 | | | | | | |
| Predicted and calculated properties | | | | | | | | | |
| $P_n$ [for $n_d$] | | 2.0672 | 2.0697 | 2.0742 | 2.0755 | 2.0795 | 2.0846 | 2.0564 | 2.0612 |
| $P_d$ [for $d_{RT}$] | g/cm$^3$ | 5.1508 | 5.1712 | 5.2795 | 5.2907 | 5.2426 | 5.277 | 5.098 | 5.1904 |
| $P_n - (1.765 + 0.057 * P_d)$ | | 0.0086 | 0.0099 | 0.0082 | 0.0089 | 0.0157 | 0.0188 | 8.800E-04 | 3.300E-04 |
| $P_n - (1.99 + 0.083 * (TiO_2/(TiO_2 + Nb_2O_5 + WO_3 + Bi_2O_3)))$ | | 0.0088 | 0.0112 | 0.0165 | 0.0179 | 0.0211 | 0.0262 | -0.0019 | 0.0028 |
| $P_n - (2.005 + 0.083 * (TiO_2/(TiO_2 + Nb_2O_5 + WO_3 + Bi_2O_3)))$ | | -0.0062 | -0.0038 | 0.0015 | 0.0029 | 0.0061 | 0.0112 | -0.0169 | -0.0122 |

| Exemplary Glass | | 9 | 10 | 11 | 12 | 13 | 14 | 15 | 16 |
|---|---|---|---|---|---|---|---|---|---|
| Composition - mol. % | | | | | | | | | |
| $TiO_2$ | mol. % | 31.84 | 30.00 | 28.00 | 25.99 | 29.83 | 31.84 | 29.85 | 30.43 |
| $B_2O_3$ | mol. % | 13.68 | 13.67 | 13.67 | 13.69 | 13.67 | 13.67 | 13.68 | 20.42 |
| $La_2O_3$ | mol. % | 24.02 | 24.03 | 24.02 | 24.02 | 24.02 | 24.03 | 24.02 | 23.35 |
| $Bi_2O_3$ | mol. % | 0 | 0 | 0 | 0 | 4.47 | 2.47 | 0 | 0 |
| $SiO_2$ | mol. % | 13.40 | 13.40 | 13.41 | 13.41 | 13.41 | 13.41 | 13.40 | 5.43 |
| $Nb_2O_5$ | mol. % | 6.80 | 6.80 | 6.79 | 6.79 | 6.80 | 6.80 | 6.79 | 7.70 |
| $ZrO_2$ | mol. % | 5.79 | 5.78 | 5.79 | 5.79 | 7.79 | 7.79 | 5.79 | 6.80 |
| $Y_2O_3$ | mol. % | 2.47 | 4.48 | 4.47 | 4.47 | 0 | 0 | 6.47 | 5.84 |
| $WO_3$ | mol. % | 2.00 | 1.85 | 3.85 | 5.85 | 0 | 0 | 0 | 0 |

TABLE 6-continued

Exemplary Glass Compositions

| | | | | | | | | | |
|---|---|---|---|---|---|---|---|---|---|
| $Na_2O$ | mol. % | 0 | 0 | 0 | 0 | 0 | 0 | 0 | 0.0258 |
| $Ta_2O_5$ | mol. % | 0 | 0 | 0 | 0 | 0 | 0 | 0 | 0.0072 |
| Composition constraints | | | | | | | | | |
| $SiO_2$+ $B_2O_3$ + $P_2O_5$ | mol. % | 27.09 | 27.07 | 27.08 | 27.10 | 27.08 | 27.08 | 27.08 | 25.85 |
| $TiO_2$ + $Nb_2O_5$ | mol. % | 38.63 | 36.79 | 34.79 | 32.78 | 36.63 | 38.64 | 36.64 | 38.13 |
| $SiO_2$ + $B_2O_3$ – $P_2O_5$ | mol. % | 27.09 | 27.07 | 27.08 | 27.10 | 27.08 | 27.08 | 27.08 | 25.85 |
| $TiO_2$ + $Nb_2O_5$ + $La_2O_3$ | mol. % | 62.66 | 60.82 | 58.81 | 56.80 | 60.65 | 62.66 | 60.66 | 61.47 |
| $RE_mO_n$ + $WO_3$ + $ZrO_2$ | mol. % | 34.28 | 36.14 | 38.13 | 40.12 | 31.82 | 31.81 | 36.28 | 35.99 |
| $SiO_2$ + $Y_2O_3$ + $Gd_2O_3$ | mol. % | 15.87 | 17.88 | 17.88 | 17.88 | 13.41 | 13.41 | 19.87 | 11.27 |
| $TiO_2$/($TiO_2$ + $Nb_2O_5$ + $WO_3$ + $Bi_2O_3$) | mol. % | 0.7835 | 0.7763 | 0.7245 | 0.6728 | 0.7259 | 0.7745 | 0.8146 | 0.7982 |
| $La_2O_3$/$TiO_2$ | mol. % | 0.7545 | 0.8011 | 0.8580 | 0.9240 | 0.8052 | 0.7545 | 0.8047 | 0.7673 |
| Measured properties | | | | | | | | | |
| $n_d$ | | | | | | 2.070 | 2.0579 | | |
| $d_{RT}$ | g/cm³ | 5.117 | 5.154 | | | | | | |
| 15-min devit test (0/1) | | | | | | | | | 1 |
| $T_{liq}$ | ° C. | | | | | | | | 1281 |
| Predicted and calculated properties | | | | | | | | | |
| $P_n$ [for $n_d$] | | 2.0556 | 2.0581 | 2.0598 | 2.0614 | 2.0942 | 2.0746 | 2.0588 | 2.0643 |
| $P_d$ [for $d_{RT}$] | g/cm³ | 5.1099 | 5.1579 | 5.2223 | 5.2862 | 5.4181 | 5.2434 | 5.1495 | 5.1059 |
| $P_n$ – (1.765 + 0.057 * $P_d$) | | –6.500E-04 | –8.900E-04 | –0.0029 | –0.0049 | 0.0204 | 0.0107 | 3.400E-04 | 0.0082 |
| $P_n$ – (1.99 + 0.083 * ($TiO_2$/($TiO_2$ + $Nb_2O_5$ + $WO_3$ + $Bi_2O_3$))) | | 5.800E-04 | 0.0037 | 0.0097 | 0.0156 | 0.0440 | 0.0203 | 0.0013 | 0.0079 |
| $P_n$ – (2.005 + 0.083 * ($TiO_2$/($TiO_2$ + $Nb_2O_5$ + $WO_3$ + $Bi_2O_3$))) | | –0.0144 | –0.0113 | –0.0053 | 5.700E-04 | 0.0290 | 0.0053 | –0.0138 | –0.0071 |

| Exemplary Glass | | 17 | 18 | 19 | 20 | 21 | 22 | 23 | 24 |
|---|---|---|---|---|---|---|---|---|---|
| Composition - mol. % | | | | | | | | | |
| $TiO_2$ | mol. % | 16.96 | 16.98 | 16.97 | 16.97 | 16.97 | 16.96 | 16.98 | 16.98 |
| $B_2O_3$ | mol. % | 28.53 | 29.03 | 29.46 | 31.39 | 30.09 | 30.77 | 29.34 | 29.95 |
| $La_2O_3$ | mol. % | 21.56 | 18.50 | 16.03 | 19.97 | 19.98 | 19.97 | 19.97 | 19.97 |
| $Bi_2O_3$ | mol. % | 8.79 | 11.83 | 11.00 | 9.30 | 8.27 | 13.11 | 12.39 | 17.97 |
| $SiO_2$ | mol. % | 9.25 | 10.32 | 10.84 | 7.51 | 5.97 | 7.71 | 6.12 | 8.00 |
| $Nb_2O_5$ | mol. % | 5.58 | 5.93 | 8.20 | 7.71 | 5.68 | 4.33 | 1.86 | 0 |
| $ZrO_2$ | mol. % | 7.14 | 7.26 | 7.36 | 6.99 | 6.99 | 6.99 | 7.00 | 6.98 |
| $WO_3$ | mol. % | 2.03 | 0 | 0 | 0 | 5.91 | 0 | 6.19 | 0 |
| $CeO_2$ | mol. % | 0.12 | 0.12 | 0.0916 | 0.12 | 0.11 | 0.12 | 0.12 | 0.11 |
| CaO | mol. % | 0.0319 | 0.0322 | 0.0312 | 0.0317 | 0.032 | 0.0332 | 0.0336 | 0.0351 |
| $Ta_2O_5$ | mol. % | 0.004 | 0.0041 | 0.0079 | 0.008 | 0.0041 | 0.0042 | 0 | 0 |
| Composition constraints | | | | | | | | | |
| $SiO_2$+ $B_2O_3$ + $P_2O_5$ | mol. % | 37.80 | 39.38 | 40.32 | 38.93 | 36.08 | 38.51 | 35.48 | 37.96 |
| $TiO_2$ + $Nb_2O_5$ | mol. % | 22.56 | 22.92 | 25.18 | 24.69 | 22.66 | 21.30 | 18.85 | 16.99 |
| $SiO_2$ + $B_2O_3$ – $P_2O_5$ | mol. % | 37.80 | 39.38 | 40.32 | 38.93 | 36.08 | 38.51 | 35.48 | 37.96 |
| $TiO_2$ + $Nb_2O_5$ + $La_2O_3$ | mol. % | 44.13 | 41.43 | 41.22 | 44.67 | 42.65 | 41.29 | 38.83 | 36.97 |
| $RE_mO_n$ + $WO_3$ + $ZrO_2$ | mol. % | 30.80 | 25.83 | 23.45 | 27.04 | 32.95 | 27.04 | 33.23 | 27.03 |
| $SiO_2$ + $Y_2O_3$ + $Gd_2O_3$ | mol. % | 9.259 | 10.33 | 10.85 | 7.516 | 5.973 | 7.718 | 6.125 | 8.000 |
| $TiO_2$/($TiO_2$ + $Nb_2O_5$ + $WO_3$ + $Bi_2O_3$) | mol. % | 0.5085 | 0.4888 | 0.4692 | 0.4995 | 0.4609 | 0.4932 | 0.4537 | 0.4858 |
| $La_2O_3$/$TiO_2$ | mol. % | 1.271 | 1.090 | 0.9443 | 1.176 | 1.177 | 1.177 | 1.176 | 1.176 |
| Measured properties | | | | | | | | | |
| $d_{RT}$ | g/cm³ | | | | | 5.308 | 5.457 | 5.603 | 5.737 |
| 15-min devit test (0/1) | | | 1 | 1 | 1 | | | | |
| $n_{531.9\ nm}$ | | | | | | | | 2.0619 | |
| $n_{632.8\ nm}$ | | | | | | | | 2.0371 | |
| Predicted and calculated properties | | | | | | | | | |
| $P_n$ [for $n_d$] | | 2.0459 | 2.0578 | 2.048 | 2.0461 | 2.0516 | 2.071 | 2.0789 | 2.1028 |
| $P_d$ [for $d_{RT}$] | g/cm³ | 5.4649 | 5.4739 | 5.2549 | 5.3235 | 5.4743 | 5.6624 | 5.8517 | 6.0951 |
| $P_n$ – (1.765 + 0.057 * $P_d$) | | –0.0306 | –0.0193 | –0.0166 | –0.0223 | –0.0255 | –0.0167 | –0.0196 | 0.0096 |
| $P_n$ – (1.99 + 0.083 * ($TiO_2$/($TiO_2$ + $Nb_2O_5$ + $WO_3$ + $Bi_2O_3$))) | | 0.0137 | 0.0272 | 0.0190 | 0.0147 | 0.0233 | 0.0401 | 0.0514 | 0.0725 |
| $P_n$ – (2.005 + 0.083 * ($TiO_2$/($TiO_2$ + $Nb_2O_5$ + $WO_3$ + $Bi_2O_3$))) | | –0.0013 | 0.0122 | 0.0040 | –3.300E-04 | 0.0083 | 0.0251 | 0.0364 | 0.0575 |

| Exemplary Glass | | 25 | 26 | 27 | 28 | 29 | 30 | 31 | 32 |
|---|---|---|---|---|---|---|---|---|---|
| Composition - mol. % | | | | | | | | | |
| $TiO_2$ | mol. % | 16.97 | 19.97 | 30.43 | 30.41 | 30.90 | 31.10 | 30.74 | 31.19 |
| $B_2O_3$ | mol. % | 28.93 | 31.41 | 20.42 | 24.41 | 20.42 | 20.42 | 20.41 | 20.41 |
| $La_2O_3$ | mol. % | 19.17 | 21.96 | 23.35 | 20.85 | 23.63 | 24.03 | 23.13 | 23.90 |

TABLE 6-continued

| Exemplary Glass Compositions | | | | | | | | | |
|---|---|---|---|---|---|---|---|---|---|
| $Bi_2O_3$ | mol. % | 8.12 | 9.15 | 0 | 0 | 0 | 0 | 0 | 0 |
| $SiO_2$ | mol. % | 9.76 | 9.49 | 5.43 | 0.0267 | 5.44 | 5.44 | 5.43 | 5.43 |
| $Nb_2O_5$ | mol. % | 7.70 | 7.84 | 7.70 | 7.70 | 7.22 | 7.02 | 7.39 | 6.94 |
| $ZrO_2$ | mol. % | 7.23 | 0 | 6.80 | 6.80 | 6.80 | 6.80 | 6.79 | 6.81 |
| $Y_2O_3$ | mol. % | 0 | 0 | 5.84 | 5.34 | 5.56 | 5.16 | 6.07 | 5.29 |
| $WO_3$ | mol. % | 1.97 | 0 | 0 | 4.44 | 0 | 0 | 0 | 0 |
| $CeO_2$ | mol. % | 0.11 | 0.14 | 0 | 0 | 0 | 0 | 0 | 0 |
| $CaO$ | mol. % | 0.031 | 0.0319 | 0 | 0 | 0 | 0 | 0 | 0 |
| $Na_2O$ | mol. % | 0 | 0 | 0.0258 | 0.0259 | 0.0257 | 0.0257 | 0.0257 | 0.0257 |
| $Ta_2O_5$ | mol. % | 0.0079 | 0.0081 | 0.0072 | 0.0073 | 0.0072 | 0.0072 | 0.0072 | 0.0072 |
| Composition constraints | | | | | | | | | |
| $SiO_2 + B_2O_3 + P_2O_5$ | mol. % | 38.71 | 40.94 | 25.85 | 24.44 | 25.85 | 25.86 | 25.85 | 25.84 |
| $TiO_2 + Nb_2O_5$ | mol. % | 24.69 | 27.83 | 38.13 | 38.11 | 38.12 | 38.12 | 38.13 | 38.14 |
| $SiO_2 + B_2O_3 - P_2O_5$ | mol. % | 38.71 | 40.94 | 25.85 | 24.44 | 25.85 | 25.86 | 25.85 | 25.84 |
| $TiO_2 + Nb_2O_5 + La_2O_3$ | mol. % | 43.87 | 49.80 | 61.48 | 58.96 | 61.75 | 62.15 | 61.26 | 62.04 |
| $RE_mO_n + WO_3 + ZrO_2$ | mol. % | 28.44 | 22.04 | 35.99 | 37.42 | 35.99 | 35.99 | 35.99 | 35.99 |
| $SiO_2 + Y_2O_3 + Gd_2O_3$ | mol. % | 9.768 | 9.501 | 11.27 | 5.364 | 11.00 | 10.60 | 11.50 | 10.71 |
| $TiO_2/(TiO_2 + Nb_2O_5 + WO_3 + Bi_2O_3)$ | mol. % | 0.4883 | 0.5404 | 0.7982 | 0.7148 | 0.8105 | 0.8160 | 0.8062 | 0.8179 |
| $La_2O_3/TiO_2$ | mol. % | 1.130 | 1.100 | 0.7673 | 0.6855 | 0.7648 | 0.7726 | 0.7522 | 0.7664 |
| Measured properties | | | | | | | | | |
| 15-min devit test (0/1) | | 1 | | | | | | | |
| $T_{liq}$ | ° C. | | | 1300 | 1300 | 1280 | 1269 | 1286 | 1269 |
| Predicted and calculated properties | | | | | | | | | |
| $P_n$ [for $n_d$] | | 2.0374 | 2.0387 | 2.0641 | 2.0686 | 2.0622 | 2.0617 | 2.0625 | 2.0613 |
| $P_d$ [for $d_{RT}$] | g/cm³ | 5.2625 | 5.2265 | 5.105 | 5.1007 | 5.1126 | 5.1235 | 5.0984 | 5.1202 |
| $P_n - (1.765 + 0.057 * P_d)$ | | 0.0276 | −0.0242 | 0.0082 | 0.0128 | 0.0058 | 0.0046 | 0.0069 | 0.0045 |
| $P_n - (1.99 + 0.083 * (TiO_2/(TiO_2 + Nb_2O_5 + WO_3 + Bi_2O_3)))$ | | 0.0068 | 0.0039 | 0.0079 | 0.0192 | 0.0050 | 0.0039 | 0.0056 | 0.0034 |
| $P_n - (2.005 + 0.083 * (TiO_2/(TiO_2 + Nb_2O_5 + WO_3 + Bi_2O_3)))$ | | −0.0082 | −0.0111 | −0.0071 | 0.0043 | −0.0100 | −0.0111 | −0.0094 | −0.0116 |

| Exemplary Glass | | 33 | 34 | 35 | 36 | 37 | 38 | 39 | 40 |
|---|---|---|---|---|---|---|---|---|---|
| Composition - mol. % | | | | | | | | | |
| $TiO_2$ | mol. % | 31.32 | 31.78 | 31.84 | 29.16 | 29.21 | 27.94 | 30.29 | 29.94 |
| $B_2O_3$ | mol. % | 20.41 | 20.41 | 13.67 | 22.05 | 24.04 | 23.65 | 21.95 | 22.34 |
| $La_2O_3$ | mol. % | 23.86 | 24.69 | 24.03 | 23.10 | 21.83 | 22.86 | 23.50 | 23.42 |
| $Bi_2O_3$ | mol. % | 0 | 0 | 0 | 0.76 | 0.73 | 1.50 | 0.57 | 0.76 |
| $SiO_2$ | mol. % | 5.44 | 5.44 | 13.40 | 4.21 | 1.47 | 2.99 | 4.29 | 3.99 |
| $Nb_2O_5$ | mol. % | 6.80 | 6.35 | 6.80 | 8.45 | 8.43 | 9.20 | 7.74 | 7.95 |
| $ZrO_2$ | mol. % | 6.80 | 6.80 | 7.79 | 6.81 | 6.80 | 6.80 | 6.80 | 6.80 |
| $Y_2O_3$ | mol. % | 5.32 | 4.50 | 2.47 | 5.43 | 5.19 | 5.04 | 4.83 | 4.76 |
| $WO_3$ | mol. % | 0 | 0 | 0 | 0 | 2.28 | 0 | 0 | 0 |
| $Na_2O$ | mol. % | 0.0256 | 0.0256 | 0 | 0.0263 | 0.0263 | 0.0268 | 0.026 | 0.0261 |
| $Ta_2O_5$ | mol. % | 0.0072 | 0.0072 | 0 | 0.0074 | 0.0074 | 0.0075 | 0.0073 | 0.0073 |
| Composition constraints | | | | | | | | | |
| $SiO_2 + B_2O_3 + P_2O_5$ | mol. % | 25.85 | 25.85 | 27.07 | 26.26 | 25.51 | 26.64 | 26.24 | 26.33 |
| $TiO_2 + Nb_2O_5$ | mol. % | 38.13 | 38.13 | 38.64 | 37.62 | 37.64 | 37.14 | 38.03 | 37.89 |
| $SiO_2 + B_2O_3 - P_2O_5$ | mol. % | 25.85 | 25.85 | 27.07 | 26.26 | 25.51 | 26.64 | 26.24 | 26.33 |
| $TiO_2 + Nb_2O_5 + La_2O_3$ | mol. % | 61.99 | 62.82 | 62.67 | 60.71 | 59.46 | 59.99 | 61.52 | 61.31 |
| $RE_mO_n + WO_3 + ZrO_2$ | mol. % | 35.99 | 35.99 | 34.29 | 35.34 | 36.09 | 34.70 | 35.13 | 34.98 |
| $SiO_2 + Y_2O_3 + Gd_2O_3$ | mol. % | 10.77 | 9.942 | 15.87 | 9.641 | 6.659 | 8.026 | 9.125 | 8.749 |
| $TiO_2/(TiO_2 + Nb_2O_5 + WO_3 + Bi_2O_3)$ | mol. % | 0.8216 | 0.8335 | 0.8241 | 0.7600 | 0.7187 | 0.7232 | 0.7848 | 0.7746 |
| $La_2O_3/TiO_2$ | mol. % | 0.7618 | 0.7769 | 0.7546 | 0.7920 | 0.7472 | 0.8181 | 0.7759 | 0.7824 |
| Measured properties | | | | | | | | | |
| $d_{RT}$ | g/cm³ | | | 5.080 | | | | | |
| 15-min devit test (0/1) | | | | | | | | 1 | 1 |
| $T_{liq}$ | ° C. | 1263 | 1269 | | 1284 | 1285 | 1275 | | |
| Predicted and calculated properties | | | | | | | | | |
| $P_n$ [for $n_d$] | | 2.0605 | 2.0593 | 2.0533 | 2.0703 | 2.0725 | 2.0765 | 2.0654 | 2.0672 |
| $P_d$ [for $d_{RT}$] | g/cm³ | 5.1184 | 5.1414 | 5.092 | 5.133 | 5.1301 | 5.1609 | 5.1225 | 5.130 |
| $P_n - (1.765 + 0.057 * P_d)$ | | 0.0038 | 0.0012 | −0.0019 | 0.0127 | 0.0150 | 0.0173 | 0.0085 | 0.0098 |
| $P_n - (1.99 + 0.083 * (TiO_2/(TiO_2 + Nb_2O_5 + WO_3 + Bi_2O_3)))$ | | 0.0023 | 8.300E−05 | −0.0051 | 0.0172 | 0.0228 | 0.0265 | 0.0103 | 0.0129 |
| $P_n - (2.005 + 0.083 * (TiO_2/(TiO_2 + Nb_2O_5 + WO_3 + Bi_2O_3)))$ | | −0.0127 | −0.0149 | −0.0201 | 0.0022 | 0.0078 | 0.0115 | −0.0047 | −0.0021 |

TABLE 6-continued

Exemplary Glass Compositions

| Exemplary Glass | | 41 | 42 | 43 | 44 | 45 | 46 | 47 | 48 |
|---|---|---|---|---|---|---|---|---|---|
| Composition - mol. % | | | | | | | | | |
| $TiO_2$ | mol. % | 31.14 | 30.43 | 30.15 | 30.43 | 30.42 | 30.42 | 30.43 | 30.42 |
| $B_2O_3$ | mol. % | 21.31 | 21.23 | 21.58 | 21.23 | 20.89 | 21.24 | 21.06 | 20.92 |
| $La_2O_3$ | mol. % | 23.72 | 23.72 | 23.67 | 23.72 | 23.72 | 23.73 | 23.73 | 23.73 |
| $Bi_2O_3$ | mol. % | 0.23 | 0.38 | 0.54 | 0.38 | 0.20 | 0.12 | 0.11 | 0.11 |
| $SiO_2$ | mol. % | 4.77 | 4.82 | 4.57 | 4.82 | 4.68 | 4.82 | 4.73 | 4.67 |
| $Nb_2O_5$ | mol. % | 7.22 | 7.44 | 7.60 | 7.44 | 7.44 | 7.44 | 7.44 | 7.44 |
| $ZrO_2$ | mol. % | 6.80 | 6.80 | 6.80 | 6.80 | 6.80 | 6.80 | 6.80 | 6.80 |
| $Y_2O_3$ | mol. % | 4.78 | 5.14 | 5.04 | 5.14 | 5.13 | 5.13 | 5.13 | 5.14 |
| $Li_2O$ | mol. % | 0 | 0 | 0 | 0 | 0.70 | 0 | 0.37 | 0.64 |
| $K_2O$ | mol. % | 0 | 0 | 0 | 0 | 0 | 0.27 | 0.17 | 0.10 |
| $Na_2O$ | mol. % | 0.0257 | 0.026 | 0.0261 | 0.026 | 0.0258 | 0.0258 | 0.0258 | 0.0257 |
| $Ta_2O_5$ | mol. % | 0.0072 | 0.0073 | 0.0073 | 0.0073 | 0.0072 | 0.0072 | 0.0072 | 0.0072 |
| Composition constraints | | | | | | | | | |
| $SiO_2 + B_2O_3 + P_2O_5$ | mol. % | 26.08 | 26.05 | 26.15 | 26.05 | 25.57 | 26.06 | 25.79 | 25.60 |
| $TiO_2 + Nb_2O_5$ | mol. % | 38.36 | 37.87 | 37.75 | 37.87 | 37.85 | 37.86 | 37.86 | 37.86 |
| $SiO_2 + B_2O_3 - P_2O_5$ | mol. % | 26.08 | 26.05 | 26.15 | 26.05 | 25.57 | 26.06 | 25.79 | 25.60 |
| $TiO_2 + Nb_2O_5 + La_2O_3$ | mol. % | 62.08 | 61.59 | 61.42 | 61.59 | 61.57 | 61.59 | 61.59 | 61.59 |
| $RE_mO_n + WO_3 + ZrO_2$ | mol. % | 35.30 | 35.66 | 35.52 | 35.66 | 35.65 | 35.66 | 35.67 | 35.66 |
| $SiO_2 + Y_2O_3 + Gd_2O_3$ | mol. % | 9.550 | 9.956 | 9.615 | 9.956 | 9.814 | 9.949 | 9.865 | 9.811 |
| $TiO_2/(TiO_2 + Nb_2O_5 + WO_3 + Bi_2O_3)$ | mol. % | 0.8069 | 0.7955 | 0.7874 | 0.7955 | 0.7994 | 0.8010 | 0.8013 | 0.8013 |
| $La_2O_3/TiO_2$ | mol. % | 0.7619 | 0.7796 | 0.7850 | 0.7796 | 0.7799 | 0.7799 | 0.7798 | 0.7799 |
| Measured properties | | | | | | | | | |
| 15-min devit test (0/1) | | 1 | 1 | 1 | | | | | |
| $T_{liq}$ | ° C. | | 1264 | 1268 | 1272 | 1275 | 1274 | 1278 | 1283 |
| Predicted and calculated properties | | | | | | | | | |
| $P_n$ [for $n_d$] | | 2.0616 | 2.0648 | 2.0661 | 2.0648 | 2.0634 | 2.0603 | 2.0612 | 2.0619 |
| $P_d$ [for $d_{RT}$] | g/cm³ | 5.1088 | 5.1328 | 5.1386 | 5.1328 | 5.1233 | 5.104 | 5.1095 | 5.1137 |
| $P_n - (1.765 + 0.057 * P_d)$ | | 0.0054 | 0.0073 | 0.0082 | 0.0073 | 0.0064 | 0.0044 | 0.0050 | 0.0054 |
| $P_n - (1.99 + 0.083 * (TiO_2/(TiO_2 + Nb_2O_5 + WO_3 + Bi_2O_3)))$ | | 0.0047 | 0.0088 | 0.0107 | 0.0088 | 0.0071 | 0.0038 | 0.0047 | 0.0054 |
| $P_n - (2.005 + 0.083 * (TiO_2/(TiO_2 + Nb_2O_5 + WO_3 + Bi_2O_3)))$ | | −0.0103 | −0.0062 | −0.0043 | −0.0062 | −0.0079 | −0.0112 | −0.0103 | −0.0096 |

| Exemplary Glass | | 49 | 50 | 51 | 52 | 53 | 54 | 55 | 56 |
|---|---|---|---|---|---|---|---|---|---|
| Composition - mol. % | | | | | | | | | |
| $TiO_2$ | mol. % | 30.42 | 30.43 | 30.41 | 30.41 | 30.42 | 30.42 | 30.43 | 30.44 |
| $B_2O_3$ | mol. % | 21.05 | 21.25 | 21.25 | 21.04 | 21.24 | 21.05 | 21.25 | 20.92 |
| $La_2O_3$ | mol. % | 23.72 | 23.72 | 23.72 | 23.71 | 23.73 | 23.72 | 23.72 | 23.72 |
| $Bi_2O_3$ | mol. % | 0.10 | 0.19 | 0 | 0 | 0.11 | 0.10 | 0.19 | 0.10 |
| $SiO_2$ | mol. % | 4.73 | 4.82 | 4.83 | 4.74 | 4.82 | 4.73 | 4.82 | 4.67 |
| $Nb_2O_5$ | mol. % | 7.44 | 7.44 | 7.44 | 7.44 | 7.44 | 7.44 | 7.44 | 7.44 |
| $ZrO_2$ | mol. % | 6.80 | 6.80 | 6.80 | 6.80 | 6.80 | 6.80 | 6.80 | 6.80 |
| $Y_2O_3$ | mol. % | 5.13 | 5.13 | 5.13 | 5.13 | 5.13 | 5.13 | 5.13 | 5.14 |
| $Li_2O$ | mol. % | 0.37 | 0 | 0 | 0.43 | 0 | 0.37 | 0 | 0.64 |
| $K_2O$ | mol. % | 0.19 | 0.19 | 0.39 | 0.27 | 0.27 | 0.19 | 0.19 | 0.10 |
| $Na_2O$ | mol. % | 0.0258 | 0.0258 | 0.0257 | 0.0257 | 0.0258 | 0.0258 | 0.0258 | 0.0257 |
| $Ta_2O_5$ | mol. % | 0.0072 | 0.0072 | 0.0072 | 0.0072 | 0.0072 | 0.0072 | 0.0072 | 0.0072 |
| Composition constraints | | | | | | | | | |
| $SiO_2 + B_2O_3 + P_2O_5$ | mol. % | 25.78 | 26.07 | 26.08 | 25.78 | 26.06 | 25.78 | 26.07 | 25.59 |
| $TiO_2 + Nb_2O_5$ | mol. % | 37.86 | 37.87 | 37.85 | 37.85 | 37.86 | 37.86 | 37.87 | 37.87 |
| $SiO_2 + B_2O_3 - P_2O_5$ | mol. % | 25.78 | 26.07 | 26.08 | 25.78 | 26.06 | 25.78 | 26.07 | 25.59 |
| $TiO_2 + Nb_2O_5 + La_2O_3$ | mol. % | 61.58 | 61.58 | 61.57 | 61.56 | 61.59 | 61.58 | 61.58 | 61.60 |
| $RE_mO_n + WO_3 + ZrO_2$ | mol. % | 35.66 | 35.65 | 35.65 | 35.64 | 35.66 | 35.66 | 35.65 | 35.66 |
| $SiO_2 + Y_2O_3 + Gd_2O_3$ | mol. % | 9.864 | 9.957 | 9.960 | 9.875 | 9.950 | 9.864 | 9.957 | 9.809 |
| $TiO_2/(TiO_2 + Nb_2O_5 + WO_3 + Bi_2O_3)$ | mol. % | 0.8014 | 0.7995 | 0.8035 | 0.8035 | 0.8011 | 0.8014 | 0.7995 | 0.8015 |
| $La_2O_3/TiO_2$ | mol. % | 0.7798 | 0.7794 | 0.7799 | 0.7797 | 0.7799 | 0.7798 | 0.7794 | 0.7794 |
| Measured properties | | | | | | | | | |
| $n_d$ | | | 2.0533 | | | | | | |
| $d_{RT}$ | g/cm³ | 4.909 | 4.946 | | | | | | |
| 2.5-min devit test (0/1) | | | | 1 | 1 | 1 | 1 | 1 | 1 |
| 15-min devit test (0/1) | | 1 | 1 | | | | | | |
| $T_g$ | ° C. | 714 | 719 | | | | | | |
| $T_x$ | ° C. | 814 | 827 | | | | | | |
| $n_{531.9\ nm}$ | | | 2.0667 | | | | | | |
| $n_{632.8\ nm}$ | | | 2.0453 | | | | | | |

TABLE 6-continued

Exemplary Glass Compositions

Predicted and calculated properties

| | | | | | | | | |
|---|---|---|---|---|---|---|---|---|
| $P_n$ [for $n_d$] | | 2.0611 | 2.0615 | 2.0582 | 2.0593 | 2.0602 | 2.0611 | 2.0615 2.0619 |
| $P_d$ [for $d_{RT}$] | g/cm³ | 5.1088 | 5.1115 | 5.0909 | 5.0973 | 5.1038 | 5.1088 | 5.1115 5.1132 |
| $P_n - (1.765 + 0.057 * P_d)$ | | 0.0049 | 0.0051 | 0.0030 | 0.0037 | 0.0043 | 0.0049 | 0.0051 0.0054 |
| $P_n - (1.99 + 0.083 * (TiO_2/ (TiO_2 + Nb_2O_5 + WO_3 + Bi_2O_3)))$ | | 0.0046 | 0.0051 | 0.0015 | 0.0026 | 0.0038 | 0.0046 | 0.0051 0.0054 |
| $P_n - (2.005 + 0.083 * (TiO_2/ (TiO_2 + Nb_2O_5 + WO_3 + Bi_2O_3)))$ | | −0.0104 | −0.0099 | −0.0135 | −0.0124 | −0.0112 | −0.0104 | −0.0099 −0.0096 |

| Exemplary Glass | | 57 | 58 | 59 | 60 | 61 | 62 | 63 | 64 |
|---|---|---|---|---|---|---|---|---|---|
| Composition - mol. % | | | | | | | | | |
| $TiO_2$ | mol. % | 30.43 | 30.44 | 30.43 | 30.43 | 30.43 | 27.83 | 25.84 | 31.35 |
| $B_2O_3$ | mol. % | 21.06 | 21.25 | 20.89 | 21.05 | 21.23 | 13.69 | 13.69 | 13.68 |
| $La_2O_3$ | mol. % | 23.72 | 23.73 | 23.72 | 23.73 | 23.72 | 24.02 | 24.03 | 24.02 |
| $Bi_2O_3$ | mol. % | 0.18 | 0.28 | 0.19 | 0.28 | 0.38 | 6.47 | 8.47 | 0.50 |
| $SiO_2$ | mol. % | 4.74 | 4.81 | 4.68 | 4.72 | 4.82 | 13.41 | 13.39 | 13.41 |
| $Nb_2O_5$ | mol. % | 7.44 | 7.44 | 7.44 | 7.44 | 7.44 | 6.79 | 6.79 | 6.79 |
| $ZrO_2$ | mol. % | 6.80 | 6.80 | 6.80 | 6.81 | 6.80 | 7.79 | 7.79 | 7.79 |
| $Y_2O_3$ | mol. % | 5.13 | 5.13 | 5.13 | 5.13 | 5.14 | 0 | 0 | 2.47 |
| $Li_2O$ | mol. % | 0.37 | 0 | 0.70 | 0.38 | 0 | 0 | 0 | 0 |
| $K_2O$ | mol. % | 0.10 | 0.10 | 0 | 0 | 0 | 0 | 0 | 0 |
| $Na_2O$ | mol. % | 0.0258 | 0.0259 | 0.0258 | 0.0259 | 0.026 | 0 | 0 | 0 |
| $Ta_2O_5$ | mol. % | 0.0072 | 0.0073 | 0.0072 | 0.0073 | 0.0073 | 0 | 0 | 0 |
| Composition constraints | | | | | | | | | |
| $SiO_2 + B_2O_3 + P_2O_5$ | mol. % | 25.80 | 26.06 | 25.57 | 25.77 | 26.05 | 27.10 | 27.08 | 27.09 |
| $TiO_2 + Nb_2O_5$ | mol. % | 37.86 | 37.87 | 37.87 | 37.87 | 37.87 | 34.62 | 32.63 | 38.14 |
| $SiO_2 + B_2O_3 - P_2O_5$ | mol. % | 25.80 | 26.06 | 25.57 | 25.77 | 26.05 | 27.10 | 27.08 | 27.09 |
| $TiO_2 + Nb_2O_5 + La_2O_3$ | mol. % | 61.58 | 61.60 | 61.58 | 61.60 | 61.59 | 58.64 | 56.66 | 62.15 |
| $RE_mO_n + WO_3 + ZrO_2$ | mol. % | 35.65 | 35.66 | 35.65 | 35.67 | 35.66 | 31.81 | 31.82 | 34.28 |
| $SiO_2 + Y_2O_3 + Gd_2O_3$ | mol. % | 9.870 | 9.939 | 9.812 | 9.857 | 9.956 | 13.41 | 13.39 | 15.87 |
| $TiO_2/(TiO_2 + Nb_2O_5 + WO_3 + Bi_2O_3)$ | mol. % | 0.7998 | 0.7978 | 0.7995 | 0.7977 | 0.7955 | 0.6773 | 0.6286 | 0.8113 |
| $La_2O_3/TiO_2$ | mol. % | 0.7795 | 0.7795 | 0.7795 | 0.7798 | 0.7796 | 0.8631 | 0.9299 | 0.7661 |
| Measured properties | | | | | | | | | |
| $n_d$ | | | | | | | | | 2.0557 |
| $d_{RT}$ | g/cm³ | | | | | | 5.533 | 5.673 | |
| 2.5-min devit test (0/1) | | 1 | 1 | 1 | 1 | 1 | | | |
| $T_g$ | ° C. | | | | | | 696 | 684 | 740 |
| $T_x$ | ° C. | | | | | | 802 | 783 | |
| Predicted and calculated properties | | | | | | | | | |
| $P_n$ [for $n_d$] | | 2.0623 | 2.063 | 2.0634 | 2.0642 | 2.0648 | 2.1137 | 2.1336 | 2.0581 |
| $P_d$ [for $d_{RT}$] | g/cm³ | 5.1167 | 5.1211 | 5.1231 | 5.1281 | 5.1328 | 5.5921 | 5.768 | 5.1348 |
| $P_n - (1.765 + 0.057 * P_d)$ | | 0.0057 | 0.0061 | 0.0064 | 0.0069 | 0.0073 | 0.0300 | 0.0398 | 4.000E-04 |
| $P_n - (1.99 + 0.083 * (TiO_2/ (TiO_2 + Nb_2O_5 + WO_3 + Bi_2O_3)))$ | | 0.0060 | 0.0068 | 0.0071 | 0.0080 | 0.0088 | 0.0675 | 0.0914 | 7.400E-04 |
| $P_n - (2.005 + 0.083 * (TiO_2/ (TiO_2 + Nb_2O_5 + WO_3 + Bi_2O_3)))$ | | −0.0091 | −0.0082 | −0.0080 | −0.0070 | −0.0062 | 0.0525 | 0.0764 | −0.0143 |

| Exemplary Glass | | 65 | 66 | 67 |
|---|---|---|---|---|
| Composition - mol. % | | | | |
| $TiO_2$ | mol. % | 30.86 | 30.35 | 23.70 |
| $B_2O_3$ | mol. % | 13.67 | 13.68 | 16.53 |
| $La_2O_3$ | mol. % | 24.03 | 24.02 | 22.70 |
| $Bi_2O_3$ | mol. % | 1.00 | 1.50 | 5.00 |
| $SiO_2$ | mol. % | 13.39 | 13.39 | 14.55 |
| $Nb_2O_5$ | mol. % | 6.79 | 6.79 | 5.00 |
| $ZrO_2$ | mol. % | 7.79 | 7.79 | 8.01 |
| $Y_2O_3$ | mol. % | 2.47 | 2.47 | 4.50 |
| Composition constraints | | | | |
| $SiO_2 + B_2O_3 + P_2O_5$ | mol. % | 27.07 | 27.07 | 31.09 |
| $TiO_2 + Nb_2O_5$ | mol. % | 37.65 | 37.14 | 28.70 |
| $SiO_2 + B_2O_3 - P_2O_5$ | mol. % | 27.07 | 27.07 | 31.09 |
| $TiO_2 + Nb_2O_5 + La_2O_3$ | mol. % | 61.68 | 61.16 | 51.41 |
| $RE_mO_n + WO_3 + ZrO_2$ | mol. % | 34.29 | 34.29 | 35.21 |
| $SiO_2 + Y_2O_3 + Gd_2O_3$ | mol. % | 15.86 | 15.87 | 19.06 |
| $TiO_2/(TiO_2 + Nb_2O_5 + WO_3 + Bi_2O_3)$ | mol. % | 0.7984 | 0.7854 | 0.7032 |
| $La_2O_3/TiO_2$ | mol. % | 0.7787 | 0.7916 | 0.9580 |

TABLE 6-continued

| | Exemplary Glass Compositions | | | |
|---|---|---|---|---|
| | | Measured properties | | |
| $n_d$ | | | 2.0583 | 2.0605 | |
| $T_g$ | ° C. | | | 739 | 696 |
| $T_x$ | ° C. | | | | 829 |
| | Predicted and calculated properties | | | | |
| $P_n$ [for $n_d$] | | | 2.0632 | 2.068 | 2.0649 |
| $P_d$ [for $d_{RT}$] | g/cm³ | | 5.1793 | 5.2229 | 5.4342 |
| $P_n - (1.765 + 0.057 * P_d)$ | | | 0.0030 | 0.0053 | −0.0099 |
| $P_n - (1.99 + 0.083 * (TiO_2/ (TiO_2 + Nb_2O_5 + WO_3 + Bi_2O_3)))$ | | | 0.0069 | 0.0129 | 0.0165 |
| $P_n - (2.005 + 0.083 * (TiO_2/ (TiO_2 + Nb_2O_5 + WO_3 + Bi_2O_3)))$ | | | −0.0081 | −0.0021 | 0.0015 |

Table 7 below lists the glass compositions and properties for Comparative Glasses C1-C32.

TABLE 7

Compositions and Properties of Comparative Example Glasses

| Comparative Examples | | C1 | C2 | C3 | C4 | C5 | C6 | C7 | C8 |
|---|---|---|---|---|---|---|---|---|---|
| Reference | | [4] | [6] | [10] | [5] | [3] | [9] | [1] | [2] |
| | | | | | Composition - mol. % | | | | |
| $La_2O_3$ | mol. % | 13.98 | 26.70 | 23.31 | 19.99 | 22.68 | 22.73 | 22.70 | 22.29 |
| $Nb_2O_5$ | mol. % | 11.98 | 4.70 | 5.59 | 17.99 | 5.55 | 5.55 | 5.67 | 5.57 |
| $TiO_2$ | mol. % | 26.47 | 22.68 | 31.38 | 12.99 | 31.92 | 31.78 | 31.04 | 30.46 |
| $B_2O_3$ | mol. % | 19.96 | 13.01 | 14.22 | 34.98 | 18.27 | 18.28 | 14.80 | 14.53 |
| $SiO_2$ | mol. % | 15.47 | 7.54 | 11.24 | 0.0575 | 7.59 | 7.54 | 11.52 | 11.30 |
| $ZrO_2$ | mol. % | 6.99 | 12.50 | 8.31 | 6.99 | 9.03 | 9.19 | 8.30 | 8.15 |
| CaO | mol. % | 5.00 | 0 | 0 | 0 | 0 | 0 | 0 | 0 |
| $CeO_2$ | mol. % | 0.0853 | 0 | 0 | 0 | 0 | 0 | 0 | 0 |
| $Ta_2O_5$ | mol. % | 0.0121 | 1.72 | 0 | 0.0156 | 0 | 0 | 0 | 0 |
| $Al_2O_3$ | mol. % | 0.0131 | 2.67 | 0 | 0 | 0 | 0 | 0 | 0 |
| MgO | mol. % | 0.0331 | 0 | 0 | 0 | 0 | 0 | 0 | 0 |
| $Gd_2O_3$ | mol. % | 0 | 3.80 | 0 | 0 | 4.97 | 4.93 | 0 | 0 |
| $Y_2O_3$ | mol. % | 0 | 4.49 | 4.92 | 0 | 0 | 0 | 4.96 | 4.87 |
| $AS_2O_3$ | mol. % | 0 | 0.18 | 0 | 0 | 0 | 0 | 0 | 0 |
| $WO_3$ | mol. % | 0 | 0 | 0.50 | 7.00 | 0 | 0 | 0.50 | 0.49 |
| $Li_2O$ | mol. % | 0 | 0 | 0.52 | 0 | 0 | 0 | 0.51 | 0.51 |
| $CO_2$ | mol. % | 0 | 0 | 0 | 0 | 0 | 0 | 0 | 1.24 |
| $SO_2$ | mol. % | 0 | 0 | 0 | 0 | 0 | 0 | 0 | 0.59 |
| | | | | | Measured properties | | | | |
| $n_d$ | | | 2.0145 | 2.050 | | 2.0533 | 2.0533 | 2.050 | 2.050 |
| $d_{RT}$ | g/cm³ | | 4.950 | 5.100 | | 5.270 | 5.270 | | |
| $T_{liq}$ | ° C. | | | 1250.0 | | 1260.0 | 1260.0 | | |
| $T_g$ | ° C. | | | | | 738.00 | 738.00 | | |
| $n_{531.9\,nm}$ | | | 2.0261 | 2.0630 | | 2.0663 | 2.0663 | 2.0630 | 2.0630 |
| $n_{632.8\,nm}$ | | | 2.0075 | 2.0422 | | 2.0454 | 2.0454 | 2.0421 | 2.0421 |
| | | | | | Predicted and calculated properties | | | | |
| $P_n$ [for $n_d$] | g/cm³ | 1.975 | 2.083 | 2.058 | 2.033 | 2.064 | 2.065 | 2.050 | 2.047 |
| $P_d$ [for $d_{RT}$] | g/cm³ | 4.322 | 5.715 | 5.165 | 4.793 | 5.338 | 5.342 | 5.116 | 5.108 |

| Comparative Examples | | C9 | C10 | C11 | C12 | C13 | C14 | C15 | C16 |
|---|---|---|---|---|---|---|---|---|---|
| Reference | | [7] | [8] | [14] | [9] | [10] | [11] | [3] | [7] |
| | | | | | Composition - mol. % | | | | |
| $La_2O_3$ | mol. % | 12.78 | 22.47 | 0.73 | 22.61 | 23.27 | 19.12 | 22.50 | 11.35 |
| $Nb_2O_5$ | mol. % | 8.09 | 4.43 | 9.50 | 5.52 | 5.58 | 5.45 | 4.43 | 5.08 |
| $TiO_2$ | mol. % | 33.63 | 34.38 | 20.66 | 27.07 | 31.33 | 34.46 | 34.35 | 34.01 |
| $B_2O_3$ | mol. % | 11.96 | 12.94 | 2.74 | 15.36 | 13.09 | 13.53 | 12.95 | 12.94 |
| $SiO_2$ | mol. % | 11.18 | 15.29 | 28.22 | 11.65 | 12.51 | 9.64 | 15.31 | 10.81 |
| $ZrO_2$ | mol. % | 5.56 | 7.02 | 5.71 | 9.13 | 8.30 | 6.47 | 7.04 | 8.18 |
| CaO | mol. % | 3.59 | 0 | 28.15 | 0 | 0 | 0 | 0 | 0 |
| $Ta_2O_5$ | mol. % | 0 | 0 | 0 | 2.27 | 0 | 0 | 0 | 0 |
| $Al_2O_3$ | mol. % | 0 | 0 | 0.26 | 0 | 0 | 0 | 0 | 0 |
| MgO | mol. % | 1.33 | 0 | 0 | 0 | 0 | 0 | 0 | 0 |

TABLE 7-continued

Compositions and Properties of Comparative Example Glasses

| | | | | | | | | | |
|---|---|---|---|---|---|---|---|---|---|
| Gd₂O₃ | mol. % | 0.74 | 3.11 | 0 | 4.90 | 0 | 0 | 3.06 | 0.55 |
| Y₂O₃ | mol. % | 0.30 | 0.38 | 0 | 0 | 4.91 | 0 | 0.36 | 0.82 |
| WO | mol. % | 0 | 0 | 0 | 0 | 0.50 | 0 | 0 | 0.40 |
| Li₂O | mol. % | 0 | 0 | 3.98 | 0 | 0.52 | 0 | 0 | 0 |
| BaO | mol. % | 8.85 | 0 | 0 | 0 | 0 | 11.34 | 0 | 13.13 |
| Yb₂O₃ | mol. % | 0.34 | 0 | 0 | 0 | 0 | 0 | 0 | 0.13 |
| SrO | mol. % | 0.78 | 0 | 0 | 0 | 0 | 0 | 0 | 1.41 |
| ZnO | mol. % | 0.83 | 0 | 0 | 1.49 | 0 | 0 | 0 | 1.14 |
| Sb₂O₃ | mol. % | 0.0461 | 0 | 0.006 | 0 | 0 | 0 | 0 | 0.045 |
| HfO₂ | mol. % | 0 | 0 | 0.0581 | 0 | 0 | 0 | 0 | 0 |
| Measured properties | | | | | | | | | |
| $n_d$ | | 2.0137 | 2.048 | 1.9395 | 2.0451 | 2.051 | 2.040 | 2.048 | 2.016 |
| $d_{RT}$ | g/cm³ | 4.720 | 5.140 | 3.710 | 5.420 | 5.100 | 4.950 | 5.140 | 4.720 |
| $T_{liq}$ | ° C. | | 1260.0 | 1400.0 | 1250.0 | 1250.0 | 1250.0 | 1260.0 | |
| $Log(\eta_{liq})$ | P | | | | | | 0.50000 | | |
| $T_g$ | ° C. | 684.00 | 750.00 | | 746.00 | | | 750.00 | 682.00 |
| $n_{531.9\,nm}$ | | 2.0271 | 2.0612 | 1.9523 | 2.0577 | 2.0640 | 2.0550 | 2.0612 | 2.0291 |
| $n_{1632.8\,nm}$ | | 2.0056 | 2.0400 | 1.9318 | 2.0374 | 2.0432 | 2.0310 | 2.0400 | 2.0081 |
| $TX_{460\,nm}$, % | | | | 93.000 | | | | | |
| Predicted and calculated properties | | | | | | | | | |
| $P_n$ [for $n_d$] | | 2.020 | 2.040 | 1.881 | 2.047 | 2.057 | 2.033 | 2.040 | 2.001 |
| $P_d$ [for $d_{RT}$] | g/cm³ | 4.761 | 5.143 | 3.792 | 5.364 | 5.166 | 5.035 | 5.141 | 4.809 |

| Comparative Examples | | C17 | C18 | C19 | C20 | C21 | C22 | C23 | C24 |
|---|---|---|---|---|---|---|---|---|---|
| Reference | | [4] | [12] | [13] | [15] | [18] | [16] | [17] | [8] |

Composition - mol. %

| | | C17 | C18 | C19 | C20 | C21 | C22 | C23 | C24 |
|---|---|---|---|---|---|---|---|---|---|
| La₂O₃ | mol. % | 14.21 | 0.72 | 0.72 | 14.43 | 0 | 21.67 | 23.43 | 20.99 |
| Nb₂O₅ | mol. % | 3.00 | 8.36 | 8.36 | 18.64 | 0 | 7.19 | 9.59 | 5.07 |
| TiO₂ | mol. % | 33.73 | 26.08 | 26.08 | 16.45 | 23.52 | 16.97 | 31.96 | 33.06 |
| B₂O₃ | mol. % | 17.00 | 2.71 | 2.71 | 22.96 | 17.65 | 28.51 | 22.84 | 13.45 |
| SiO₂ | mol. % | 9.98 | 21.04 | 21.04 | 4.48 | 5.89 | 8.92 | 1.66 | 13.57 |
| ZrO₂ | mol. % | 6.99 | 5.74 | 5.74 | 6.55 | 2.36 | 7.13 | 1.59 | 7.95 |
| CaO | mol. % | 14.99 | 16.92 | 16.92 | 0 | 0 | 0.031 | 0.78 | 0 |
| CeO₂ | mol. % | 0.0878 | 0 | 0 | 0 | 0 | 0.13 | 0 | 0 |
| Ta₂O₅ | mol. % | 0 | 0 | 0 | 1.36 | 0 | 0.0079 | 0 | 0 |
| Al₂O₃ | mol. % | 0 | 0 | 0 | 0 | 17.64 | 0 | 0 | 0 |
| MgO | mol. % | 0 | 0 | 0 | 0 | 0 | 0 | 1.47 | 0 |
| Gd₂O₃ | mol. % | 0 | 0 | 0 | 0 | 0 | 0 | 0.97 | 0 |
| Y₂O₃ | mol. % | 0 | 0 | 0 | 0 | 0 | 0 | 0.56 | 0 |
| WO₃ | mol. % | 0 | 0 | 0 | 0 | 0 | 3.44 | 0 | 0 |
| LizO | mol. % | 0 | 3.94 | 3.94 | 0 | 0 | 0 | 0 | 0 |
| BaO | mol. % | 0 | 14.47 | 14.47 | 0 | 0 | 0 | 0 | 0 |
| Yb₂O₃ | mol. % | 0 | 0 | 0 | 0 | 0 | 0 | 0 | 3.40 |
| ZnO | mol. % | 0 | 0 | 0 | 0 | 0 | 0 | 2.89 | 2.51 |
| Sb₂O₃ | mol. % | 0 | 0.0069 | 0.0069 | 0 | 0 | 0 | 0 | 0 |
| Fe₂O₃ | mol. % | 0.0073 | 0 | 0 | 0 | 0 | 0 | 0 | 0 |
| GeO₂ | mol. % | 0 | 0 | 0 | 15.13 | 0 | 0 | 0 | 0 |
| Er₂O₃ | mol. % | 0 | 0 | 0 | 0 | 32.94 | 0 | 0 | 0 |
| Bi₂O₃ | mol. % | 0 | 0 | 0 | 0 | 0 | 6.01 | 0 | 0 |
| Na₂O | mol. % | 0 | 0 | 0 | 0 | 0 | 0 | 2.26 | 0 |
| Measured properties | | | | | | | | | |
| $n_d$ | | | 1.9729 | 1.9729 | 2.000 | 1.911 | | 2.0023 | 2.051 |
| $d_{RT}$ | g/cm³ | | 4.167 | 4.167 | | | | | 5.210 |
| $T_{liq}$ | ° C. | | | 1230.0 | | | | 1240.0 | |
| $T_g$ | ° C. | | 664.30 | 664.30 | | | | | 731.00 |
| $T_x$ | ° C. | 818.20 | | | | | | | |
| $n_{531.9\,nm}$ | | | 1.9863 | 1.9863 | 2.0132 | | | 2.0142 | 2.0643 |
| $n_{632.8\,nm}$ | | | 1.9647 | 1.9647 | 1.9920 | | | 1.9951 | 2.0429 |
| Predicted and calculated properties | | | | | | | | | |
| $P_n$ [for $n_d$] | | 1.960 | 1.928 | 1.928 | 1.996 | 2.038 | 2.030 | 2.050 | 2.052 |
| $P_d$ [for $d_{RT}$] | g/cm³ | 4.507 | 4.184 | 4.184 | 4.412 | 5.715 | 5.281 | 4.959 | 5.192 |

| Comparative Examples | | C25 | C26 | C27 | C28 | C29 | C30 | C31 | C32 |
|---|---|---|---|---|---|---|---|---|---|
| Reference | | [3] | [9] | [21] | [9] | [8] | [3] | [19] | [20] |

Composition - mol. %

| | | C25 | C26 | C27 | C28 | C29 | C30 | C31 | C32 |
|---|---|---|---|---|---|---|---|---|---|
| La₂O₃ | mol. % | 20.98 | 20.99 | 28.61 | 21.65 | 21.64 | 21.65 | 12.26 | 16.19 |
| Nb₂O₅ | mol. % | 5.08 | 5.07 | 1.61 | 5.23 | 5.22 | 5.23 | 8.87 | 5.22 |
| TiO₂ | mol. % | 33.22 | 33.05 | 22.93 | 34.09 | 34.10 | 34.27 | 17.51 | 34.76 |

TABLE 7-continued

| | | Compositions and Properties of Comparative Example Glasses | | | | | | | |
|---|---|---|---|---|---|---|---|---|---|
| $B_2O_3$ | mol. % | 13.46 | 13.47 | 19.13 | 13.87 | 13.86 | 13.86 | 7.26 | 15.95 |
| $SiO_2$ | mol. % | 13.54 | 13.55 | 8.46 | 13.98 | 14.02 | 14.01 | 2.80 | 13.86 |
| $ZrO_2$ | mol. % | 7.79 | 7.94 | 11.40 | 8.24 | 8.21 | 8.04 | 12.31 | 9.01 |
| $Ta_2O_5$ | mol. % | 0 | 0 | 0 | 0 | 0 | 0 | 8.39 | 0 |
| $Gd_2O_3$ | mol. % | 0 | 0 | 1.87 | 0 | 0 | 0 | 0 | 1.92 |
| $Y_2O_3$ | mol. % | 0 | 0 | 1.04 | 0.37 | 0.37 | 0.37 | 0 | 3.07 |
| $Yb_2O_3$ | mol. % | 3.40 | 3.40 | 0 | 0 | 0 | 0 | 0 | 0 |
| ZnO | mol. % | 2.52 | 2.52 | 4.96 | 2.58 | 2.58 | 2.58 | 0 | 0 |
| $GeO_2$ | mol. % | 0 | 0 | 0 | 0 | 0 | 0 | 30.60 | 0 |
| | | Measured properties | | | | | | | |
| $n_d$ | | 2.051 | 2.051 | 2.0359 | 2.054 | 2.054 | 2.054 | 2.028 | 2.0425 |
| $d_{RT}$ | g/cm$^3$ | 5.210 | 5.210 | | 4.960 | 4.960 | 4.960 | | |
| $T_{liq}$ | ° C. | 1240.0 | 1240.0 | | 1250.0 | 1250.0 | 1250.0 | | |
| $T_g$ | ° C. | 731.00 | 731.00 | | 721.00 | 721.00 | 721.00 | 722.00 | |
| $n_{531.9\,nm}$ | | 2.0643 | 2.0643 | 2.0462 | 2.0677 | 2.0677 | 2.0677 | 2.0413 | 2.0565 |
| $n_{632.8\,nm}$ | | 2.0429 | 2.0429 | 2.0295 | 2.0457 | 2.0457 | 2.0457 | 2.0200 | 2.0341 |
| | | Predicted and calculated properties | | | | | | | |
| $P_n$ [for $n_d$] | | 2.052 | 2.052 | 2.024 | 2.026 | 2.026 | 2.026 | 1.970 | 2.016 |
| $P_d$ [for $d_{RT}$] | g/cm$^3$ | 5.188 | 5.192 | 5.550 | 4.940 | 4.938 | 4.934 | 4.782 | 4.791 |

The reference key for each of the Comparative Glasses listed in Table 7 is as follows: [1] CN111320384A; [2] JP2020169116A; [3] JP6943995; [4] US20220073410A1; [5] U.S. patent application Ser. No. 17/683,527 (filed Mar. 1, 2022); [6] U.S. Pat. No. 4,584,279A; [7] U.S. Pat. No. 9,169,152B2; [8] U.S. Pat. No. 9,302,930B2; [9]U.S. Pat. No. 9,643,880B2; [10] WO2019131123A1; [11] JP2021102549A; [12] U.S. Pat. No. 8,852,745B2; [13] WO2014057584A1; [14] WO2021171950A1; [15] JPH09278480; [16] US20220073410A1; [17] TW202012333; [18] U.S. Pat. No. 5,747,397A; [19] JP2006151758A; [20] JPS6033229; [21] U.S. Pat. No. 9,487,432B2.

Figure 4:
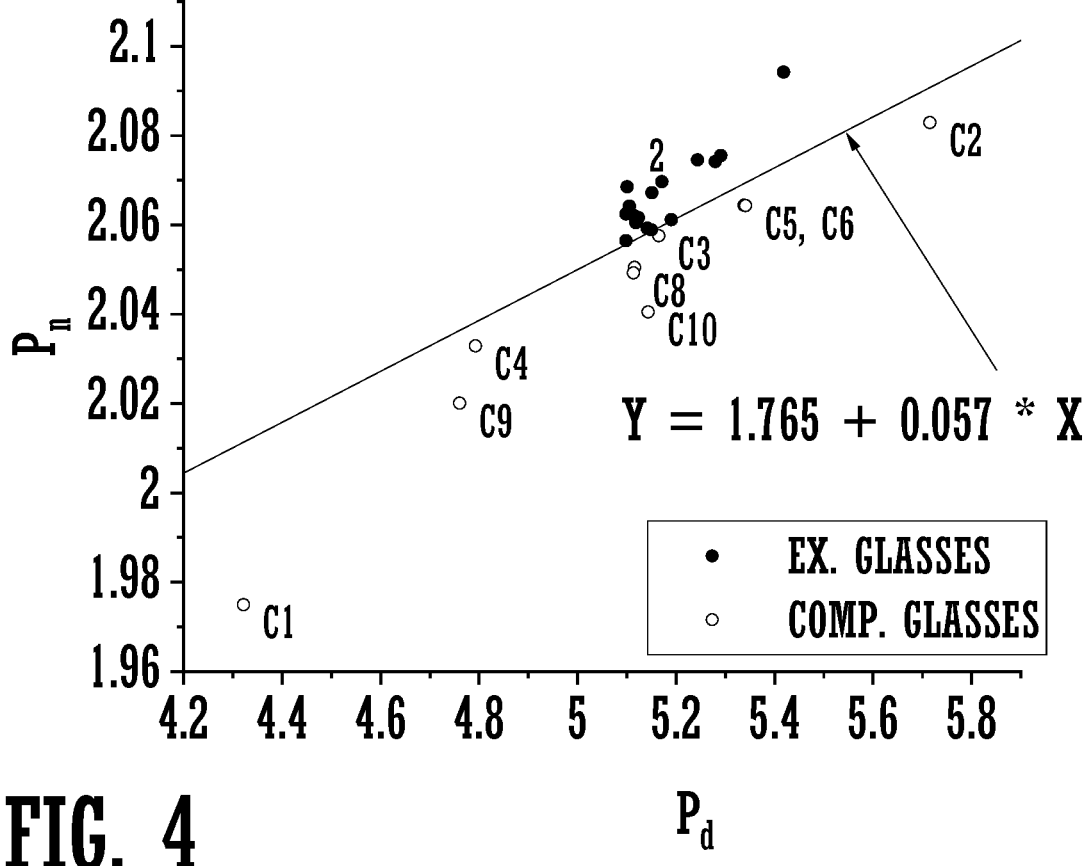
FIG. 4 is a plot illustrating the relationship between the density parameter $P_d$ and the refractive index parameter $P_n$ for some Comparative Glasses and some Exemplary Glasses according to an embodiment of the present disclosure.

FIG. 4 is a plot showing the relationship between the parameter $P_d$ that predicts density at room temperature and the parameter $P_n$ that predicts refractive index at 587.56 nm for some of the Exemplary Glasses and some of the Comparative Glasses. The Exemplary Glasses (filled circles) are the Examples 1 to 4, 7, 8, 13 to 16, 27 to 34 and 51 to 66 from Table 6. The Comparative Glasses (open circles) are the Examples C1 to C10 from Table 7. The parameter $P_d$ that predicts density at room temperature was determined according to Formula (II). The parameter $P_n$ that predicts refractive index at 587.56 nm was determined according to Formula (I). All of the Exemplary Glasses and Comparative Glasses shown in FIG. 4 have the features specified in Table 8. In Table 8, the specification "Not limited" refers to a limitation that was not considered when selecting the compositions.

TABLE 8

Figure 5:
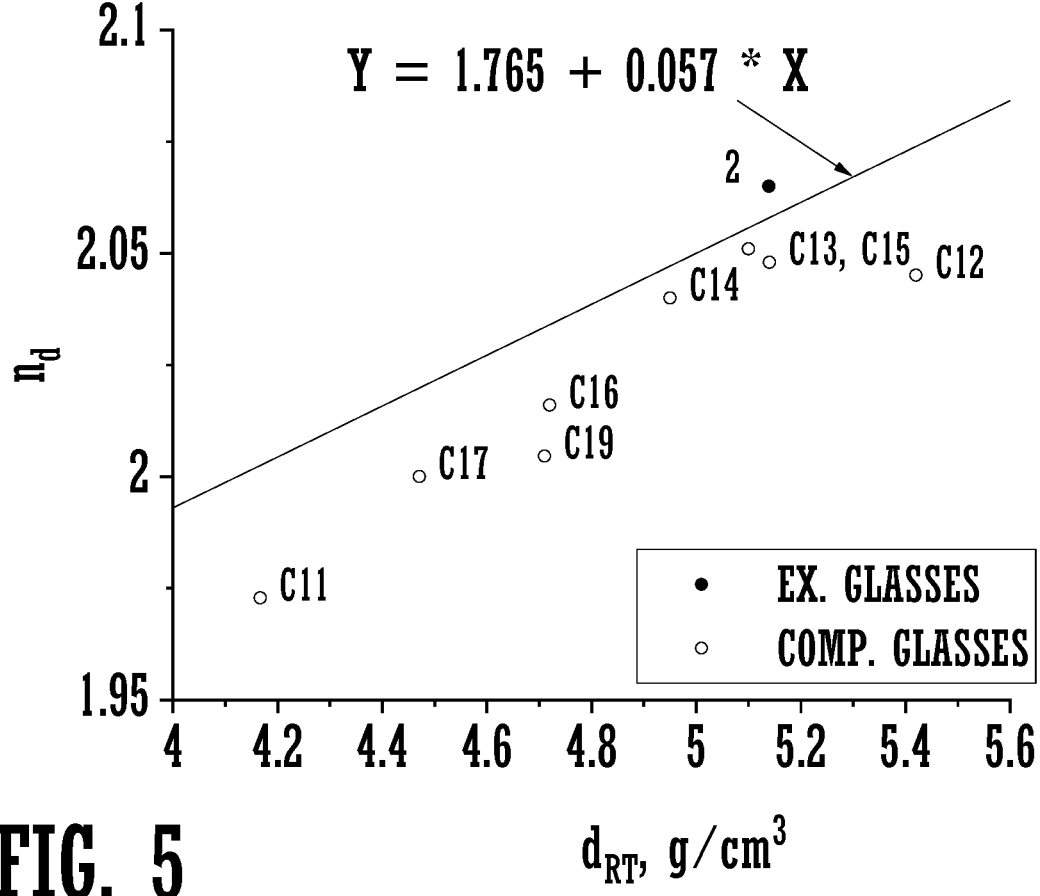
FIG. 5 is a plot illustrating the relationship between the density at room temperature $d_{RT}$ and the refractive index at 587.56 nm $n_d$ for some Comparative Glasses and some Exemplary Glasses according to an embodiment of the present disclosure.

| Limitations for glass compositions shown in FIGS. 4 and 5 | | | |
|---|---|---|---|
| Component | Unit | Min | Max |
| $TiO_2$ | mol. % | 12 | 35 |
| $ZrO_2$ | mol. % | 2.5 | 20 |
| $B_2O_3$ | mol. % | 0.5 | 40 |
| $Nb_2O_5$ | mol. % | 0.5 | 30 |
| $Bi_2O_3$ | mol. % | 0 | 20 |
| $P_2O_5$ | mol. % | 0 | 15 |
| $Al_2O_3$ | mol. % | 0 | 10 |
| $Gd_2O_3$ | mol. % | 0 | 10 |
| $WO_3$ | mol. % | 0 | 8 |
| PbO | mol. % | 0 | 5 |

TABLE 8-continued

| Limitations for glass compositions shown in FIGS. 4 and 5 | | | |
|---|---|---|---|
| Component | Unit | Min | Max |
| $V_2O_5$ | mol. % | 0 | 5 |
| ZnO | mol. % | 0 | 1.5 |
| $R_mO_n$ | mol. % | 95 | Not limited |
| $RE_mO_n$ | mol. % | 0.5 | 35 |
| $SiO_2 + B_2O_3 + P_2O_5$ | mol. % | 10 | Not limited |
| $TiO_2 + Nb_2O_5$ | mol. % | 0 | 42 |
| $GeO_2 + TeO_2$ | mol. % | 0 | Not limited |
| $SiO_2 + B_2O_3{-}P_2O_5$ | mol. % | 0 | Not limited |

The Comparative Glasses of FIG. 4 were selected as having the highest value of the parameter $P_n$ over the range of values of the parameter $P_d$ shown in FIG. 4 among the known glasses that have the features specified in Table 8.

The line corresponding to the formula y=1.765+0.057*x shown in FIG. 4 provides a visual representation of the differences between the Comparative Glasses having the features specified in Table 8 and the Exemplary Glasses 1 to 4, 7, 8, 13 to 16, 27 to 34 and 51 to 66. As can be seen in FIG. 4, the mentioned Exemplary Glasses (filled circles) and none of the Comparative Glasses (open circles) represented in FIG. 4 fall above the line y=1.765+0.057*x, where y corresponds to the parameter $P_n$ that predicts refractive index at 587.56 nm and x corresponds to the parameter $P_d$ that that predicts density at room temperature. In other words, some of the Exemplary Glasses and none of the Comparative Glasses represented in FIG. 4 satisfy the following formula (III):

$$P_n - (1.765 + 0.057 * P_d) > 0.00 \tag{III}$$

The Exemplary Examples represented in FIG. 4 are, by prediction, superior in terms of the combination of $P_d$ and $P_n$ to the best known Comparative Glasses that have the features specified in Table 8.

FIG. 5 is a plot showing the relationship between the density at room temperature $d_{RT}$ and the refractive index at 587.56 nm $n_d$ for some of the Exemplary Glasses and some of the Comparative Glasses. The Exemplary Glass (filled circle) is Example 2 from Table 6. The Comparative Glasses (open circles) are the Examples C10 to C19 from Table 7.

All of the Exemplary Glasses and Comparative Glasses shown in FIG. 5 have the features specified in Table 8.

The Comparative Glasses of FIG. 5 were selected as having the highest measured values of the refractive index at 587.56 nm $n_d$ over the range of measured density at room temperature $d_{RT}$ shown in FIG. 5 among the known glasses that have the mentioned features specified in Table 8.

The line corresponding to the formula y=1.765+0.057*x shown in FIG. 5 provides a visual representation of the differences between the Comparative Glasses having the features specified in Table 8 and the Exemplary Glass 2. As can be seen in FIG. 5, the mentioned Exemplary Glass (filled circles) and none of the Comparative Glasses (open circles) represented in FIG. 5 fall above the line y=1.765+0.057*x, where y corresponds to $n_d$ and x corresponds to $d_{RT}$. In other words, some of the Exemplary Glasses and none of the Comparative Glasses represented in FIG. 5 satisfy the following formula (IV):

$$n_d-(1.765+0.057*d_{RT})>0.00 \qquad \text{(IV)}$$

This means that, under the conditions specified in Table 8 above, some of the Exemplary Glasses have higher measured values of the refractive index at 587.56 nm $n_d$ at comparable measured values of the density at room temperature $d_{RT}$ than the best of the Comparative Glasses satisfying the same conditions. This can be interpreted as these Exemplary Glasses, according to measurements, have higher values of $n_d$ at comparable values of $d_{RT}$ among the glasses, i.e. they are, according to measurement, superior in terms of a combination of $d_{RT}$ and $n_d$ (i.e. lower $d_{RT}$ for a given $n_d$ or higher $n_d$ for a given $d_{RT}$) to the best known Comparative Glasses that have the features specified in Table 8.

The values of all attributes specified in Table 8 and Formulas (Ill) and (IV) for the Comparative Glasses C1 to C19 plotted in FIGS. 4 and 5 are presented in Table 9 below. Full compositions of the Comparative Glasses are presented in Table 7. Full compositions and attributes of the Exemplary Glasses are presented in Table 6.

TABLE 9

| Attributes of Comparative Example Glasses Having the Features Specified in Table 8 | | | | | | | | | |
|---|---|---|---|---|---|---|---|---|---|
| Ex. # | | C1 | C2 | C3 | C4 | C5 | C6 | C7 | C8 |
| Composition | | | | | | | | | |
| TiO$_2$ | mol. % | 26.46 | 22.68 | 31.38 | 12.99 | 31.92 | 31.75 | 31.04 | 30.85 |
| ZrO$_2$ | mol. % | 6.99 | 12.50 | 8.31 | 6.99 | 9.03 | 9.19 | 8.30 | 8.25 |
| B$_2$O$_3$ | mol. % | 19.96 | 13.01 | 14.22 | 34.98 | 18.28 | 18.28 | 14.80 | 14.71 |
| RE$_m$O$_n$ | mol. % | 14.06 | 34.99 | 28.23 | 19.99 | 27.65 | 27.65 | 27.66 | 27.50 |
| Nb$_2$O$_5$ | mol. % | 11.98 | 4.70 | 5.59 | 17.99 | 5.55 | 5.55 | 5.67 | 5.64 |
| Bi$_2$O$_3$ | mol. % | 0 | 0 | 0 | 0 | 0 | 0 | 0 | 0 |
| P$_2$O$_5$ | mol. % | 0 | 0 | 0 | 0 | 0 | 0 | 0 | 0 |
| Al$_2$O$_3$ | mol. % | 0.0157 | 2.67 | 0 | 0 | 0 | 0 | 0 | 0 |
| Gd$_2$O$_3$ | mol. % | 0 | 3.80 | 0 | 0 | 4.97 | 4.93 | 0 | 0 |
| WO$_3$ | mol. % | 0 | 0 | 0.50 | 7.00 | 0 | 0 | 0.50 | 0.49 |
| PbO | mol. % | 0.0018 | 0 | 0 | 0 | 0 | 0 | 0 | 0 |
| V$_2$O$_5$ | mol. % | 0 | 0 | 0 | 0 | 0 | 0 | 0 | 0 |
| ZnO | mol. % | 0.0033 | 0 | 0 | 0 | 0 | 0 | 0 | 0 |
| SiO$_2$ + B$_2$O$_3$ + P$_2$O$_5$ | mol. % | 35.44 | 20.55 | 25.46 | 35.04 | 25.85 | 25.85 | 26.32 | 26.16 |
| TiO$_2$ + Nb$_2$O$_5$ | mol. % | 38.44 | 27.39 | 36.98 | 30.97 | 37.47 | 37.30 | 36.71 | 36.49 |
| GeO$_2$ + TeO$_2$ | mol. % | 0 | 0 | 0 | 0 | 0 | 0 | 0 | 0 |
| SiO$_2$ + B2O$_3$ − P$_2$O$_5$ | mol. % | 35.44 | 20.55 | 25.46 | 35.04 | 25.85 | 25.85 | 26.32 | 26.16 |
| Measured properties | | | | | | | | | |
| $d_{RT}$ | g/cm$^3$ | | | | | | | | |
| $n_d$ | | | | | | | | | |
| $n_d$ − (1.765 + 0.057 * $d_{RT}$) | | | | | | | | | |
| Predicted and calculated properties | | | | | | | | | |
| P$_d$ | g/cm$^3$ | 4.3217 | 5.7151 | 5.1648 | 4.7926 | 5.3379 | 5.341 | 5.1158 | 5.1133 |
| P$_n$ | | 1.9749 | 2.0829 | 2.0576 | 2.0329 | 2.0644 | 2.0643 | 2.0505 | 2.0492 |
| P$_n$ − (1.765 + 0.057 * P$_d$) | | −0.0364 | −0.0078 | −0.0018 | −0.0053 | −0.0049 | −0.0051 | −0.0061 | −0.0072 |

| Ex. # | | C9 | C10 | C11 | C12 | C13 | C14 | C15 | C16 |
|---|---|---|---|---|---|---|---|---|---|
| Composition | | | | | | | | | |
| TiO$_2$ | mol. % | 33.63 | 34.38 | 20.66 | 27.08 | 31.33 | 34.46 | 34.37 | 34.01 |
| ZrO$_2$ | mol. % | 5.56 | 7.02 | 5.71 | 9.14 | 8.30 | 6.47 | 7.04 | 8.17 |
| B$_2$O$_3$ | mol. % | 11.96 | 12.94 | 2.74 | 15.37 | 13.09 | 13.53 | 12.93 | 12.94 |
| RE$_m$O$_n$ | mol. % | 14.16 | 25.95 | 0.73 | 27.52 | 28.18 | 19.12 | 25.92 | 12.85 |
| Nb$_2$O$_5$ | mol. % | 8.09 | 4.43 | 9.50 | 5.52 | 5.58 | 5.45 | 4.43 | 5.09 |
| Bi$_2$O$_3$ | mol. % | 0 | 0 | 0 | 0 | 0 | 0 | 0 | 0 |
| P$_2$O$_5$ | mol. % | 0 | 0 | 0 | 0 | 0 | 0 | 0 | 0 |
| Al$_2$O$_3$ | mol. % | 0 | 0 | 0.26 | 0 | 0 | 0 | 0 | 0 |
| Gd$_2$O$_3$ | mol. % | 0.74 | 3.11 | 0 | 4.90 | 0 | 0 | 3.07 | 0.55 |
| WO$_3$ | mol. % | 0 | 0 | 0 | 0 | 0.50 | 0 | 0 | 0.40 |
| PbO | mol. % | 0 | 0 | 0 | 0 | 0 | 0 | 0 | 0 |
| V$_2$O$_5$ | mol. % | 0 | 0 | 0 | 0 | 0 | 0 | 0 | 0 |
| ZnO | mol. % | 0.83 | 0 | 0 | 1.50 | 0 | 0 | 0 | 1.14 |
| SiO$_2$ + B$_2$O$_3$ + P$_2$O$_5$ | mol. % | 23.14 | 28.22 | 30.96 | 26.99 | 25.59 | 23.17 | 28.24 | 23.75 |
| TiO$_2$ + Nb$_2$O$_5$ | mol. % | 41.72 | 38.81 | 30.16 | 32.60 | 36.91 | 39.91 | 38.80 | 39.09 |
| GeO$_2$ + TeO$_2$ | mol. % | 0 | 0 | 0 | 0 | 0 | 0 | 0 | 0 |
| SiO$_2$ + B2O$_3$ − P$_2$O$_5$ | mol. % | 23.14 | 28.22 | 30.96 | 26.99 | 25.59 | 23.17 | 28.24 | 23.75 |

TABLE 9-continued

Attributes of Comparative Example Glasses Having the Features Specified in Table 8

Measured properties

| | | | | | | | | |
|---|---|---|---|---|---|---|---|---|
| $d_{RT}$ | g/cm³ | | 5.140 | 3.710 | 5.420 | 5.100 | 4.950 | 5.140 | 4.720 |
| $n_d$ | | | 2.048 | 1.9395 | 2.0451 | 2.051 | 2.040 | 2.048 | 2.016 |
| $n_d - (1.765 + 0.057 * d_{RT})$ | | | −0.010 | −0.037 | −0.0288 | −0.0047 | −0.0072 | −0.010 | −0.018 |

Predicted and calculated properties

| | | | | | | | | | |
|---|---|---|---|---|---|---|---|---|---|
| $P_d$ | g/cm³ | 4.7605 | 5.1432 | 3.7917 | 5.3639 | 5.1658 | 5.0348 | 5.1416 | 4.8093 |
| $P_n$ | | 2.0201 | 2.0405 | 1.8806 | 2.0472 | 2.0573 | 2.0326 | 2.0402 | 2.0011 |
| $P_n - (1.765 + 0.057 * P_d)$ | | −0.0163 | −0.0177 | −0.1005 | −0.0236 | −0.0022 | −0.0194 | −0.0179 | −0.0380 |

| Ex. # | | C17 | C18 | C19 |
|---|---|---|---|---|

Composition

| | | C17 | C18 | C19 |
|---|---|---|---|---|
| $TiO_2$ | mol. % | 33.73 | 26.08 | 26.08 |
| $ZrO_2$ | mol. % | 6.99 | 5.74 | 5.74 |
| $B_2O_3$ | mol. % | 17.00 | 2.71 | 2.71 |
| $RE_mO_n$ | mol. % | 14.29 | 0.72 | 0.72 |
| $Nb_2O_5$ | mol. % | 3.00 | 8.36 | 8.36 |
| $Bi_2O_3$ | mol. % | 0 | 0 | 0 |
| $P_2O_5$ | mol. % | 0 | 0 | 0 |
| $Al_2O_3$ | mol. % | 0 | 0 | 0 |
| $Gd_2O_3$ | mol. % | 0 | 0 | 0 |
| $WO_3$ | mol. % | 0 | 0 | 0 |
| PbO | mol. % | 0 | 0 | 0 |
| $V_2O_5$ | mol. % | 0 | 0 | 0 |
| ZnO | mol. % | 0 | 0 | 0 |
| $SiO_2 + B_2O_3 + P_2O_5$ | mol. % | 26.98 | 23.76 | 23.76 |
| $TiO_2 + Nb_2O_5$ | mol. % | 36.74 | 34.45 | 34.45 |
| $GeO_2 + TeO_2$ | mol. % | 0 | 0 | 0 |
| $SiO_2 + B2O_3 - P_2O_5$ | mol. % | 26.98 | 23.76 | 23.76 |

Measured properties

| | | C17 | C18 | C19 |
|---|---|---|---|---|
| $d_{RT}$ | g/cm³ | 4.471 | 4.167 | 4.167 |
| $n_d$ | | 2.000 | 1.9729 | 1.9729 |
| $n_d - (1.765 + 0.057 * d_{RT})$ | | −0.0198 | −0.0297 | −0.0297 |

Predicted and calculated properties

| | | C17 | C18 | C19 |
|---|---|---|---|---|
| $P_d$ | g/cm³ | 4.5071 | 4.1835 | 4.1835 |
| $P_n$ | | 1.9597 | 1.9281 | 1.9281 |
| $P_n - (1.765 + 0.057 * P_d)$ | | −0.0622 | −0.0754 | −0.0754 |

As follows from FIGS. 4 and 5, both predicted and measured property data confirms that some of the Exemplary Glasses have a better combination of density at room temperature $d_{RT}$ and refractive index at 587.56 nm $n_d$ than the best of the Comparative Glasses that have the features specified in Table 8.

$TiO_2$ provides high refractive index at a lower density than $Nb_2O_5$, $WO_3$ and $Bi_2O_3$, but may adversely decrease the blue transmittance of glass. That is why in some embodiments of the present disclosure it is desirable to reach high refractive indexes, adding lower amount of $TiO_2$ comparing to other high index components. Accordingly, reaching higher refractive indexes at comparable values of the molar ratio $TiO_2/(TiO_2+Nb_2O_5+WO_3+Bi_2O_3)$ indirectly indicates a potential advantage in terms of blue transmittance in combination with high refractive index and low density.

Figure 6:
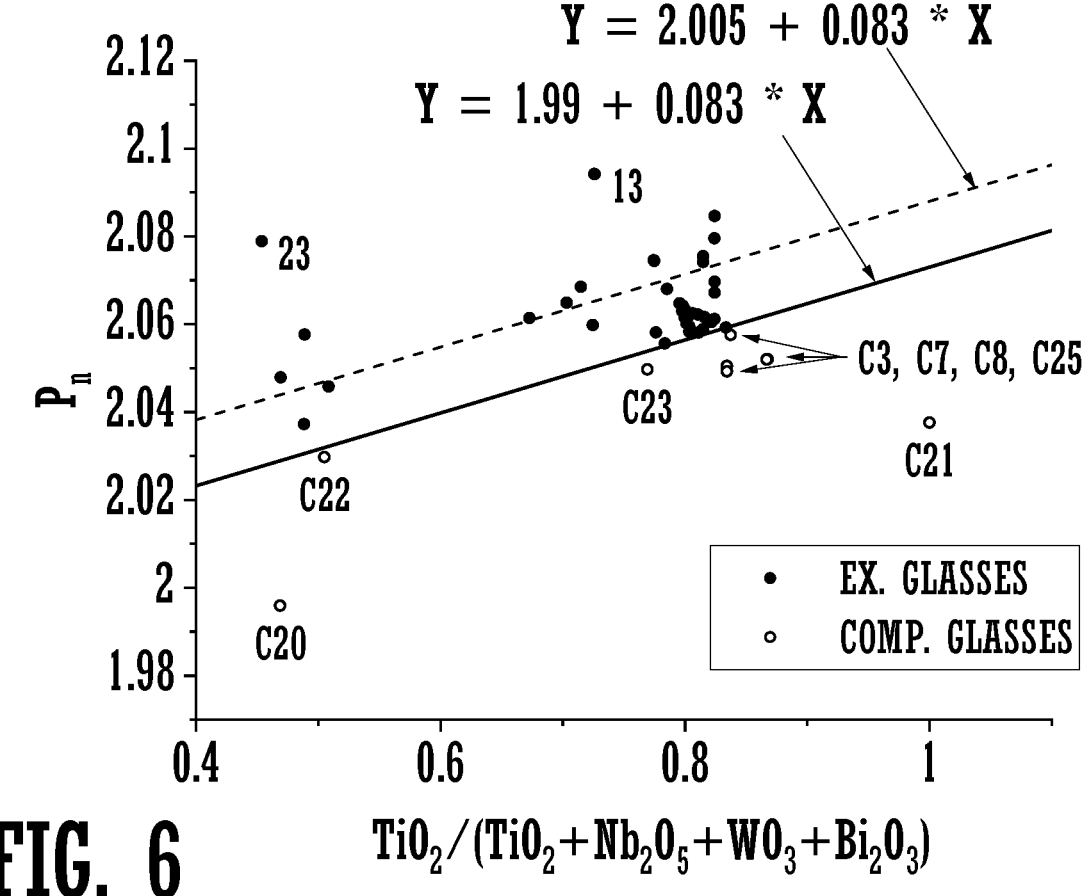
FIG. 6 is a plot illustrating the relationship between the ratio $TiO_2/(TiO_2+Nb_2O_5+WO_3+Bi_2O_3)$ and the refractive index parameter $P_n$ for some Comparative Glasses and some Exemplary Glasses according to an embodiment of the present disclosure.

FIG. 6 is a plot showing the relationship between the ratio $TiO_2/(TiO_2+Nb_2O_5+WO_3+Bi_2O_3)$ and the predictive parameter $P_n$ for some of the Exemplary Glasses and some of the Comparative Glasses. The Exemplary Glasses (filled circles) are the Examples 1 to 6, 8 to 19, 23, 25, 27 to 34 and 51 to 67 from Table 6. The Comparative Glasses (open circles) are the Examples C3, C7, C8 and C20 to C26 from Table 7. The parameter $P_n$ that predicts refractive index at 587.56 nm was determined according to Formula (I). All of the Exemplary Glasses and Comparative Glasses shown in FIG. 6 have the features specified in Table 10. In Table 10, the specification "Not limited" refers to a limitation that was not considered when selecting the compositions.

TABLE 10

Figure 7:
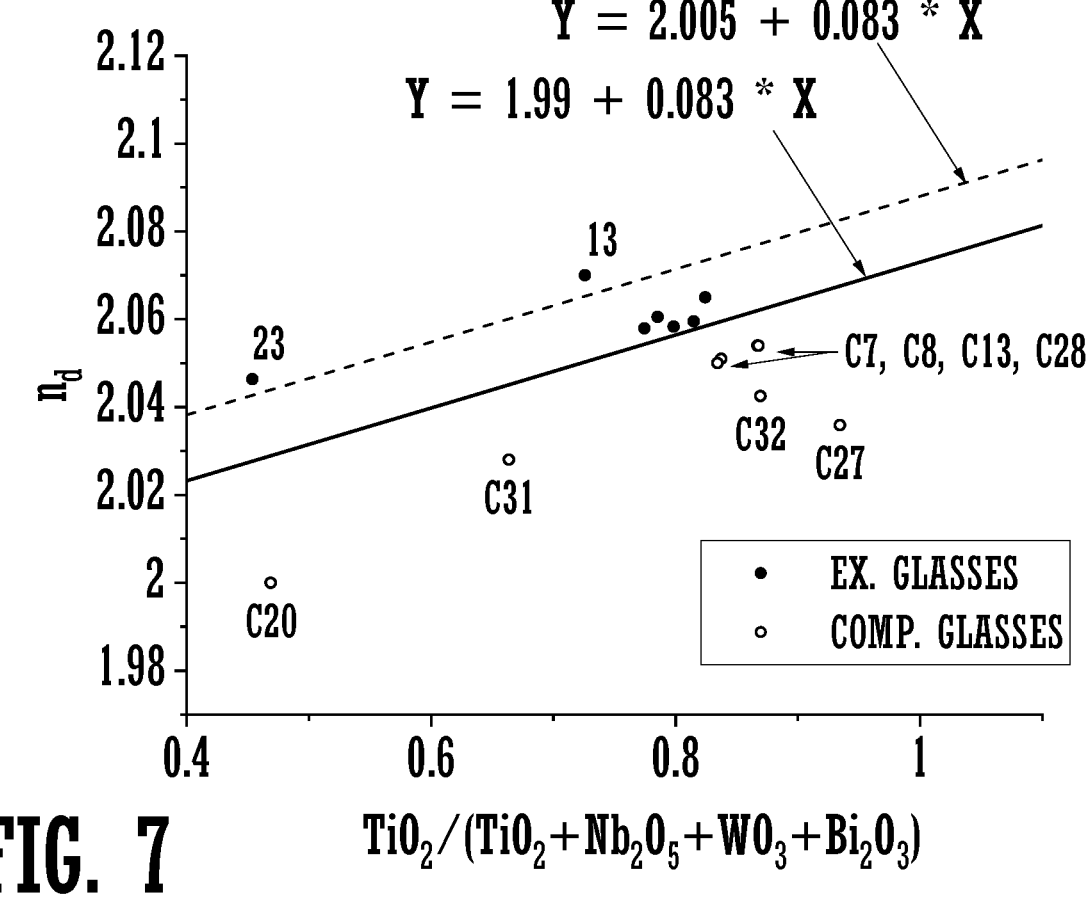
FIG. 7 is a plot illustrating the relationship between the ratio $TiO_2/(TiO_2+Nb_2O_5+WO_3+Bi_2O_3)$ and the refractive index at 587.56 nm $n_d$ for some Comparative Glasses and some Exemplary Glasses according to an embodiment of the present disclosure.

Limitations for glass compositions shown in FIGS. 6 and 7

| Component | Unit | Min | Max |
|---|---|---|---|
| $ZrO_2$ | mol. % | 1 | 13.5 |
| $TiO_2$ | mol. % | 0.3 | 35 |
| $B_2O_3$ | mol. % | 0.3 | 29.5 |
| $WO_3$ | mol. % | 0 | 9 |
| PbO | mol. % | 0 | 5 |
| $Gd_2O_3$ | mol. % | 0 | 2 |
| F | at. % | 0 | 2 |
| $TiO_2 + Nb_2O_5 + La_2O_3$ | mol. % | 10 | 70 |
| $SiO_2 + B_2O_3 + P_2O_5$ | mol. % | 10 | Not limited |
| $RE_mO_n + WO_3 + ZrO_2$ | mol. % | 5 | Not limited |
| $SiO_2 + Y_2O_3 + Gd_2O_3$ | mol. % | 0.3 | Not limited |
| $V_2O_5 + MoO_3$ | mol. % | 0 | 3 |
| $WO_3 + Bi_2O_3$ | mol. % | 0 | Not limited |
| $SiO_2 + B_2O_3—P_2O_5$ | mol. % | 1 | Not limited |
| $La_2O_3/TiO_2$ | mol. % | Not limited | 1.5 |
| $TiO_2/(TiO_2 + Nb_2O_5 + WO_3 + Bi_2O_3)$ | mol. % | 0 | Not limited |

The Comparative Glasses shown in FIG. 6 were selected as having the highest value of the parameter $P_n$ that predicts refractive index at 587.56 nm over the range of the ratio $TiO_2/(TiO_2+Nb_2O_5+WO_3+Bi_2O_3)$ shown in FIG. 6 among the known glasses that have the features specified in Table 10.

The line corresponding to the formula $y=1.99+0.083*x$ shown in FIG. 6 provides a visual representation of the differences between the Comparative Glasses having the features specified in Table 10 and the Exemplary Glasses 1 to 6, 8 to 19, 23, 25, 27 to 34 and 51 to 67. As can be seen in FIG. 6, the mentioned Exemplary Glasses (filled circles) and none of the Comparative Glasses (open circles) represented in FIG. 6 fall above the line $y=1.99+0.083*x$, where y corresponds to the parameter $P_n$ that predicts refractive index at 587.56 nm and x corresponds to the ratio $TiO_2/(TiO_2+Nb_2O_5+WO_3+Bi_2O_3)$. In other words, some of the Exemplary Glasses and none of the Comparative Glasses represented in FIG. 6 satisfy the following formula (V)(a):

$$P_n-(1.99+0.083*TiO_2/(TiO_2+Nb_2O_5+WO_3+Bi_2O_3))> 0.00 \qquad \text{(V)(a)}$$

As can also be seen in FIG. 6, some of Exemplary Glasses and none of the Comparative Glasses represented in FIG. 6 fall above the line $y=2.005+0.083*x$, where y corresponds to the parameter $P_n$ that predicts refractive index at 587.56 nm and x corresponds to the ratio $TiO_2/(TiO_2+Nb_2O_5+WO_3+Bi_2O_3)$. In other words, some of the Exemplary Glasses and none of the Comparative Glasses represented in FIG. 6 satisfy the following formula (V)(b):

$$P_n-(2.005+0.083*TiO_2/(TiO_2+Nb_2O_5+WO_3+Bi_2O_3))> 0.00 \qquad \text{(V)(b)}$$

The Exemplary Examples represented in FIG. 6 are, by prediction, superior in terms of the combination of the ratio $TiO_2/(TiO_2+Nb_2O_5+WO_3+Bi_2O_3)$ and the predictive parameter $P_n$ (i.e. lower ratio for a given $P_n$ or higher $P_n$ for a given ratio) to the best known Comparative Glasses that have the features specified in Table 10.

FIG. 7 is a plot showing the relationship between the ratio $TiO_2/(TiO_2+Nb_2O_5+WO_3+Bi_2O_3)$ and the measured refractive index at 587.56 nm $n_d$ for some of the Exemplary Glasses and some of the Comparative Glasses. The Exemplary Glasses (filled circles) are the Examples 2, 3, 13, 14, 23, 65 and 66 from Table 6. The Comparative Glasses (open circles) are the Examples C7, C8, C13, C20 and C27 to C32 from Table 7. All of the Exemplary Glasses and Comparative Glasses shown in FIG. 7 have the features specified in Table 10. In Table 10, the specification "Not limited", if appears, refers to a limitation that was not considered when selecting the compositions.

The Comparative Glasses of FIG. 7 were selected as having the highest measured values of the refractive index at 587.56 nm $n_d$ over the range of values of the ratio $TiO_2/$ $(TiO_2+Nb_2O_5+WO_3+Bi_2O_3)$ shown in FIG. 7 among the known glasses that have the mentioned features specified in Table 10.

The line corresponding to the formula $y=1.99+0.083*x$ shown in FIG. 7 provides a visual representation of the differences between the Comparative Glasses having the features specified in Table 10 and the Exemplary Glasses 2, 3, 13, 14, 23, 65 and 66. As can be seen in FIG. 7, the mentioned Exemplary Glasses (filled circles) and none of the Comparative Glasses (open circles) represented in FIG. 7 fall above the line $y=1.99+0.083*x$, where y corresponds to $n_d$ and x corresponds to the ratio $TiO_2/(TiO_2+Nb_2O_5+WO_3+Bi_2O_3)$. In other words, some of the Exemplary Glasses and none of the Comparative Glasses represented in FIG. 7 satisfy the following formula (VI)(a):

$$n_d-(1.99+0.083*TiO_2/(TiO_2+Nb_2O_5+WO_3+Bi_2O_3))> 0.00 \qquad \text{(VI)(a)}$$

As can also be seen in FIG. 7, some of Exemplary Glasses and none of the Comparative Glasses represented in FIG. 7 fall above the line $y=2.005+0.083*x$, where y corresponds to $n_d$ and x corresponds to the ratio $TiO_2/(TiO_2+Nb_2O_5+WO_3+Bi_2O_3)$. In other words, some of the Exemplary Glasses and none of the Comparative Glasses represented in FIG. 7 satisfy the following formula (VI)(b):

$$n_d-(2.005+0.083*TiO_2/(TiO_2+Nb_2O_5+WO_3+Bi_2O_3))> 0.00 \qquad \text{(VI)(b)}$$

The Exemplary Examples represented in FIG. 7 that satisfy the formula (VI)(b) are characterized by the highest values of $n_d$ at comparable values of the ratio $TiO_2/(TiO_2+Nb_2O_5+WO_3+Bi_2O_3)$ among the glasses that have the features specified in Table 10.

This means that, under the conditions specified in Table 10 above, some of the Exemplary Glasses have higher measured values of the refractive index at 587.56 nm $n_d$ at comparable measured values of the ratio $TiO_2/(TiO_2+Nb_2O_5+WO_3+Bi_2O_3)$ than the best of the Comparative Glasses satisfying the same conditions. This can be interpreted as these Exemplary Glasses, according to measurements, have higher values of $n_d$ at comparable values of $TiO_2/(TiO_2+Nb_2O_5+WO_3+Bi_2O_3)$ among the glasses, i.e. they are, according to measurement, superior in terms of a combination of $TiO_2/(TiO_2+Nb_2O_5+WO_3+Bi_2O_3)$ and $n_d$ to the best known Comparative Glasses that have the features specified in Table 10.

The values of all attributes specified in Table 10 and Formulas (V)(a), (V)(b), (VI)(a) and (VI)(b) for the Comparative Glasses C3, C7, C8, C13 and C20 to C32 plotted in FIGS. 6 and 7 are presented in Table 11 below. Full compositions of comparative example glasses are presented in Table 7. Full compositions and attributes of the Exemplary Glasses are presented in Table 6.

TABLE 11

| Attributes of Comparative Example Glasses Having the Features Specified in Table 10 | | | | | | | | | |
|---|---|---|---|---|---|---|---|---|---|
| Ex. # | | C3 | C7 | C8 | C13 | C20 | C21 | C22 | C23 |
| | | | | Composition | | | | | |
| $TiO_2$ | mol. % | 31.38 | 31.04 | 30.85 | 31.33 | 16.45 | 23.53 | 16.97 | 31.95 |
| $B_2O_3$ | mol. % | 14.22 | 14.80 | 14.71 | 13.09 | 22.96 | 17.65 | 28.51 | 22.86 |
| $WO_3$ | mol. % | 0.50 | 0.50 | 0.49 | 0.50 | 0 | 0 | 3.44 | 0 |
| PbO | mol. % | 0 | 0 | 0 | 0 | 0 | 0 | 0 | 0 |
| $Gd_2O_3$ | mol. % | 0 | 0 | 0 | 0 | 0 | 0 | 0 | 0.96 |
| F | mol. % | 0 | 0 | 0 | 0 | 0 | 0 | 0 | 0 |
| $TiO_2 + Nb_2O_5 + La_2O_3$ | mol. % | 60.29 | 59.41 | 59.06 | 60.18 | 49.51 | 23.53 | 45.82 | 64.94 |
| $SiO_2 + B_2O_3 + P_2O_5$ | mol. % | 25.46 | 26.32 | 26.16 | 25.59 | 27.44 | 23.53 | 37.43 | 24.53 |
| $RE_mO_n + WO_3 + ZrO_2$ | mol. % | 37.04 | 36.46 | 36.24 | 36.98 | 20.98 | 35.29 | 32.36 | 26.52 |
| $SiO_2 + Y_2O_3 + Gd_2O_3$ | mol. % | 16.15 | 16.48 | 16.38 | 17.41 | 4.48 | 5.88 | 8.92 | 3.19 |

TABLE 11-continued

| Attributes of Comparative Example Glasses Having the Features Specified in Table 10 | | | | | | | | | |
|---|---|---|---|---|---|---|---|---|---|
| $V_2O_5 + MoO_3$ | mol. % | 0 | 0 | 0 | 0 | 0 | 0 | 0 | 0 |
| $WO_3 + Bi_2O_3$ | mol. % | 0.50 | 0.50 | 0.49 | 0.50 | 0 | 0 | 9.45 | 0 |
| $TiO_2/(TiO_2 + Nb_2O_5 + WO_3 + Bi_2O_3)$ | mol. % | 0.8373 | 0.8342 | 0.8342 | 0.8373 | 0.4688 | 1.000 | 0.5050 | 0.7692 |
| $SiO_2 + B_2O_3 - P_2O_5$ | mol. % | 25.46 | 26.32 | 26.16 | 25.59 | 27.44 | 23.53 | 37.43 | 24.53 |
| $La_2O_3/TiO_2$ | mol. % | 0.7429 | 0.7316 | 0.7316 | 0.7430 | 0.8773 | 0 | 1.277 | 0.7329 |
| Measured properties | | | | | | | | | |
| $n_d$ | | 2.050 | 2.050 | 2.051 | 2.000 | | | | |
| $n_d - (1.99 + 0.083 * TiO_2/(TiO_2 + Nb_2O_5 + WO_3 + Bi_2O_3))$ | | –0.0092 | –0.0092 | –0.0085 | –0.0289 | | | | |
| $n_d - (2.005 + 0.083 * TiO_2/(TiO_2 + Nb_2O_5 + WO_3 + Bi_2O_3))$ | | –0.0242 | –0.0242 | –0.0235 | –0.0439 | | | | |
| Predicted and calculated properties | | | | | | | | | |
| $P_n$ | | 2.0576 | 2.0505 | 2.0492 | 2.0573 | 1.9959 | 2.0376 | 2.0298 | 2.0497 |
| $P_n - (1.99 + 0.083 * TiO_2/(TiO_2 + Nb_2O_5 + WO_3 + Bi_2O_3))$ | | –0.0019 | –0.0088 | –0.0100 | –0.0022 | –0.0330 | –0.0354 | –0.0022 | –0.0041 |
| $P_n - (2.005 + 0.083 * TiO_2/(TiO_2 + Nb_2O_5 + WO_3 + Bi_2O_3))$ | | –0.0169 | –0.0238 | –0.0250 | –0.0172 | –0.0480 | –0.0504 | –0.0172 | –0.0191 |

| Ex. # | | C24 | C25 | C26 | C27 | C28 | C29 | C30 | C31 | C32 |
|---|---|---|---|---|---|---|---|---|---|---|
| Composition | | | | | | | | | | |
| $TiO_2$ | mol. % | 33.06 | 33.23 | 33.04 | 22.93 | 34.09 | 34.10 | 34.28 | 17.51 | 34.76 |
| $B_2O_3$ | mol. % | 13.44 | 13.45 | 13.45 | 19.13 | 13.87 | 13.87 | 13.87 | 7.26 | 15.95 |
| $WO_3$ | mol. % | 0 | 0 | 0 | 0 | 0 | 0 | 0 | 0 | 0 |
| PbO | mol. % | 0 | 0 | 0 | 0 | 0 | 0 | 0 | 0 | 0 |
| $Gd_2O_3$ | mol. % | 0 | 0 | 0 | 1.87 | 0 | 0 | 0 | 0 | 1.92 |
| F | mol. % | 0 | 0 | 0 | 0 | 0 | 0 | 0 | 0 | 0 |
| $TiO_2 + Nb_2O_5 + La_2O_3$ | mol. % | 59.12 | 59.28 | 59.11 | 53.15 | 60.96 | 60.96 | 61.15 | 38.64 | 56.18 |
| $SiO_2 + B_2O_3 + P_2O_5$ | mol. % | 27.02 | 27.02 | 27.03 | 27.59 | 27.87 | 27.88 | 27.87 | 10.06 | 29.82 |
| $RE_mO_n + WO_3 + ZrO_2$ | mol. % | 32.35 | 32.17 | 32.34 | 42.91 | 30.25 | 30.22 | 30.05 | 24.56 | 30.20 |
| $SiO_2 + Y_2O_3 + Gd_2O_3$ | mol. % | 13.57 | 13.57 | 13.57 | 11.37 | 14.37 | 14.38 | 14.37 | 2.80 | 18.85 |
| $V_2O_5 + MoO_3$ | mol. % | 0 | 0 | 0 | 0 | 0 | 0 | 0 | 0 | 0 |
| $WO_3 + Bi_2O_3$ | mol. % | 0 | 0 | 0 | 0 | 0 | 0 | 0 | 0 | 0 |
| $TiO_2/(TiO_2 + Nb_2O_5 + WO_3 + Bi_2O_3)$ | mol. % | 0.8670 | 0.8676 | 0.8669 | 0.9344 | 0.8671 | 0.8672 | 0.8677 | 0.6636 | 0.8694 |
| $SiO_2 + B_2O_3 - P_2O_5$ | mol. % | 27.02 | 27.02 | 27.03 | 27.59 | 27.87 | 27.88 | 27.87 | 10.06 | 29.82 |
| $La_2O_3/TiO_2$ | mol. % | 0.6348 | 0.6314 | 0.6351 | 1.247 | 0.6350 | 0.6347 | 0.6314 | 0.7001 | 0.4658 |
| Measured properties | | | | | | | | | | |
| $n_d$ | | | | | 2.0359 | 2.054 | 2.054 | 2.054 | 2.028 | 2.0425 |
| $n_d - (1.99 + 0.083 * TiO_2/(TiO_2 + Nb_2O_5 + WO_3 + Bi_2O_3))$ | | | | | –0.0317 | –0.008 | –0.008 | –0.008 | –0.0171 | –0.0197 |
| $n_d - (2.005 + 0.083 * TiO_2/(TiO_2 + Nb_2O_5 + WO_3 + Bi_2O_3))$ | | | | | –0.0467 | –0.023 | –0.023 | –0.023 | –0.0321 | –0.0347 |
| Predicted and calculated properties | | | | | | | | | | |
| $P_n$ | | 2.052 | 2.052 | 2.052 | 2.0245 | 2.0261 | 2.0259 | 2.026 | 1.9704 | 2.0155 |
| $P_n - (1.99 + 0.083 * TiO_2/(TiO_2 + Nb_2O_5 + WO_3 + Bi_2O_3))$ | | –0.0099 | –0.0100 | –0.0100 | –0.0431 | –0.0359 | –0.0361 | –0.0360 | –0.0746 | –0.0467 |
| $P_n - (2.005 + 0.083 * TiO_2/(TiO_2 + Nb_2O_5 + WO_3 + Bi_2O_3))$ | | –0.0249 | –0.0250 | –0.0250 | –0.0581 | –0.0509 | –0.0511 | –0.0510 | –0.0896 | –0.0617 |

As follows from FIGS. 6 and 7, both predicted and measured property data confirms that some of the Exemplary Glasses have better combination of refractive index at 587.56 nm $n_d$ and the ratio $TiO_2/(TiO_2+Nb_2O_5+WO_3+Bi_2O_3)$ than the best of the Comparative Glasses that have the features specified in Table 10.

The following non-limiting aspects are encompassed by the present disclosure. To the extent not already described, any one of the features of the first through the sixty-eighth aspect may be combined in part or in whole with features of any one or more of the other aspects of the present disclosure to form additional aspects, even if such a combination is not explicitly described.

According to a first aspect, the glass comprises a plurality of components, the glass having a composition of the components comprising greater than or equal to 12.0 mol. % and less than or equal to 35.0 mol. % $TiO_2$, greater than or equal to 2.5 mol. % and less than or equal to 20.0 mol. % $ZrO_2$, greater than or equal to 0.5 mol. % and less than or equal to 40.0 mol. % $B_2O_3$, greater than or equal to 0.5 mol. % and less than or equal to 30.0 mol. % $Nb_2O_5$, greater than or equal to 0.0 mol. % and less than or equal to 20.0 mol. % $Bi_2O_3$, greater than or equal to 0.0 mol. % and less than or equal to 15.0 mol. % $P_2O_5$, greater than or equal to 0.0 mol. % and less than or equal to 10.0 mol. % $Al_2O_3$, greater than or equal to 0.0 mol. % and less than or equal to 10.0 mol. % $Gd_2O_3$, greater than or equal to 0.0 mol. % and less than or equal to 8.0 mol. % $WO_3$, greater than or equal to 0.0 mol. % and less than or equal to 5.0 mol. % PbO, greater than or equal to 0.0 mol. % and less than or equal to 5.0 mol. % $V_2O_5$, greater than or equal to 0.0 mol. % and less than or equal to 1.5 mol. % ZnO, greater than or equal to 95.0 mol. % $R_mO_n$, greater than or equal to 0.5 mol. % and less than or equal to 35.0 mol. % $RE_mO_n$, a sum of $SiO_2+B_2O_3+P_2$ $O_5$ greater than or equal to 10.0 mol. % and a sum of $TiO_2+Nb_2O_5$ greater than or equal to 0.0 mol. % and less than or equal to 42.0 mol. %, wherein the composition of the components satisfies the condition: $SiO_2+B_2O_3- P_2O_5$[mol. %]≥0.000, and the glass satisfies the condition: $P_n- (1.765+ 0.057*P_d)>0.000$, where $P_n$ is a parameter predicting a refractive index at 587.56 nm, $n_d$, calculated from the glass composition in terms of mol. % of the components according to the Formula (I):

$$P_n=1.844+0.0054162*La_2O_3+0.0031113*TiO_2-$$
$$0.004212*B_2O_3-0.0035692*SiO_2+$$
$$0.0027887*ZrO_2+0.0078026*Nb_2O_5-$$
$$0.00012928*CaO+0.00076566*BaO+$$
$$0.0043601*Y_2O_3+0.00067408*ZnO+$$
$$0.0068029*Gd_2O_3-0.0025106*Na_2O+$$
$$0.0039937*WO_3-0.0043208*Al_2O_3-$$
$$0.0011666*Li_2O+0.0051727*PbO+$$
$$0.012958*Bi_2O_3-0.0018753*GeO_2-$$
$$0.0014084*TeO_2+0.0086647*Er_2O_3+$$
$$0.0097345*Yb_2O_3-0.0038734*K_2O-$$
$$0.00041776*SrO-0.0017294*MgO, \qquad (I)$$

and $P_d$ is a parameter predicting a density at room temperature, $d_{RT}$, calculated from the glass composition in terms of mol. % of the components according to the Formula (II):

$$P_d=4.688+0.047868*La_2O_3-0.0065829*TiO_2-$$
$$0.027601*B_2O_3-0.022365*SiO_2+$$
$$0.016475*ZrO_2-0.0052977*Nb_2O_5-$$
$$0.0030466*CaO+0.014971*BaO+$$
$$0.019511*Y_2O_3+0.0076377*ZnO+$$
$$0.066160*Gd_2O_3-0.016932*Na_2O+$$
$$0.025764*WO_3-0.035116*Al_2O_3-$$
$$0.0094315*Li_2O+0.047388*PbO+$$
$$0.080813*Bi_2O_3-0.0088118*GeO_2+$$
$$0.072296*Er_2O_3+0.078888*Yb_2O_3-$$
$$0.026242*K_2O+0.010351*SrO-$$
$$0.0030424*MgO, \qquad (II)$$

where $R_mO_n$ is a total sum of all oxides, $RE_mO_n$ is a total sum of rare earth metal oxides, and an asterisk (*) means multiplication.

According to a second aspect, the glass of the first aspect, wherein the glass satisfies the condition: $n_d-(1.765+ 0.057*d_{RT})>0.000$, where $n_d$ is a refractive index at 587.56 nm and $d_{RT}$ [g/cm$^3$] is a density at room temperature.

According to a third aspect, the glass of any one of aspects 1-2, wherein the composition of the components comprises greater than or equal to 20.0 mol. % and less than or equal to 27.5 mol. % $TiO_2$, greater than or equal to 15.0 mol. % and less than or equal to 30.0 mol. % $La_2O_3$, greater than or equal to 15.0 mol. % and less than or equal to 22.5 mol. % $B_2O_3$, greater than or equal to 5.0 mol. % and less than or equal to 20.0 mol. % $SiO_2$, greater than or equal to 4.0 mol. % and less than or equal to 9.0 mol. % $ZrO_2$, greater than or equal to 2.5 mol. % and less than or equal to 10.0 mol. % $Nb_2O_5$, greater than or equal to 0.0 mol. % and less than or equal to 10.0 mol. % BaO, greater than or equal to 0.0 mol. % and less than or equal to 10.0 mol. % CaO, greater than or equal to 0.0 mol. % and less than or equal to 10.0 mol. % $Ga_2O_3$, greater than or equal to 0.0 mol. % and less than or equal to 10.0 mol. % $Y_2O_3$ and greater than or equal to 0.0 mol. % and less than or equal to 2.0 mol. % $WO_3$.

According to a fourth aspect, the glass of any one of aspects 1-3, wherein the composition of the components comprises one or more of the following components: greater than or equal to 20.25 mol. % and less than or equal to 26.00 mol. % $TiO_2$, greater than or equal to 20.0 mol. % and less than or equal to 27.5 mol. % $La_2O_3$, greater than or equal to 16.4 mol. % and less than or equal to 20.4 mol. % $B_2O_3$, greater than or equal to 10.0 mol. % and less than or equal to 17.5 mol. % $SiO_2$, greater than or equal to 5.3 mol. % and less than or equal to 8.1 mol. % $ZrO_2$, greater than or equal to 4.5 mol. % and less than or equal to 9.3 mol. % $Nb_2O_5$, greater than or equal to 0.5 mol. % and less than or equal to 6.3 mol. % $Y_2O_3$, greater than or equal to 0.0 mol. % and less than or equal to 9.0 mol. % CaO, greater than or equal to 0.0 mol. % and less than or equal to 8.0 mol. % $Ga_2O_3$, greater than or equal to 0.0 mol. % and less than or equal to 6.5 mol. % BaO, greater than or equal to 0.0 mol. % and less than or equal to 1.8 mol. % $WO_3$, greater than or equal to 0 mol. % and less than or equal to 1.35 mol. % $Gd_2O_3$, greater than or equal to 0.0 mol. % and less than or equal to 0.9 mol. % SrO and greater than or equal to 0.0 mol. % and less than or equal to 0.9 mol. % $Yb_2O_3$.

According to a fifth aspect, the glass of any one of aspects 1-4, wherein the composition of the components comprises greater than or equal to 21.0 mol. % and less than or equal to 26.3 mol. % $La_2O_3$, greater than or equal to 20.25 mol. % and less than or equal to 25.50 mol. % $TiO_2$, greater than or equal to 16.9 mol. % and less than or equal to 20.4 mol. % $B_2O_3$, greater than or equal to 11.0 mol. % and less than or equal to 16.5 mol. % $SiO_2$, greater than or equal to 5.6 mol. % and less than or equal to 8.0 mol. % $ZrO_2$, greater than or equal to 5.1 mol. % and less than or equal to 8.6 mol. % $Nb_2O_5$, greater than or equal to 0.75 mol. % and less than or equal to 5.50 mol. % $Y_2O_3$, greater than or equal to 0.0 mol. % and less than or equal to 8.0 mol. % CaO, greater than or equal to 0.0 mol. % and less than or equal to 7.5 mol. % $Ga_2O_3$, greater than or equal to 0.0 mol. % and less than or equal to 5.5 mol. % BaO, greater than or equal to 0.0 mol. % and less than or equal to 1.6 mol. % $WO_3$, greater than or equal to 0.0 mol. % and less than or equal to 1.2 mol. % $Gd_2O_3$, greater than or equal to 0.0 mol. % and less than or equal to 0.8 mol. % SrO and greater than or equal to 0.0 mol. % and less than or equal to 0.8 mol. % $Yb_2O_3$.

According to a sixth aspect, the glass of any one of aspects 1-5, wherein the composition of the components satisfy one or more of the following conditions: a sum of $La_2O_3+TiO_2+ B_2O_3+SiO_2+ZrO_2+Nb_2O_5+BaO+Y_2O_3+CaO+Ga_2O_3+ Gd_2O_3+ZnO+WO_3+CeO_2+SrO+Na_2O+Ta_2O_5+Al_2O_3$ greater than or equal to 99.0 mol. %, a sum of $La_2O_3+ Y_2O_3+Gd_2O_3+TiO_2+B_2O_3+SiO_2+ZrO_2+Nb_2O_5$ greater than or equal to 99.0 mol. %, a sum of $La_2O_3+Y_2O_3+Gd_2O_3+ TiO_2+B_2O_3+SiO_2+ZrO_2+Nb_2O_5+CaO+BaO$ greater than or equal to 99.0 mol. % and a sum of $La_2O_3+TiO_2+B_2O_3+ SiO_2+ZrO_2+Nb_2O_5$ greater than or equal to 97.0 mol. %.

According to a seventh aspect, the glass of any one of aspects 1-6, wherein the composition of the components comprises greater than or equal to 5.0 mol. % $B_2O_3$, greater than or equal to 5.0 mol. % $La_2O_3$, greater than or equal to 5.0 mol. % $Nb_2O_5$, greater than or equal to 5.0 mol. % $SiO_2$ and a sum of $ZrO_2+HfO_2$ greater than or equal to 1.0 mol. %.

According to an eighth aspect, the glass of any one of aspects 1-7, wherein the composition of the components comprises a sum of $R_2O+RO$ greater than or equal to 0.0 mol. % and less than or equal to 6.0 mol. %, where $R_2O$ is a total sum of monovalent metal oxides, and RO is a total sum of divalent metal oxides.

According to a ninth aspect, the glass of the eighth aspect, wherein the composition of the components comprises a sum of $R_2O+RO$ greater than or equal to 0.0 mol. % and less than or equal to 1.0 mol. %, where $R_2O$ is a total sum of monovalent metal oxides, and RO is a total sum of divalent metal oxides.

According to a tenth aspect, the glass of any one of aspects 1-9, wherein the composition of the components satisfies the condition: $0.00 \leq SiO_2/(SiO_2+B_2O_3)$ [mol. %]$\leq 0.40$.

According to an eleventh aspect, the glass of any one of aspects 1-9, wherein the composition of the components satisfies the condition: $0.38 \leq SiO_2/(SiO_2+B_2O_3)$ [mol. %]$\leq 0.75$.

According to a twelfth aspect, the glass of any one of aspects 1-11, wherein the composition of the components comprises greater than or equal to 0.0 mol. % and less than or equal to 6.5 mol. % CaO and greater than or equal to 0.0 mol. % and less than or equal to 5.5 mol. % BaO and wherein the composition of the components is substantially free of ZnO.

According to a thirteenth aspect, the glass of any one of aspects 1-12, wherein the composition of the components comprises a sum of $WO_3+Bi_2O_3$ greater than or equal to 0.0 mol. % and less than or equal to 7.0 mol. %.

According to a fourteenth aspect, the glass of any one of aspects 1-13, wherein the composition of the components comprises greater than or equal to 0.0 mol. % and less than or equal to 5.0 mol. % $Y_2O_3$, greater than or equal to 0.0 mol. % and less than or equal to 2.0 mol. % $Ta_2O_5$, greater than or equal to 0.0 mol. % and less than or equal to 2.0 mol. % $TeO_2$, greater than or equal to 0.0 mol. % and less than or equal to 0.5 mol. % $GeO_2$, greater than or equal to 0.0 mol. % and less than or equal to 0.5 mol. % PbO, greater than or equal to 0.0 mol. % and less than or equal to 0.2 mol. % $As_2O_3$ and greater than or equal to 0.0 mol. % and less than or equal to 0.2 mol. % $Sb_2O_3$, wherein the composition of the components is substantially free of fluorine and substantially free of $V_2O_5$.

According to a fifteenth aspect, the glass of any one of aspects 1-3 and 6-14, wherein the composition of the components comprises greater than or equal to 22.0 mol. % and less than or equal to 25.0 mol. % $TiO_2$, greater than or equal to 20.0 mol. % and less than or equal to 30.0 mol. % $La_2O_3$, greater than or equal to 16.0 mol. % and less than or equal to 20.0 mol. % $B_2O_3$, greater than or equal to 10.0 mol. % and less than or equal to 20.0 mol. % $SiO_2$, greater than or equal to 6.5 mol. % and less than or equal to 8.0 mol. % $ZrO_2$, greater than or equal to 5.0 mol. % and less than or equal to 6.7 mol. % $Nb_2O_5$, greater than or equal to 0.0 mol. % and less than or equal to 6.0 mol. % $Y_2O_3$, greater than or equal to 0.0 mol. % and less than or equal to 3.0 mol. % BaO and greater than or equal to 0.0 mol. % and less than or equal to 2.0 mol. % $Gd_2O_3$ and greater than or equal to 0.0 mol. % and less than or equal to 2.0 mol. % of all other components in total.

According to a sixteenth aspect, the glass of any one of aspects 1-15, wherein the glass satisfies the conditions: $4.5 \leq P_d \leq 5.5$ and $1.95 \leq P_n \leq 2.07$.

According to a seventeenth aspect, the glass of any one of aspects 1-16, wherein the glass has a density at room temperature, $d_{RT}$, that is greater than or equal to 4.5 g/cm$^3$ and less than or equal to 5.5 g/cm$^3$ and a refractive index at 587.56 nm, $n_d$, that is greater than or equal to 1.95 and less than or equal to 2.07.

According to an eighteenth aspect, the glass of any one of aspects 1-17, wherein the glass has a liquidus temperature, $T_{liq}$, that is less than or equal to 1260° C.

According to a nineteenth aspect, the glass of any one of aspects 1-18, wherein when cooled in air from 1100° C. to 500° C. in 2.5 minutes, the glass does not crystallize.

According to a twentieth aspect, the glass of any one of aspects 1-19, wherein the glass has a transmittance at a wavelength of 460 nm, $TX_{460\ nm}$, that is greater than or equal to 70%.

According to a twenty-first aspect, a method for manufacturing an optical element, the method comprising processing a glass, wherein the glass is the glass of any one of aspects 1-20.

According to a twenty-second aspect, an optical element comprising a glass, wherein the glass is the glass of any one of aspects 1-21.

According to a twenty-third aspect, the glass comprises a plurality of components, the glass having a composition of the components comprising greater than or equal to 1.0 mol. % and less than or equal to 13.5 mol. % $ZrO_2$, greater than or equal to 0.3 mol. % and less than or equal to 35.0 mol. % $TiO_2$, greater than or equal to 0.3 mol. % and less than or equal to 29.5 mol. % $B_2O_3$, greater than or equal to 0.0 mol. % and less than or equal to 9.0 mol. % $WO_3$, greater than or equal to 0.0 mol. % and less than or equal to 5.0 mol. % PbO, greater than or equal to 0.0 mol. % and less than or equal to 2.0 mol. % $Gd_2O_3$, greater than or equal to 0.0 at. % and less than or equal to 2.0 at. % F, a sum of $TiO_2+Nb_2O_5+La_2O_3$ greater than or equal to 10.0 mol. % and less than or equal to 70.0 mol. %, a sum of $SiO_2+B_2O_3+P_2O_5$ greater than or equal to 10.0 mol. %, a sum of $RE_mO_n+WO_3+ZrO_2$ greater than or equal to 5.0 mol. %, a sum of $SiO_2+Y_2O_3+Gd_2O_3$ greater than or equal to 0.3 mol. %, a sum of $V_2O_5+MoO_3$ greater than or equal to 0.0 mol. % and less than or equal to 3.0 mol. % and may optionally contain one or more components selected from $Bi_2O_3$, CaO, BaO, ZnO, $Na_2O$, $Al_2O_3$, $Li_2O$, $GeO_2$, $TeO_2$, $K_2O$, SrO and MgO, wherein the composition of the components satisfies the conditions: $TiO_2/(TiO_2+Nb_2O_5+WO_3+Bi_2O_3)$ [mol. %]$\geq 0.050$, $SiO_2+B_2O_3-P_2O_5$[mol. %]$\geq 1.0$ and $La_2O_3/TiO_2$ [mol. %]$\leq 1.5$, and the glass satisfies the condition: $P_n-(1.99+0.083*(TiO_2/(TiO_2+Nb_2O_5+WO_3+Bi_2O_3)))>0.000$, where $P_n$ is a parameter predicting a refractive index at 587.56 nm, $n_d$, calculated from the glass composition in terms of mol. % of the components according to the Formula (I):

$$\begin{aligned}
P_n = {} & 1.844+0.0054162*La_2O_3+0.0031113*TiO_2- \\
& 0.004212*B_2O_3-0.0035692*SiO_2+ \\
& 0.0027887*ZrO_2+0.0078026*Nb_2O_5- \\
& 0.00012928*CaO+0.00076566*BaO+ \\
& 0.0043601*Y_2O_3+0.00067408*ZnO+ \\
& 0.0068029*Gd_2O_3-0.0025106*Na_2O+ \\
& 0.0039937*WO_3-0.0043208*Al_2O_3- \\
& 0.0011666*Li_2O+0.0051727*PbO+ \\
& 0.012958*Bi_2O_3-0.0018753*GeO_2- \\
& 0.0014084*TeO_2+0.0086647*Er_2O_3+ \\
& 0.0097345*Yb_2O_3-0.0038734*K_2O- \\
& 0.00041776*SrO-0.0017294*MgO,
\end{aligned} \tag{I}$$

where $RE_mO_n$ is a total sum of rare earth metal oxides, and an asterisk (*) means multiplication.

According to a twenty-fourth aspect, the glass of the twenty-third aspect, wherein the glass satisfies the condition: $n_d-(1.99+0.083*(TiO_2/(TiO_2+Nb_2O_5+WO_3+Bi_2O_3)))>0.000$, where $n_d$ is a refractive index at 587.56 nm.

According to a twenty-fifth aspect, the glass of any one of aspects 23-24, wherein the glass satisfies the condition: $n_d-(2.005+0.083*(TiO_2/(TiO_2+Nb_2O_5+WO_3+Bi_2O_3)))>0.000$, where $n_d$ is a refractive index at 587.56 nm.

According to a twenty-sixth aspect, the glass of any one of aspects 23-25, wherein the glass satisfies the condition: $P_n-(2.005+0.083*(TiO_2/(TiO_2+Nb_2O_5+WO_3+Bi_2O_3)))>0.000$.

According to a twenty-seventh aspect, the glass of any one of aspects 23-26, wherein the composition of the components comprises greater than or equal to 20.0 mol. % and less than or equal to 27.5 mol. % $TiO_2$, greater than or equal to 15.0 mol. % and less than or equal to 30.0 mol. % $La_2O_3$, greater than or equal to 15.0 mol. % and less than or equal to 22.5 mol. % $B_2O_3$, greater than or equal to 5.0 mol. % and less than or equal to 20.0 mol. % $SiO_2$, greater than or equal to 4.0 mol. % and less than or equal to 9.0 mol. % $ZrO_2$, greater than or equal to 2.5 mol. % and less than or equal to 10.0 mol. % $Nb_2O_5$, greater than or equal to 0.0 mol. % and less than or equal to 10.0 mol. % BaO, greater than or equal to 0.0 mol. % and less than or equal to 10.0 mol. % CaO, greater than or equal to 0.0 mol. % and less than or equal to 10.0 mol. % $Ga_2O_3$, greater than or equal to 0.0 mol. % and less than or equal to 10.0 mol. % $Y_2O_3$, greater than or equal to 0.0 mol. % and less than or equal to 4.0 mol. % ZnO and greater than or equal to 0.0 mol. % and less than or equal to 2.0 mol. % $WO_3$.

According to a twenty-eighth aspect, the glass of any one of aspects 23-27, wherein the composition of the components comprises one or more of the following components: greater than or equal to 20.25 mol. % and less than or equal to 26.00 mol. % $TiO_2$, greater than or equal to 20.0 mol. % and less than or equal to 27.5 mol. % $La_2O_3$, greater than or equal to 16.4 mol. % and less than or equal to 20.4 mol. % $B_2O_3$, greater than or equal to 10.0 mol. % and less than or equal to 17.5 mol. % $SiO_2$, greater than or equal to 5.3 mol. % and less than or equal to 8.1 mol. % $ZrO_2$, greater than or equal to 4.5 mol. % and less than or equal to 9.3 mol. % $Nb_2O_5$, greater than or equal to 0.5 mol. % and less than or equal to 6.3 mol. % $Y_2O_3$, greater than or equal to 0.0 mol. % and less than or equal to 9.0 mol. % CaO, greater than or equal to 0.0 mol. % and less than or equal to 8.0 mol. % $Ga_2O_3$, greater than or equal to 0.0 mol. % and less than or equal to 6.5 mol. % BaO, greater than or equal to 0.0 mol. % and less than or equal to 3.0 mol. % ZnO, greater than or equal to 0.0 mol. % and less than or equal to 1.8 mol. % $WO_3$, greater than or equal to 0 mol. % and less than or equal to 1.35 mol. % $Gd_2O_3$, greater than or equal to 0.0 mol. % and less than or equal to 0.9 mol. % SrO and greater than or equal to 0.0 mol. % and less than or equal to 0.9 mol. % $Yb_2O_3$.

According to a twenty-ninth aspect, the glass of any one of aspects 23-28, wherein the composition of the components comprises greater than or equal to 21.0 mol. % and less than or equal to 26.3 mol. % $La_2O_3$, greater than or equal to 20.25 mol. % and less than or equal to 25.50 mol. % $TiO_2$, greater than or equal to 16.9 mol. % and less than or equal to 20.4 mol. % $B_2O_3$, greater than or equal to 11.0 mol. % and less than or equal to 16.5 mol. % $SiO_2$, greater than or equal to 5.6 mol. % and less than or equal to 8.0 mol. % $ZrO_2$, greater than or equal to 5.1 mol. % and less than or equal to 8.6 mol. % $Nb_2O_5$, greater than or equal to 0.75 mol. % and less than or equal to 5.50 mol. % $Y_2O_3$, greater than or equal to 0.0 mol. % and less than or equal to 8.0 mol. % CaO, greater than or equal to 0.0 mol. % and less than or equal to 7.5 mol. % $Ga_2O_3$, greater than or equal to 0.0 mol. % and less than or equal to 5.5 mol. % BaO, greater than or equal to 0.0 mol. % and less than or equal to 2.7 mol. % ZnO, greater than or equal to 0.0 mol. % and less than or equal to 1.6 mol. % $WO_3$, greater than or equal to 0.0 mol. % and less than or equal to 1.2 mol. % $Gd_2O_3$, greater than or equal to 0.0 mol. % and less than or equal to 0.8 mol. % SrO and greater than or equal to 0.0 mol. % and less than or equal to 0.8 mol. % $Yb_2O_3$.

According to a thirtieth aspect, the glass of any one of aspects 23-29, wherein the composition of the components satisfy one or more of the following conditions: a sum of $La_2O_3+TiO_2+B_2O_3+SiO_2+ZrO_2+Nb_2O_5+BaO+Y_2O_3+CaO+Ga_2O_3+Gd_2O_3+ZnO+WO_3+CeO_2+SrO+Na_2O+Ta_2O_5+Al_2O_3$ greater than or equal to 99.0 mol. %, a sum of $La_2O_3+Y_2O_3+Gd_2O_3+TiO_2+B_2O_3+SiO_2+ZrO_2+Nb_2O_5$ greater than or equal to 99.0 mol. %, a sum of $La_2O_3+Y_2O_3+Gd_2O_3+TiO_2+B_2O_3+SiO_2+ZrO_2+Nb_2O_5+CaO+BaO$ greater than or equal to 99.0 mol. % and a sum of $La_2O_3+TiO_2+B_2O_3+SiO_2+ZrO_2+Nb_2O_5$ greater than or equal to 97.0 mol. %.

According to a thirty-first aspect, the glass of any one of aspects 23-26 and 29-30, wherein the composition of the components comprises greater than or equal to 5.0 mol. % $B_2O_3$, greater than or equal to 5.0 mol. % $Nb_2O_5$, greater than or equal to 5.0 mol. % $SiO_2$, greater than or equal to 5.0 mol. % $TiO_2$ and a sum of $ZrO_2+HfO_2$ greater than or equal to 1.0 mol. %.

According to a thirty-second aspect, the glass of any one of aspects 23-31, wherein the composition of the components comprises a sum of $R_2O+RO$ greater than or equal to 0.0 mol. % and less than or equal to 6.0 mol. %, where $R_2O$ is a total sum of monovalent metal oxides, and RO is a total sum of divalent metal oxides.

According to a thirty-third aspect, the glass of the thirty-second aspect, wherein the composition of the components comprises a sum of $R_2O+RO$ greater than or equal to 0.0 mol. % and less than or equal to 1.0 mol. %.

According to a thirty-fourth aspect, the glass of any one of aspects 23-33, wherein the composition of the components satisfies the condition: $0.00 \leq SiO_2/(SiO_2+B_2O_3)$ [mol. %] $\leq 0.40$.

According to a thirty-fifth aspect, the glass of any one of aspects 23-33, wherein the composition of the components satisfies the condition: $0.38 \leq SiO_2/(SiO_2+B_2O_3)$ [mol. %] $\leq 0.75$.

According to a thirty-sixth aspect, the glass of any one of aspects 23-35, wherein the composition of the components comprises greater than or equal to 0.0 mol. % and less than or equal to 6.5 mol. % CaO and greater than or equal to 0.0 mol. % and less than or equal to 5.5 mol. % BaO and wherein the composition of the components is substantially free of ZnO.

According to a thirty-seventh aspect, the glass of any one of aspects 23-36, wherein the composition of the components comprises a sum of $WO_3+Bi_2O_3$ greater than or equal to 0.0 mol. % and less than or equal to 7.0 mol. %.

According to a thirty-eighth aspect, the glass of any one of aspects 23-37, wherein the composition of the components comprises greater than or equal to 0.0 mol. % and less than or equal to 5.0 mol. % $Y_2O_3$, greater than or equal to 0.0 mol. % and less than or equal to 2.0 mol. % $Ta_2O_5$, greater than or equal to 0.0 mol. % and less than or equal to 2.0 mol. % $TeO_2$, greater than or equal to 0.0 mol. % and less than or equal to 0.5 mol. % $GeO_2$, greater than or equal to 0.0 mol. % and less than or equal to 0.5 mol. % PbO, greater than or equal to 0.0 mol. % and less than or equal to 0.2 mol. % $As_2O_3$ and greater than or equal to 0.0 mol. % and less than or equal to 0.2 mol. % $Sb_2O_3$, wherein the composition of the components is substantially free of fluorine and substantially free of $V_2O_5$.

According to a thirty-ninth aspect, the glass of any one of aspects 23-27 and 30-38, wherein the composition of the components comprises greater than or equal to 22.0 mol. % and less than or equal to 25.0 mol. % $TiO_2$, greater than or equal to 20.0 mol. % and less than or equal to 30.0 mol. % $La_2O_3$, greater than or equal to 16.0 mol. % and less than or equal to 20.0 mol. % $B_2O_3$, greater than or equal to 10.0 mol. % and less than or equal to 20.0 mol. % $SiO_2$, greater than or equal to 6.5 mol. % and less than or equal to 8.0 mol. % $ZrO_2$, greater than or equal to 5.0 mol. % and less than or equal to 6.7 mol. % $Nb_2O_5$, greater than or equal to 0.0 mol. % and less than or equal to 6.0 mol. % $Y_2O_3$ and greater than or equal to 0.0 mol. % and less than or equal to 3.0 mol. % BaO and greater than or equal to 0.0 mol. % and less than or equal to 2.0 mol. % of all other components in total.

According to a fortieth aspect, the glass of any one of aspects 23-39, wherein the glass satisfies the conditions: $4.5 \leq P_d \leq 5.5$ and $1.95 \leq P_n \leq 2.07$. where $P_d$ is a parameter predicting a density at room temperature, $d_{RT}$, calculated from the glass composition in terms of mol. % of the components according to the Formula (II):

$$P_d = 4.688 + 0.047868*La_2O_3 - 0.0065829*TiO_2 - 0.027601*B_2O_3 - 0.022365*SiO_2 + 0.016475*ZrO_2 - 0.0052977*Nb_2O_5 - 0.0030466*CaO + 0.014971*BaO + 0.019511*Y_2O_3 + 0.0076377*ZnO + 0.066160*Gd_2O_3 - 0.016932*Na_2O + 0.025764*WO_3 - 0.035116*Al_2O_3 - 0.0094315*Li_2O + 0.047388*PbO + 0.080813*Bi_2O_3 - 0.0088118*GeO_2 + 0.072296*Er_2O_3 + 0.078888*Yb_2O_3 - 0.026242*K_2O + 0.010351*SrO - 0.0030424*MgO, \quad (II).$$

According to a forty-first aspect, the glass of any one of aspects 23-40, wherein the glass has a density at room temperature, $d_{RT}$, that is greater than or equal to 4.5 g/cm$^3$ and less than or equal to 5.5 g/cm$^3$ and a refractive index at 587.56 nm, $n_d$, that is greater than or equal to 1.95 and less than or equal to 2.07.

According to a forty-second aspect, the glass of any one of aspects 23-41, wherein the glass has a liquidus temperature, $T_{liq}$, that is less than or equal to 1260° C.

According to a forty-third aspect, the glass of any one of aspects 23-42, wherein when cooled in air from 1100° C. to 500° C. in 2.5 minutes, the glass does not crystallize.

According to a forty-fourth aspect, the glass of any one of aspects 23-43, wherein the glass has a transmittance at a wavelength of 460 nm, $TX_{460\,nm}$, that is greater than or equal to 70%.

According to a forty-fifth aspect, a method for manufacturing an optical element, the method comprising processing a glass, wherein the glass is the glass of any one of aspects 23-44.

According to a forty-sixth aspect, an optical element comprising a glass, wherein the glass is the glass of any one of aspects 23-45.

According to a forty-seventh aspect, the glass comprises a plurality of components, the glass having a composition of the components comprising greater than or equal to 0.5 mol. % and less than or equal to 45.0 mol. % $B_2O_3$, greater than or equal to 0.1 mol. % and less than or equal to 25.0 mol. % $Bi_2O_3$, greater than or equal to 0.0 mol. % and less than or equal to 8.0 mol. % $WO_3$, a sum of $SiO_2 + B_2O_3 + P_2O_5$ greater than or equal to 10.0 mol. %, a sum of $TiO_2 + Nb_2O_5$ greater than or equal to 8.5 mol. %, a sum of $RE_mO_n + WO_3 + ZrO_2$ greater than or equal to 4.5 mol. % and may optionally contain one or more components selected from CaO, BaO, ZnO, Na$_2$O, Al$_2$O$_3$, Li$_2$O, PbO, GeO$_2$, TeO$_2$, K$_2$O, SrO and MgO, wherein the composition of the components satisfies the conditions: $SiO_2 + B_2O_3 - P_2O_5$[mol. %] $\geq 0.100$, and the glass satisfies the condition: $P_n > 2.045$, where $P_n$ is a parameter predicting a refractive index at 587.56 nm, $n_d$, calculated from the glass composition in terms of mol. % of the components according to the Formula (I):

$$P_n = 1.844 + 0.0054162*La_2O_3 + 0.0031113*TiO_2 - 0.004212*B_2O_3 - 0.0035692*SiO_2 +$$

$$0.0027887*ZrO_2 + 0.0078026*Nb_2O_5 - 0.00012928*CaO + 0.00076566*BaO + 0.0043601*Y_2O_3 + 0.00067408*ZnO + 0.0068029*Gd_2O_3 - 0.0025106*Na_2O + 0.0039937*WO_3 - 0.0043208*Al_2O_3 - 0.0011666*Li_2O + 0.0051727*PbO + 0.012958*Bi_2O_3 - 0.0018753*GeO_2 - 0.0014084*TeO_2 + 0.0086647*Er_2O_3 + 0.0097345*Yb_2O_3 - 0.0038734*K_2O - 0.00041776*SrO - 0.0017294*MgO, \quad (I)$$

where $RE_mO_n$ is a total sum of rare earth metal oxides, and an asterisk (*) means multiplication.

According to a forty-eighth aspect, the glass of the forty-seventh aspect, wherein the glass has a refractive index at 587.56 nm, $n_d$, that is greater than or equal to 2.045.

According to a forty-ninth aspect, the glass of any one of aspects 47-48, wherein the composition of the components comprises greater than or equal to 20.0 mol. % and less than or equal to 27.5 mol. % $TiO_2$, greater than or equal to 15.0 mol. % and less than or equal to 30.0 mol. % $La_2O_3$, greater than or equal to 15.0 mol. % and less than or equal to 22.5 mol. % $B_2O_3$, greater than or equal to 5.0 mol. % and less than or equal to 20.0 mol. % $SiO_2$, greater than or equal to 4.0 mol. % and less than or equal to 9.0 mol. % $ZrO_2$, greater than or equal to 2.5 mol. % and less than or equal to 10.0 mol. % $Nb_2O_5$, greater than or equal to 0.0 mol. % and less than or equal to 10.0 mol. % BaO, greater than or equal to 0.0 mol. % and less than or equal to 10.0 mol. % CaO, greater than or equal to 0.0 mol. % and less than or equal to 10.0 mol. % $Ga_2O_3$, greater than or equal to 0.0 mol. % and less than or equal to 10.0 mol. % $Y_2O_3$, greater than or equal to 0.0 mol. % and less than or equal to 4.0 mol. % ZnO and greater than or equal to 0.0 mol. % and less than or equal to 2.0 mol. % $WO_3$.

According to a fiftieth aspect, the glass of any one of aspects 47-49, wherein the composition of the components comprises one or more of the following components: greater than or equal to 20.25 mol. % and less than or equal to 26.00 mol. % $TiO_2$, greater than or equal to 20.0 mol. % and less than or equal to 27.5 mol. % $La_2O_3$, greater than or equal to 16.4 mol. % and less than or equal to 20.4 mol. % $B_2O_3$, greater than or equal to 10.0 mol. % and less than or equal to 17.5 mol. % $SiO_2$, greater than or equal to 5.3 mol. % and less than or equal to 8.1 mol. % $ZrO_2$, greater than or equal to 4.5 mol. % and less than or equal to 9.3 mol. % $Nb_2O_5$, greater than or equal to 0.5 mol. % and less than or equal to 6.3 mol. % $Y_2O_3$, greater than or equal to 0.0 mol. % and less than or equal to 9.0 mol. % CaO, greater than or equal to 0.0 mol. % and less than or equal to 8.0 mol. % $Ga_2O_3$, greater than or equal to 0.0 mol. % and less than or equal to 6.5 mol. % BaO, greater than or equal to 0.0 mol. % and less than or equal to 3.0 mol. % ZnO, greater than or equal to 0.0 mol. % and less than or equal to 1.8 mol. % $WO_3$, greater than or equal to 0 mol. % and less than or equal to 1.35 mol. % $Gd_2O_3$, greater than or equal to 0.0 mol. % and less than or equal to 0.9 mol. % SrO and greater than or equal to 0.0 mol. % and less than or equal to 0.9 mol. % $Yb_2O_3$.

According to a fifty-first aspect, the glass of any one of aspects 47-50, wherein the composition of the components comprises greater than or equal to 21.0 mol. % and less than or equal to 26.3 mol. % $La_2O_3$, greater than or equal to 20.25 mol. % and less than or equal to 25.50 mol. % $TiO_2$, greater than or equal to 16.9 mol. % and less than or equal to 20.4 mol. % $B_2O_3$, greater than or equal to 11.0 mol. % and less than or equal to 16.5 mol. % $SiO_2$, greater than or equal to 5.6 mol. % and less than or equal to 8.0 mol. % $ZrO_2$, greater than or equal to 5.1 mol. % and less than or equal to 8.6 mol. % $Nb_2O_5$, greater than or equal to 0.75 mol. % and less than or equal to 5.50 mol. % $Y_2O_3$, greater than or equal to 0.0 mol. % and less than or equal to 8.0 mol. % CaO, greater than or equal to 0.0 mol. % and less than or equal to 7.5 mol. % $Ga_2O_3$, greater than or equal to 0.0 mol. % and less than or equal to 5.5 mol. % BaO, greater than or equal to 0.0 mol. % and less than or equal to 2.7 mol. % ZnO, greater than or equal to 0.0 mol. % and less than or equal to 1.6 mol. % $WO_3$, greater than or equal to 0.0 mol. % and less than or equal to 1.2 mol. % $Gd_2O_3$, greater than or equal to 0.0 mol. % and less than or equal to 0.8 mol. % SrO and greater than or equal to 0.0 mol. % and less than or equal to 0.8 mol. % $Yb_2O_3$.

According to a fifty-second aspect, the glass of any one of aspects 47-51, wherein the composition of the components satisfy one or more of the following conditions: a sum of $La_2O_3+TiO_2+B_2O_3+SiO_2+ZrO_2+Nb_2O_5+BaO+Y_2O_3+CaO+Ga_2O_3+Gd_2O_3+ZnO+WO_3+CeO_2+SrO+Na_2O+Ta_2O_5+Al_2O_3$ greater than or equal to 99.0 mol. %, a sum of $La_2O_3+Y_2O_3+Gd_2O_3+TiO_2+B_2O_3+SiO_2+ZrO_2+Nb_2O_5$ greater than or equal to 99.0 mol. %, a sum of $La_2O_3+Y_2O_3+Gd_2O_3+TiO_2+B_2O_3+SiO_2+ZrO_2+Nb_2O_5+CaO+BaO$ greater than or equal to 99.0 mol. % and a sum of $La_2O_3+TiO_2+B_2O_3+SiO_2+ZrO_2+Nb_2O_5$ greater than or equal to 97.0 mol. %.

According to a fifty-third aspect, the glass of any one of aspects 47-48 and 51-52, wherein the composition of the components comprises greater than or equal to 5.0 mol. % $B_2O_3$, greater than or equal to 5.0 mol. % $La_2O_3$, greater than or equal to 5.0 mol. % $Nb_2O_5$, greater than or equal to 5.0 mol. % $SiO_2$, greater than or equal to 5.0 mol. % $TiO_2$ and a sum of $ZrO_2+HfO_2$ greater than or equal to 1.0 mol. %.

According to a fifty-fourth aspect, the glass of any one of aspects 47-53, wherein the composition of the components comprises a sum of $R_2O+RO$ greater than or equal to 0.0 mol. % and less than or equal to 6.0 mol. %, where $R_2O$ is a total sum of monovalent metal oxides and RO is a total sum of divalent metal oxides.

According to a fifty-fifth aspect, the glass of the fifty-fourth aspect, wherein the composition of the components comprises a sum of $R_2O+RO$ greater than or equal to 0.0 mol. % and less than or equal to 1.0 mol. %.

According to a fifty-sixth aspect, the glass of any one of aspects 47-55, wherein the composition of the components satisfies the condition: $0.00 \leq SiO_2/(SiO_2+B_2O_3)$ [mol. %] $\leq 0.40$.

According to a fifty-seventh aspect, the glass of any one of aspects 47-55, wherein the composition of the components satisfies the condition: $0.38 \leq SiO_2/(SiO_2+B_2O_3)$ [mol. %] $\leq 0.75$.

According to a fifty-eighth aspect, the glass of any one of aspects 47-57, wherein the composition of the components comprises greater than or equal to 0.0 mol. % and less than or equal to 6.5 mol. % CaO and greater than or equal to 0.0 mol. % and less than or equal to 5.5 mol. % BaO and wherein the composition of the components is substantially free of ZnO.

According to a fifty-ninth aspect, the glass of any one of aspects 47-58, wherein the composition of the components comprises a sum of $WO_3+Bi_2O_3$ greater than or equal to 0.0 mol. % and less than or equal to 7.0 mol. %.

According to a sixtieth aspect, the glass of any one of aspects 47-59, wherein the composition of the components comprises greater than or equal to 0.0 mol. % and less than or equal to 5.0 mol. % $Y_2O_3$, greater than or equal to 0.0 mol. % and less than or equal to 2.0 mol. % $Ta_2O_5$, greater than or equal to 0.0 mol. % and less than or equal to 2.0 mol.

% $TeO_2$, greater than or equal to 0.0 mol. % and less than or equal to 0.5 mol. % $GeO_2$, greater than or equal to 0.0 mol. % and less than or equal to 0.5 mol. % PbO, greater than or equal to 0.0 mol. % and less than or equal to 0.2 mol. % $As_2O_3$ and greater than or equal to 0.0 mol. % and less than or equal to 0.2 mol. % $Sb_2O_3$, wherein the composition of the components is substantially free of fluorine and substantially free of $V_2O_5$.

According to a sixty-first aspect, the glass of any one of aspects 47-49 and 52-60, wherein the composition of the components comprises greater than or equal to 22.0 mol. % and less than or equal to 25.0 mol. % $TiO_2$, greater than or equal to 20.0 mol. % and less than or equal to 30.0 mol. % $La_2O_3$, greater than or equal to 16.0 mol. % and less than or equal to 20.0 mol. % $B_2O_3$, greater than or equal to 10.0 mol. % and less than or equal to 20.0 mol. % $SiO_2$, greater than or equal to 6.5 mol. % and less than or equal to 8.0 mol. % $ZrO_2$, greater than or equal to 5.0 mol. % and less than or equal to 6.7 mol. % $Nb_2O_5$, greater than or equal to 0.0 mol. % and less than or equal to 6.0 mol. % $Y_2O_3$, greater than or equal to 0.0 mol. % and less than or equal to 3.0 mol. % BaO and greater than or equal to 0.0 mol. % and less than or equal to 2.0 mol. % $Gd_2O_3$ and greater than or equal to 0.0 mol. % and less than or equal to 2.0 mol. % of all other components in total.

According to a sixty-second aspect, the glass of any one of aspects 47-61, wherein the glass satisfies the conditions: $4.5 \leq P_d \leq 5.5$ and $2.045 \leq P_n \leq 2.07$, where $P_d$ is a parameter predicting a density at room temperature, $d_{RT}$, calculated from the glass composition in terms of mol. % of the components according to the Formula (II):

$$\begin{aligned} P_d = & 4.688 + 0.047868 * La_2O_3 - 0.0065829 * TiO_2 - \\ & 0.027601 * B_2O_3 - 0.022365 * SiO_2 + \\ & 0.016475 * ZrO_2 - 0.0052977 * Nb_2O_5 - \\ & 0.0030466 * CaO + 0.014971 * BaO + \\ & 0.019511 * Y_2O_3 + 0.0076377 * ZnO + \\ & 0.066160 * Gd_2O_3 - 0.016932 * Na_2O + \\ & 0.025764 * WO_3 - 0.035116 * Al_2O_3 - \\ & 0.0094315 * Li_2O + 0.047388 * PbO + \\ & 0.080813 * Bi_2O_3 - 0.0088118 * GeO_2 + \\ & 0.072296 * Er_2O_3 + 0.078888 * Yb_2O_3 - \\ & 0.026242 * K_2O + 0.010351 * SrO - \\ & 0.0030424 * MgO, \end{aligned} \quad \text{(II)}.$$

According to a sixty-third aspect, the glass of any one of aspects 47-62, wherein the glass has a density at room temperature, $d_{RT}$, that is greater than or equal to 4.5 g/cm³ and less than or equal to 5.5 g/cm³ and a refractive index at 587.56 nm, $n_d$, that is greater than or equal to 2.045 and less than or equal to 2.07.

According to a sixty-fourth aspect, the glass of any one of aspects 47-63, wherein the glass has a liquidus temperature, $T_{liq}$, that is less than or equal to 1260° C.

According to a sixty-fifth aspect, the glass of any one of aspects 47-64, wherein when cooled in air from 1100° C. to 500° C. in 2.5 minutes, the glass does not crystallize.

According to a sixty-sixth aspect, the glass of any one of aspects 47-65, wherein the glass has a transmittance at a wavelength of 460 nm, $TX_{460\,nm}$, that is greater than or equal to 70%.

According to a sixty-seventh aspect, a method for manufacturing an optical element, the method comprising processing a glass, wherein the glass is the glass of any one of aspects 47-66.

According to a sixty-eighth aspect, an optical element comprising a glass, wherein the glass is the glass of any one of aspects 47-67.

Many variations and modifications may be made to the above-described embodiments of the disclosure without departing substantially from the spirit and various principles of the disclosure. All such modifications and variations are intended to be included herein within the scope of this disclosure and protected by the following claims.

To the extent not already described, the different features of the various aspects of the present disclosure may be used in combination with each other as desired. That a particular feature is not explicitly illustrated or described with respect to each aspect of the present disclosure is not meant to be construed that it cannot be, but it is done for the sake of brevity and conciseness of the description. Thus, the various features of the different aspects may be mixed and matched as desired to form new aspects, whether or not the new aspects are expressly disclosed.

The invention claimed is:

1. A glass comprising a plurality of components, the glass having a composition of the components comprising:

greater than or equal to 12.0 mol. % and less than or equal to 35.0 mol. % $TiO_2$, greater than or equal to 2.5 mol. % and less than or equal to 20.0 mol. % $ZrO_2$, greater than or equal to 0.5 mol. % and less than or equal to 40.0 mol. % $B_2O_3$, greater than or equal to 0.5 mol. % and less than or equal to 30.0 mol. % $Nb_2O_5$, greater than or equal to 0.0 mol. % and less than or equal to 20.0 mol. % $Bi_2O_3$, greater than or equal to 0.0 mol. % and less than or equal to 15.0 mol. % $P_2O_5$, greater than or equal to 0.0 mol. % and less than or equal to 10.0 mol. % $Al_2O_3$, greater than or equal to 0.0 mol. % and less than or equal to 10.0 mol. % $Gd_2O_3$, greater than or equal to 0.0 mol. % and less than or equal to 8.0 mol. % $WO_3$, greater than or equal to 0.0 mol. % and less than or equal to 5.0 mol. % $PbO$, greater than or equal to 0.0 mol. % and less than or equal to 5.0 mol. % $V_2O_5$, greater than or equal to 0.0 mol. % and less than or equal to 1.5 mol. % $ZnO$, greater than or equal to 95.0 mol. % $R_mO_n$, greater than or equal to 0.5 mol. % and less than or equal to 35.0 mol. % $RE_mO_n$, a sum of $SiO_2+B_2O_3+P_2O_5$ greater than or equal to 10.0 mol. % and a sum of $TiO_2+Nb_2O_5$ less than or equal to 42.0 mol. %, wherein the composition of the components satisfies the condition:

$$SiO_2+B_2O_3-P_2O_5[mol.\ \%] \geq 0.000,$$

wherein none of the ranges of the components is modified by the term "about", and wherein the glass satisfies the condition:

$$P_1-(1.765+0.057*P_d)>0.000,$$

where $P_n$ is a parameter predicting a refractive index at 587.56 nm, $n_d$, calculated from the glass composition in terms of mol. % of the components according to the Formula (I):

$$P_n=1.844+0.0054162*La_2O_3+0.0031113*TiO_2-$$
$$0.004212*B_2O_3-0.0035692*SiO_2+$$
$$0.0027887*ZrO_2+0.0078026*Nb_2O_5-$$
$$0.00012928*CaO+0.00076566*BaO+$$
$$0.0043601*Y_2O_3+0.00067408*ZnO+$$
$$0.0068029*Gd_2O_3-0.0025106*Na_2O+$$
$$0.0039937*WO_3-0.0043208*Al_2O_3-$$

$$0.0011666*Li_2O+0.0051727*PbO+$$
$$0.012958*Bi_2O_3-0.0018753*GeO_2-$$
$$0.0014084*TeO_2+0.0086647*Er_2O_3+$$
$$0.0097345*Yb_2O_3-0.0038734*K_2O-$$
$$0.00041776*SrO-0.0017294*MgO, \quad\quad (I)$$

and $P_d$ is a parameter predicting a density at room temperature, $d_{RT}$, calculated from the glass composition in terms of mol. % of the components according to the Formula (II):

$$P_d=4.688+0.047868*La_2O_3-0.0065829*TiO_2-$$
$$0.027601*B_2O_3-0.022365*SiO_2+$$
$$0.016475*ZrO_2-0.0052977*Nb_2O_5-$$
$$0.0030466*CaO+0.014971*BaO+$$
$$0.019511*Y_2O_3+0.0076377*ZnO+$$
$$0.066160*Gd_2O_3-0.016932*Na_2O+$$
$$0.025764*WO_3-0.035116*Al_2O_3-$$
$$0.0094315*Li_2O+0.047388*PbO+$$
$$0.080813*Bi_2O_3-0.0088118*GeO_2+$$
$$0.072296*Er_2O_3+0.078888*Yb_2O_3-$$
$$0.026242*K_2O+0.010351*SrO-$$
$$0.0030424*MgO, \quad\quad (II)$$

where $R_mO_n$ is a total sum of all oxides, $RE_mO_n$ is a total sum of rare earth metal oxides, and an asterisk (*) means multiplication, and neither of the parameters $P_n$ and $P_d$ is modified by the term "about".

2. The glass of claim 1, wherein the glass satisfies the condition:

$$n_d-(1.765+0.057*d_{RT})>0.000,$$

where $n_d$ is a refractive index at 587.56 nm, $d_{RT}$ [$g/cm^3$] is a density at room temperature.

3. The glass of claim 1, wherein the composition of the components comprises:

greater than or equal to 20.0 mol. % and less than or equal to 27.5 mol. % $TiO_2$, greater than or equal to 15.0 mol. % and less than or equal to 30.0 mol. % $La_2O_3$, greater than or equal to 15.0 mol. % and less than or equal to 22.5 mol. % $B_2O_3$, greater than or equal to 5.0 mol. % and less than or equal to 20.0 mol. % $SiO_2$, greater than or equal to 4.0 mol. % and less than or equal to 9.0 mol. % $ZrO_2$, greater than or equal to 2.5 mol. % and less than or equal to 10.0 mol. % $Nb_2O_5$, greater than or equal to 0.0 mol. % and less than or equal to 10.0 mol. % $BaO$, greater than or equal to 0.0 mol. % and less than or equal to 10.0 mol. % $CaO$, greater than or equal to 0.0 mol. % and less than or equal to 10.0 mol. % $Ga_2O_3$, greater than or equal to 0.0 mol. % and less than or equal to 10.0 mol. % $Y_2O_3$ and greater than or equal to 0.0 mol. % and less than or equal to 2.0 mol. % $WO_3$.

4. The glass of claim 1, wherein the composition of the components comprises:

greater than or equal to 22.0 mol. % and less than or equal to 25.0 mol. % $TiO_2$, greater than or equal to 20.0 mol. % and less than or equal to 30.0 mol. % $La_2O_3$, greater than or equal to 16.0 mol. % and less than or equal to 20.0 mol. % $B_2O_3$, greater than or equal to 10.0 mol. % and less than or equal to 20.0 mol. % $SiO_2$, greater than or equal to 6.5 mol. % and less than or equal to 8.0 mol. % $ZrO_2$, greater than or equal to 5.0 mol. % and less than or equal to 6.7 mol. % $Nb_2O_5$, greater than or equal to 0.0 mol. % and less than or equal to 6.0 mol. % $Y_2O_3$, greater than or equal to 0.0 mol. % and less than or equal to 3.0 mol. % BaO and greater than or equal to 0.0 mol. % and less than or equal to 2.0 mol. % $Gd_2O_3$ and greater than or equal to 0.0 mol. % and less than or equal to 2.0 mol. % of all other components in total.

5. The glass of claim 1, wherein the glass satisfies the conditions:

$$4.5 \le P_d \le 5.5 \text{ and}$$

$$1.95 \le P_n \le 2.07.$$

6. The glass of claim 1, wherein when cooled in air from 1100° C. to 500° C. in 2.5 minutes, the glass does not crystallize.

7. A glass comprising a plurality of components, the glass having a composition of the components comprising:

greater than or equal to 1.0 mol. % and less than or equal to 13.5 mol. % $ZrO_2$, greater than or equal to 0.3 mol. % and less than or equal to 35.0 mol. % $TiO_2$, greater than or equal to 0.3 mol. % and less than or equal to 29.5 mol. % $B_2O_3$, greater than or equal to 0.0 mol. % and less than or equal to 9.0 mol. % $WO_3$, greater than or equal to 0.0 mol. % and less than or equal to 5.0 mol. % PbO, greater than or equal to 0.0 mol. % and less than or equal to 2.0 mol. % $Gd_2O_3$, greater than or equal to 0.0 at. % and less than or equal to 2.0 at. % F, a sum of $TiO_2Nb_2O_5La_2O_3$ greater than or equal to 10.0 mol. % and less than or equal to 70.0 mol. %, a sum of $SiO_2+B_2O_3+P_2O_5$ greater than or equal to 10.0 mol. %, a sum of $RE_mO_n+WO_3+ZrO_2$ greater than or equal to 5.0 mol. %, a sum of $SiO_2+Y_2O_3+Gd_2O_3$ greater than or equal to 0.3 mol. %, a sum of $V_2O_5+MoO_3$ greater than or equal to 0.0 mol. % and less than or equal to 3.0 mol. % and optionally comprising one or more components selected from $Bi_2O_3$, CaO, BaO, ZnO, $Na_2O$, $Al_2O_3$, $Li_2O$, $GeO_2$, $TeO_2$, $K_2O$, SrO and MgO, wherein the composition of the components satisfies the conditions:

$$TiO_2/(TiO_2+Nb_2O_5+WO_3+Bi_2O_3) \text{ [mol. %]} \ge 0.050,$$

$$SiO_2+B_2O_3-P_2O_5 \text{ [mol. %]} \ge 1.0 \text{ and}$$

$$La_2O_3/TiO_2 \text{ [mol. %]} \le 1.5,$$

wherein none of the ranges of the components is modified by the term "about", and wherein the glass satisfies the condition:

$$P_n-(1.99+0.083*(TiO_2/(TiO_2+Nb_2O_5+WO_3+Bi_2O_3)))$$
$$>0.000,$$

where $P_n$ is a parameter predicting a refractive index at 587.56 nm, $n_d$, calculated from the glass composition in terms of mol. % of the components according to the Formula (I):

$$P_n=1.844+0.0054162*La_2O_3+0.0031113*TiO_2-$$
$$0.004212*B_2O_3-0.0035692*SiO_2+$$
$$0.0027887*ZrO_2+0.0078026*Nb_2O_5-$$
$$0.00012928*CaO+0.00076566*BaO+$$
$$0.0043601*Y_2O_3+0.00067408*ZnO+$$
$$0.0068029*Gd_2O_3-0.0025106*Na_2O+$$
$$0.0039937*WO_3-0.0043208*Al_2O_3-$$
$$0.0011666*Li_2O+0.0051727*PbO+$$
$$0.012958*Bi_2O_3-0.0018753*GeO_2-$$
$$0.0014084*TeO_2+0.0086647*Er_2O_3+$$
$$0.0097345*Yb_2O_3-0.0038734*K_2O-$$
$$0.00041776*SrO-0.0017294*MgO, \qquad (I)$$

where $RE_mO_n$ is a total sum of rare earth metal oxides, and an asterisk (*) means multiplication, and the parameter $P_n$ is not modified by the term "about".

8. The glass of claim 7, wherein the glass satisfies the condition:

$$n_d-(1.99+0.083*(TiO_2/(TiO_2+Nb_2O_5+WO_3+Bi_2O_3)))$$
$$>0.000,$$

where $n_d$ is a refractive index at 587.56 nm.

9. The glass of claim 7, wherein the composition of the components satisfies the condition:

$$0.38 \le SiO_2/(SiO_2+B_2O_3) \text{ [mol. %]} \le 0.75.$$

10. The glass of claim 7, wherein the composition of the components comprises:

greater than or equal to 22.0 mol. % and less than or equal to 25.0 mol. % $TiO_2$, greater than or equal to 20.0 mol. % and less than or equal to 30.0 mol. % $La_2O_3$, greater than or equal to 16.0 mol. % and less than or equal to 20.0 mol. % $B_2O_3$, greater than or equal to 10.0 mol. % and less than or equal to 20.0 mol. % $SiO_2$, greater than or equal to 6.5 mol. % and less than or equal to 8.0 mol. % $ZrO_2$, greater than or equal to 5.0 mol. % and less than or equal to 6.7 mol. % $Nb_2O_5$, greater than or equal to 0.0 mol. % and less than or equal to 6.0 mol. % $Y_2O_3$ and greater than or equal to 0.0 mol. % and less than or equal to 3.0 mol. % BaO and greater than or equal to 0.0 mol. % and less than or equal to 2.0 mol. % of all other components in total.

11. The glass of claim 7, wherein the glass satisfies the conditions:

$$4.5 \le P_d \le 5.5 \text{ and}$$

$$1.95 \le P_n \le 2.07,$$

where $P_d$ is a parameter predicting a density at room temperature, $d_{RT}$, calculated from the glass composition in terms of mol. % of the components according to the Formula (II):

$$P_d=4.688+0.047868*La_2O_3-0.0065829*TiO_2-$$
$$0.027601*B_2O_3-0.022365*SiO_2+$$
$$0.016475*ZrO_2-0.0052977*Nb_2O_5-$$
$$0.0030466*CaO+0.014971*BaO+$$
$$0.019511*Y_2O_3+0.0076377*ZnO+$$
$$0.066160*Gd_2O_3-0.016932*Na_2O+$$
$$0.025764*WO_3-0.035116*Al_2O_3-$$
$$0.0094315*Li_2O+0.047388*PbO+$$
$$0.080813*Bi_2O_3-0.0088118*GeO_2+$$
$$0.072296*Er_2O_3+0.078888*Yb_2O_3-$$
$$0.026242*K_2O+0.010351*SrO-$$
$$0.0030424*MgO, \qquad (II).$$

12. The glass of claim 7, wherein when cooled in air from 1100° C. to 500° C. in 2.5 minutes, the glass does not crystallize.

13. A glass comprising a plurality of components, the glass having a composition of the components comprising:

greater than or equal to 0.5 mol. % and less than or equal to 45.0 mol. % $B_2O_3$, greater than or equal to 0.1 mol. % and less than or equal to 25.0 mol. % $Bi_2O_3$, greater than or equal to 0.0 mol. % and less than or equal to 8.0 mol. % $WO_3$, a sum of $SiO_2+B_2O_3+P_2O_5$ greater than or equal to 10.0 mol. %, a sum of $TiO_2+Nb_2O_5$ greater than or equal to 8.5 mol. %, a sum of $RE_mO_n+WO_3+ZrO_2$ greater than or equal to 4.5 mol. % and optionally comprising one or more components selected from CaO, BaO, ZnO, $Na_2O$, $Al_2O_3$, $Li_2O$, PbO, $GeO_2$, $TeO_2$, $K_2O$, SrO and MgO, wherein the composition of the components satisfies the condition:

$$SiO_2+B_2O_3-P_2O_5 [mol. \%] \geq 0.100,$$

wherein none of the ranges of the components is modified by the term "about", and wherein the glass satisfies the condition:

$$P_n > 2.045,$$

where $P_n$ is a parameter predicting a refractive index at 587.56 nm, $n_d$, calculated from the glass composition in terms of mol. % of the components according to the Formula (I):

$$P_n = 1.844 + 0.0054162*La_2O_3 + 0.0031113*TiO_2 - 0.004212*B_2O_3 - 0.0035692*SiO_2 + 0.0027887*ZrO_2 + 0.0078026*Nb_2O_5 - 0.00012928*CaO + 0.00076566*BaO + 0.0043601*Y_2O_3 + 0.00067408*ZnO + 0.0068029*Gd_2O_3 - 0.0025106*Na_2O + 0.0039937*WO_3 - 0.0043208*Al_2O_3 - 0.0011666*Li_2O + 0.0051727*PbO + 0.012958*Bi_2O_3 - 0.0018753*GeO_2 - 0.0014084*TeO_2 + 0.0086647*Er_2O_3 + 0.0097345*Yb_2O_3 - 0.0038734*K_2O - 0.00041776*SrO - 0.0017294*MgO, \quad (I)$$

where $RE_mO_n$ is a total sum of rare earth metal oxides and an asterisk (*) means multiplication, and the parameter $P_1$ is not modified by the term "about".

14. The glass of claim 13, wherein the glass has a refractive index at 587.56 nm, $n_d$ that is greater than or equal to 2.045.

15. The glass of claim 13, wherein the composition of the components satisfies the condition:

$$0.38 \; SiO_2/(SiO_2+B_2O_3) \; [mol. \%] \leq 0.75.$$

16. The glass of claim 13, wherein the composition of the components comprises:

greater than or equal to 22.0 mol. % and less than or equal to 25.0 mol. % $TiO_2$, greater than or equal to 20.0 mol. % and less than or equal to 30.0 mol. % $La_2O_3$, greater than or equal to 16.0 mol. % and less than or equal to 20.0 mol. % $B_2O_3$, greater than or equal to 10.0 mol. % and less than or equal to 20.0 mol. % $SiO_2$, greater than or equal to 6.5 mol. % and less than or equal to 8.0 mol. % $ZrO_2$, greater than or equal to 5.0 mol. % and less than or equal to 6.7 mol. % $Nb_2O_5$, greater than or equal to 0.0 mol. % and less than or equal to 6.0 mol. % $Y_2O_3$, greater than or equal to 0.0 mol. % and less than or equal to 3.0 mol. % BaO and greater than or equal to 0.0 mol. % and less than or equal to 2.0 mol. % $Gd_2O_3$ and greater than or equal to 0.0 mol. % and less than or equal to 2.0 mol. % of all other components in total.

17. The glass of claim 13, wherein the glass satisfies the conditions:

$$4.5 \leq P_d \leq 5.5 \text{ and}$$

$$P_n \leq 2.07,$$

where $P_d$ is a parameter predicting a density at room temperature, $d_{RT}$, calculated from the glass composition in terms of mol. % of the components according to the Formula (II):

$$P_d = 4.688 + 0.047868*La_2O_3 - 0.0065829*TiO_2 - 0.027601*B_2O_3 - 0.022365*SiO_2 + 0.016475*ZrO_2 - 0.0052977*Nb_2O_5 - 0.0030466*CaO + 0.014971*BaO + 0.019511*Y_2O_3 + 0.0076377*ZnO + 0.066160*Gd_2O_3 - 0.016932*Na_2O + 0.025764*WO_3 - 0.035116*Al_2O_3 - 0.0094315*Li_2O + 0.047388*PbO + 0.080813*Bi_2O_3 - 0.0088118*GeO_2 + 0.072296*Er_2O_3 + 0.078888*Yb_2O_3 - 0.026242*K_2O + 0.010351*SrO - 0.0030424*MgO, \quad (II)$$

18. The glass of claim 13, wherein when cooled in air from 1100° C. to 500° C. in 2.5 minutes, the glass does not crystallize.

* * * * *